(12) United States Patent
Seto

(10) Patent No.: US 9,174,511 B2
(45) Date of Patent: Nov. 3, 2015

(54) VEHICULAR AIR CONDITIONING APPARATUS

(75) Inventor: Takahiro Seto, Utsunomiya (JP)

(73) Assignee: KEIHIN CORPORATION, Tokyo (JP)

( * ) Notice: Subject to any disclaimer, the term of this patent is extended or adjusted under 35 U.S.C. 154(b) by 1595 days.

(21) Appl. No.: 12/500,728

(22) Filed: Jul. 10, 2009

(65) Prior Publication Data

US 2011/0005720 A1    Jan. 13, 2011

(51) Int. Cl.
*B60H 1/00*       (2006.01)
*B60H 1/32*       (2006.01)

(52) U.S. Cl.
CPC ........ *B60H 1/00064* (2013.01); *B60H 1/00678* (2013.01); *B60H 1/3233* (2013.01); *B60H 2001/002* (2013.01); *B60H 2001/00099* (2013.01); *B60H 2001/00135* (2013.01)

(58) Field of Classification Search
CPC .......................................................... B60H 1/00
USPC ........................................ 165/41, 42, 43, 204
See application file for complete search history.

(56) References Cited

U.S. PATENT DOCUMENTS

| | | | | |
|---|---|---|---|---|
| 4,559,994 | A * | 12/1985 | Waldmann et al. | 165/41 |
| 5,309,731 | A   | 5/1994  | Nonoyama et al. | |
| 5,390,728 | A * | 2/1995  | Ban | 165/204 |
| 6,308,770 | B1* | 10/2001 | Shikata et al. | 165/42 |
| 6,422,309 | B2* | 7/2002  | Vincent | 165/204 |
| 6,640,890 | B1* | 11/2003 | Dage et al. | 165/203 |
| 2004/0093885 | A1* | 5/2004 | Ito et al. | 62/244 |
| 2007/0023180 | A1* | 2/2007 | Komarek et al. | 165/202 |

FOREIGN PATENT DOCUMENTS

| | | |
|---|---|---|
| EP | 1457366      | 9/2004 |
| JP | 58-164814    | 11/1983 |
| JP | 05-178068    | 7/1993 |
| JP | 06-040236    | 2/1994 |
| JP | 06-191257    | 7/1994 |
| JP | 06191257 A * | 7/1994 |
| JP | 08104129 A * | 4/1996 |
| JP | 09-290625    | 11/1997 |
| JP | 11-192834    | 7/1999 |
| JP | 2001-180255  | 7/2001 |
| JP | 2004-276707  | 10/2004 |

OTHER PUBLICATIONS

Japanese Office Action with partial English translation dated Jan. 14, 2014, 4 pages.
Japanese Office Action dated Apr. 30, 2014 with partial English translation, 4 pages.

* cited by examiner

*Primary Examiner* — Frantz Jules
*Assistant Examiner* — Erik Mendoza-Wilkenfel
(74) *Attorney, Agent, or Firm* — Rankin, Hill & Clark LLP

(57) ABSTRACT

A vehicular air conditioning apparatus is equipped with a casing having respective air passages therein, and first and second blower units are connected to the casing. Further, the casing is constituted by first and second divided casings. In addition, air is supplied to the interior of the casing from the first and second blower units. Moisture, which is generated when the air is cooled by an evaporator, is guided to forward bottom surfaces of the first and second divided casings and the moisture is discharged to the exterior from first drain ports disposed at terminal end positions of inclined surfaces that decline gradually toward opposite sides of the casing.

7 Claims, 53 Drawing Sheets

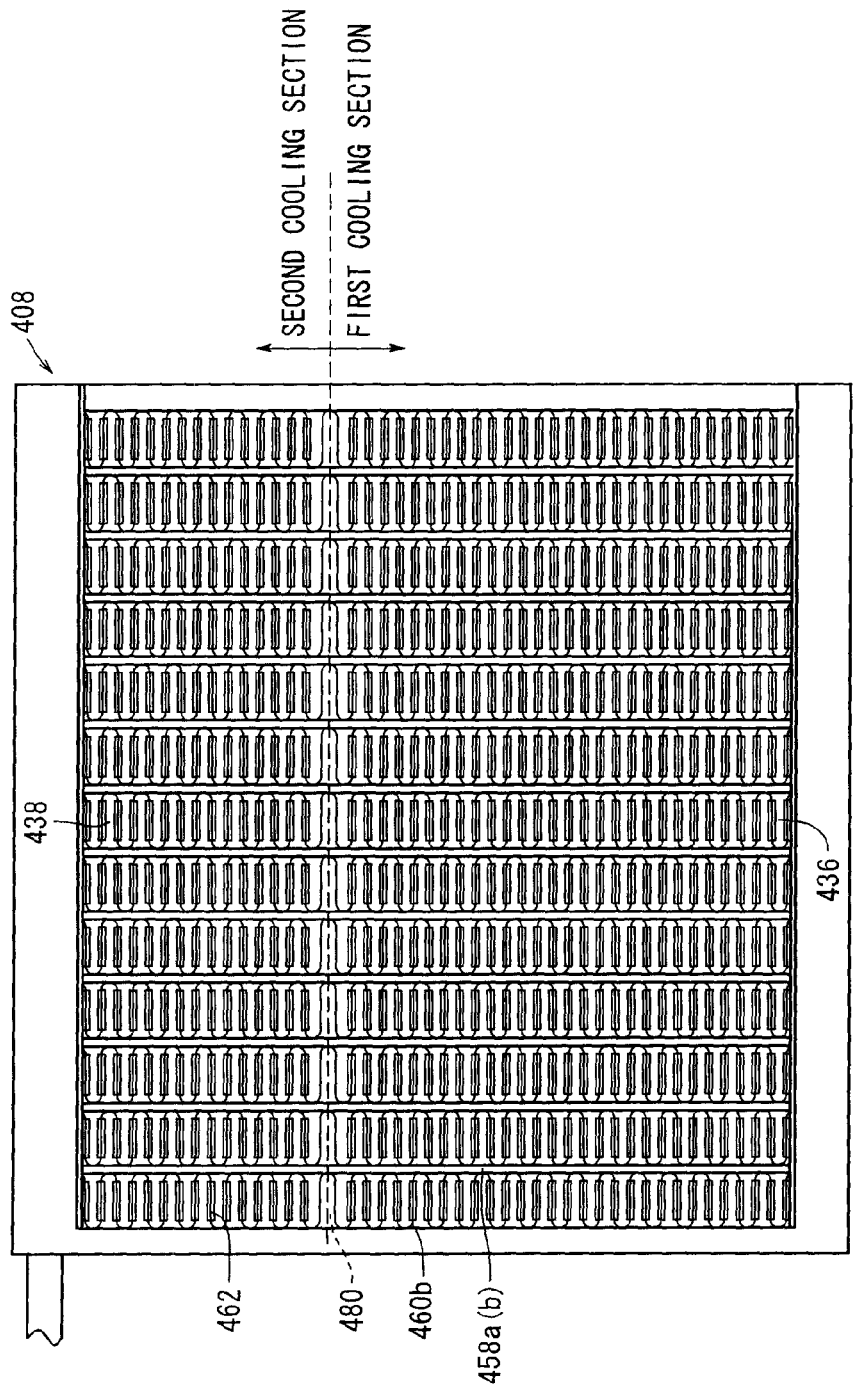

VEHICULAR AIR CONDITIONING APPARATUS

BACKGROUND OF THE INVENTION

1. Field of the Invention

The present invention relates to a vehicular air conditioning apparatus mounted in a vehicle for blowing air into a vehicle compartment that has been adjusted in temperature by a cooling means, for thereby adjusting temperature of the vehicle compartment.

2. Description of the Related Art

In a vehicular air conditioning apparatus that is mounted in a vehicle, internal and external air is introduced into a casing by a blower, and after cooled air, which has been cooled by an evaporator that forms a cooling means, and heated air, which has been heated by a heater core that forms a heating means, are mixed together in the casing at a predetermined mixing ratio, the mixed air is blown out from a defroster blow-out port, a face blow-out port, or a foot blow-out port, whereby adjustment of temperature and humidity in the vehicle compartment is carried out.

With this type of vehicular air conditioning apparatus, for example, as disclosed in Japanese Laid-Open Patent Publication No. 05-178068, Japanese Laid-Open Patent Publication No. 06-040236 and Japanese Laid-Open Patent Publication No. 06-191257, it is known to provide a first blower for the purpose of taking in air from the vehicle compartment into the casing, and a second blower for the purpose of taking in external air outside of the vehicle compartment into the casing. In such a vehicular air conditioning apparatus, air that is introduced from an internal air introduction port by rotation of the first blower is heated by a first heat exchanger and then is blown into the vehicle compartment through a first air passage from the face blow-out port or the foot blow-out port. In addition, air that is introduced from an external air introduction port by rotation of the second blower is heated by a second heat exchanger and then is blown into the vehicle compartment through a second air passage from the defroster blow-out port. More specifically, a switching operation is performed such that when air is blown out from the face blow-out port or the foot blow-out port, the first blower is driven and air from the interior of the vehicle is introduced, whereas when air is blown out from the defroster blow-out port, the second blower is rotated and external air is introduced.

Further, in another vehicular air conditioning apparatus having first and second blowers for introducing air, the first blower is arranged facing toward an external air inlet port of a duct, and the second blower is arranged facing toward an interior air inlet port, and together therewith, the first blower includes a switching means, which is capable of switching the air that is introduced to the duct by the first blower between interior air and exterior air.

In addition, the air that is introduced to the duct by the first blower is switched between interior air and exterior air by the switching means, and after the air is mixed with air that is introduced to the duct by the second blower and adjusted in temperature by a heating means and a cooling means so as to provide a desired temperature, the air is blown into a desired region in the vehicle compartment through a face blow-out port, a foot blow-out port, or a defroster blow-out port.

In the aforementioned structure, with the vehicular air conditioning apparatus, for example, as disclosed in Japanese Laid-Open Patent Publication No. 2001-180255, when air is cooled by an evaporator that constitutes the cooling means thereof, water droplets (hereinafter also referred to as condensate water) are generated on surfaces of the evaporator. When such water droplets are left uncontrolled as is, freezing and build-up of ice occurs, thus reducing the effective area of the evaporator, and the heat conversion efficiency of the evaporator is drastically lowered. Consequently, measures have been taken to discharge such water droplets to the exterior.

Recently, in response to demands to increase the vehicle compartment space inside of vehicles, it is desirable to reduce the size and scale of the vehicular air conditioning apparatus, which is mounted in the vehicle.

With respect thereto, with the conventional technique pertaining to the aforementioned Japanese Laid-Open Patent Publication No. 2001-180255, so that condensate water, which is generated at the evaporator, can be discharged to the exterior regardless of changes in the posture of the vehicle during running thereof, a bottom surface of the casing is inclined significantly in a downward direction, such that at all times condensate water is collected toward a water discharge or drainage port provided on the bottom surface of the casing. Notwithstanding, by adopting such a structure, the dimension in the vertical direction on the bottom surface portion of the casing becomes large, and accommodation of the vehicular air conditioning apparatus within the limited space inside the vehicle is problematic. Stated otherwise, configuring the vehicular air conditioning apparatus in this manner runs contradictory to efforts to reduce the size and scale of the vehicular air conditioning apparatus.

SUMMARY OF THE INVENTION

A general object of the present invention is to provide a vehicular air conditioning apparatus, in which moisture that is generated in a cooling means can be discharged reliably and efficiently to the exterior during times of both running and stopping of the vehicle, without regard to the posture of the vehicle, and together therewith, enabling the vehicular air conditioning apparatus to be made small in size and scale.

The present invention is characterized by a vehicular air conditioning apparatus, including a casing having a plurality of passages through which air flows, a blower connected to the casing for supplying the air to the inside of the casing, and cooling means disposed inside the casing for cooling the air and supplying cooled air, wherein on a bottom surface of the casing, a plurality of drain ports are provided, which communicate between an interior portion and an exterior portion of the casing.

More specifically, with the present invention, by providing the plural drain ports, which communicate between the interior and the exterior of the casing, on the bottom surface of the casing in which the cooling means is installed in the interior thereof, moisture that is generated at the cooling means and which falls therefrom can be quickly and reliably discharged to the exterior through the plural drain ports. Accordingly, by providing a plurality of drain ports, irrespective of the posture of the vehicle, such moisture can be reliably and effectively discharged to the exterior. Further, since a structure is provided by the plural drain ports for discharging moisture to the exterior, the height dimension of the casing having such drain ports can be suppressed and the casing can be made smaller in scale, whereby the vehicular air conditioning apparatus can be accommodated within the limited space of the vehicle.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 34 is a plan view of an evaporator according to a modified example in which, in place of the first and second partitioning members of FIG. 30, louverless portions are provided on fins;

DESCRIPTION OF THE PREFERRED EMBODIMENTS

Figure 1:
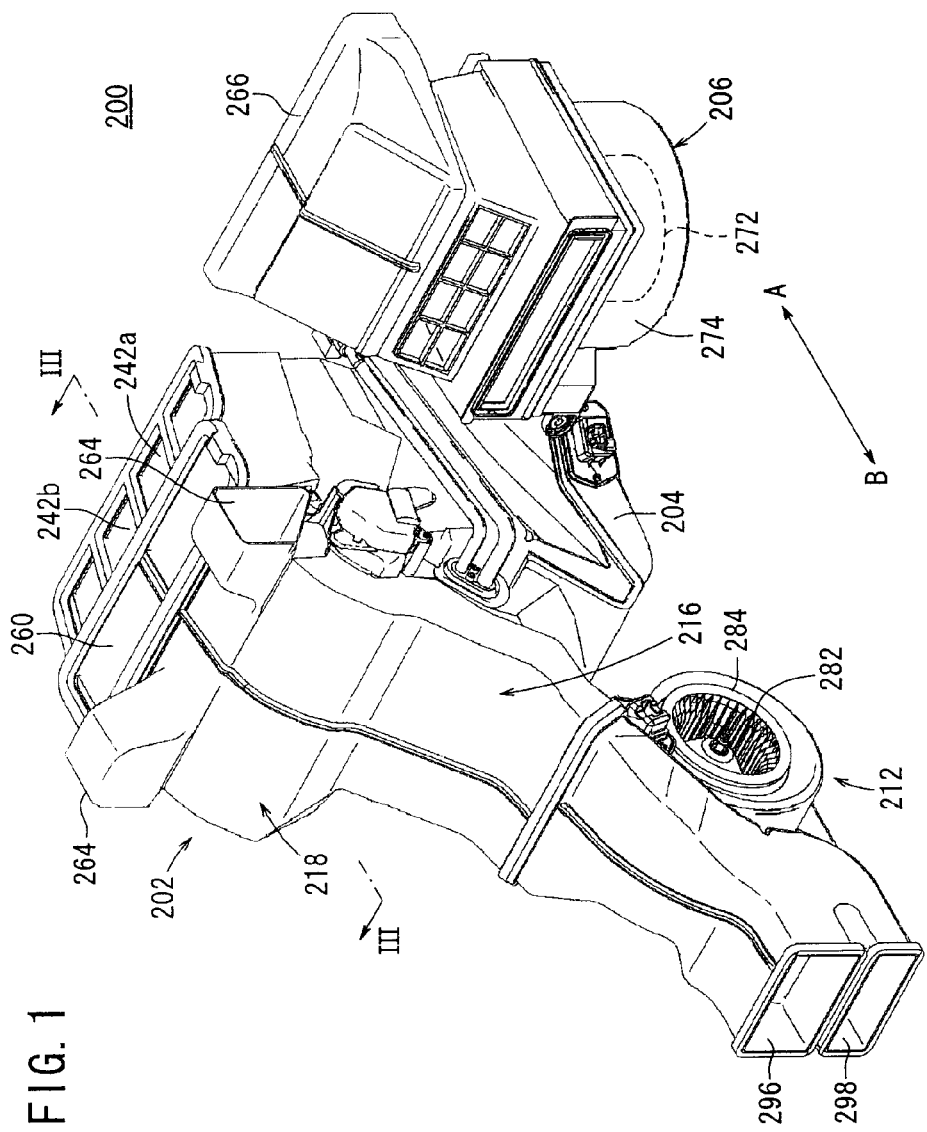
FIG. 1 is an external perspective view of a vehicular air conditioning apparatus according to a first embodiment of the present invention.

A preferred embodiment of a vehicular air conditioning apparatus according to the present invention shall be presented and explained in detail below with reference to the accompanying drawings. In FIG. 1, reference numeral 200 indicates a vehicular air conditioning apparatus according to a first embodiment of the present invention. The vehicular air conditioning apparatus 200, for example, is installed in a vehicle having three rows of seats arranged along the direction of travel of the vehicle. In the following descriptions, the first row of seats in the vehicle compartment of the vehicle is designated as front seats, the second row of seats is designated as middle seats, and the third row of seats is designated as rear seats.

Figure 2:
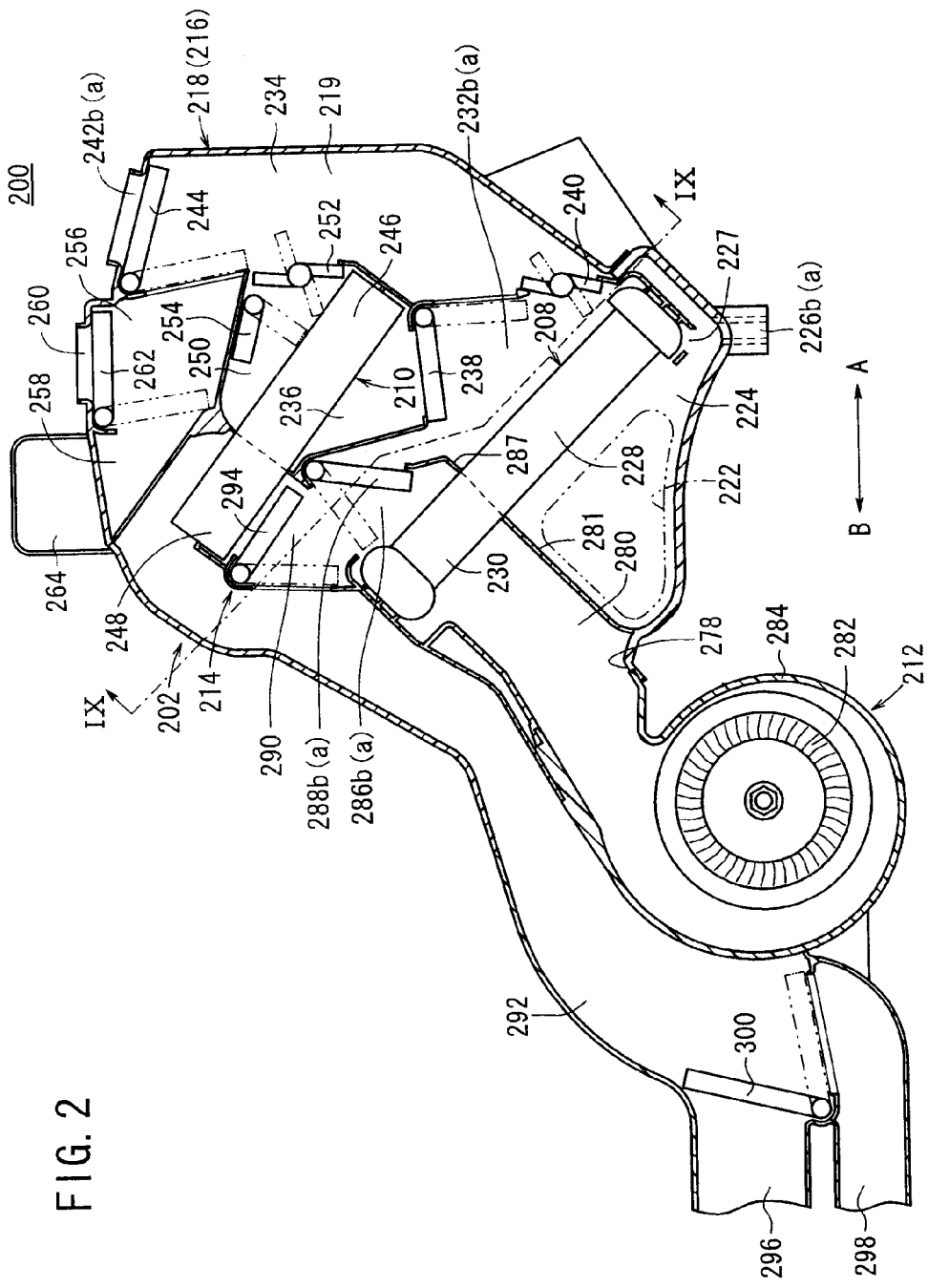
FIG. 2 is an overall cross sectional view of the vehicular air conditioning apparatus shown in FIG. 1.

Further, the vehicular air conditioning apparatus 200 is installed so that the righthand side thereof shown in FIG. 2 (in the direction of arrow A) is oriented toward the front side of the vehicle, whereas the lefthand side (in the direction of arrow B) is oriented toward the rear side of the vehicle. The arrow A direction shall be described as a forward direction, whereas the arrow B direction shall be described as a rearward direction.

In the first and second embodiments, as described below, inside the casing, plural rotating members made up of dampers or the like are provided, wherein the rotating members are operated by rotational drive sources such as motors or the like. Herein, for purposes of simplification, depictions and explanations concerning such rotational drive sources have been omitted.

As shown in FIGS. 1 and 2, the vehicular air conditioning apparatus 200 according to the first embodiment includes a casing 202 constituted by respective air passages, a first blower unit 206 connected via a connection duct 204 to a side portion of the casing 202 for blowing air toward the front seats of the vehicle, an evaporator (cooling means) 208 arranged in the interior of the casing 202 for cooling air, a heater core 210 for heating the air, a second blower unit 212 connected to a lower part of the casing 202 for blowing air to the middle seats and rear seats of the vehicle, and a damper mechanism 214 for switching the flow of air that flows through each of the aforementioned passages.

The casing 202 is constructed from first and second divided casings 216, 218 having substantially symmetrical shapes, and a center plate 219 disposed between the first divided casing 216 and the second divided casing 218. A first intake port 222 connected to the connection duct 204, and to which air is supplied from the first blower unit 206, is formed at a lower side portion of the first divided casing 216. The first intake port 222 communicates with a first front passage 224 disposed on an upstream side of the evaporator 208.

Figure 5:
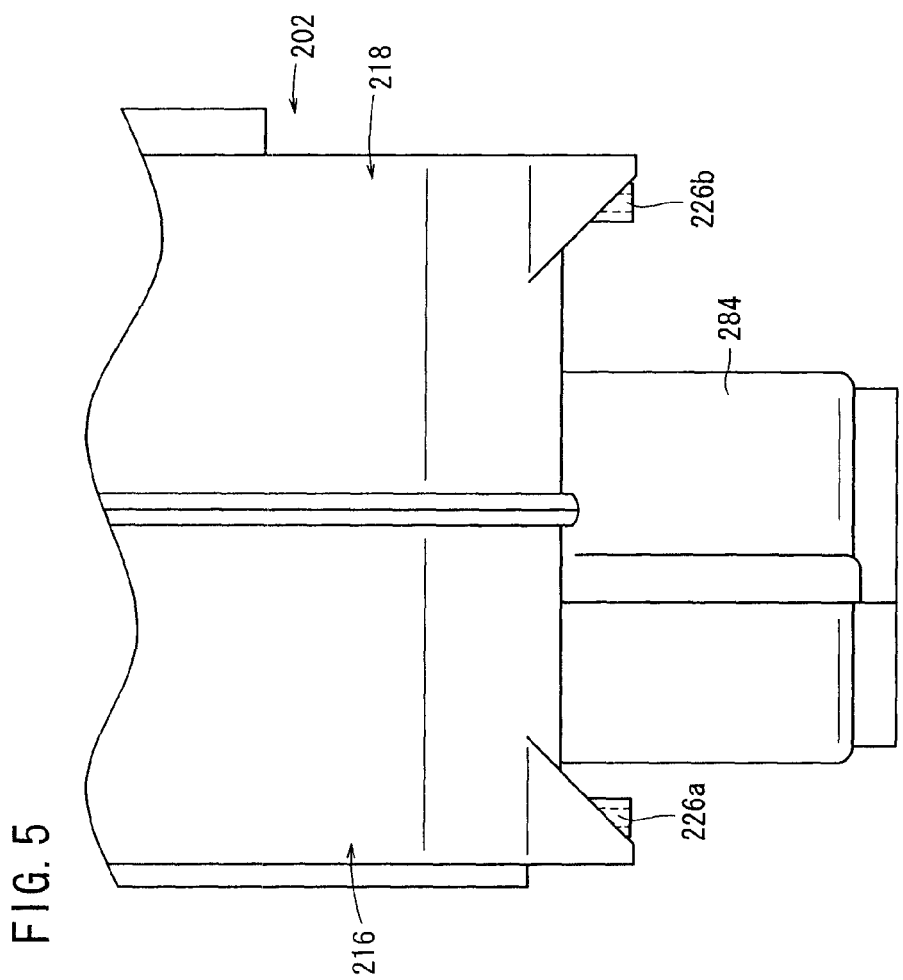
FIG. 5 is an enlarged frontal view of the vicinity of a bottom portion of the casing shown in FIG. 3.
Figure 6:
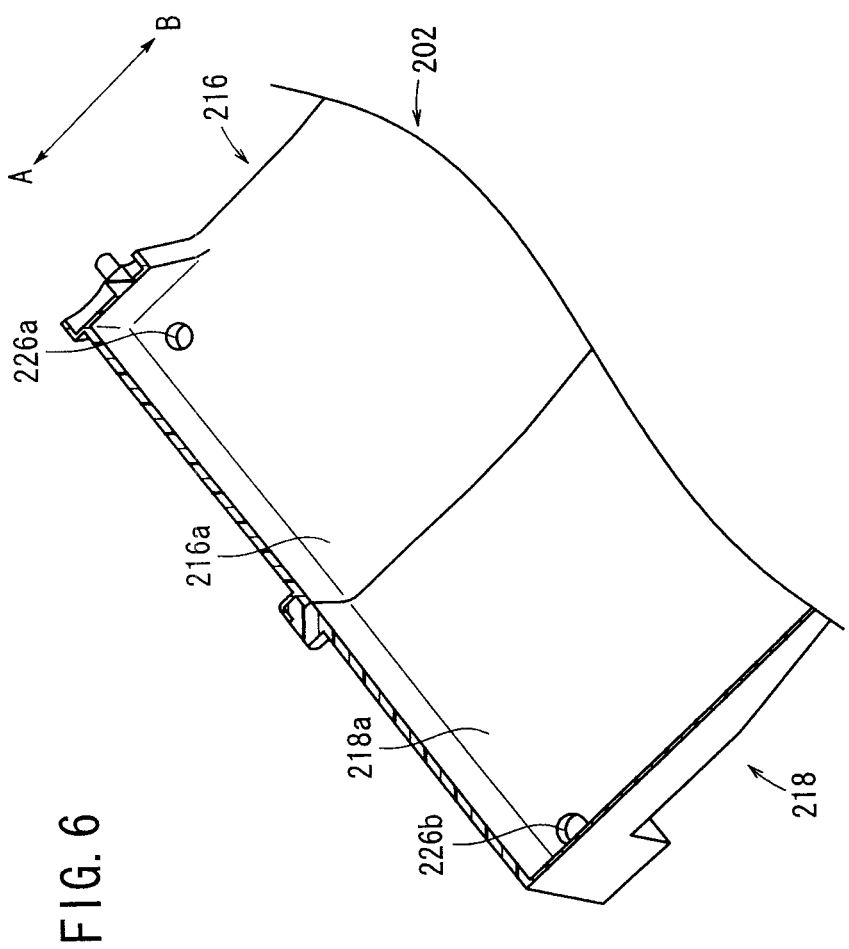
FIG. 6 is an enlarged perspective view of the vicinity of a bottom portion of the casing shown in FIG. 4 as seen from an inner side of the casing.

In this case, the bottom of the casing 202 is inclined gradually, oriented toward end portions in the widthwise direction of the vehicle taking the center thereof as an apex, such that the forward side thereof (in the direction of arrow A) is formed at a lowermost point (see FIGS. 2 and 5), with drain ports 226a, 226b being disposed in bottom corner portions thereof. More specifically, the drain ports 226a, 226b are formed in tubular shapes and extend in vertically downward directions respectively from bottom surfaces 216a, 218a of the first and second divided casings 216, 218. Further, the drain ports 226a, 226b are disposed in the vicinity of opposite side portions, mutually separated in the widthwise direction of the casing 202. Additionally, since inner portions of the drain ports 226a, 226b communicate with the interior of the casing 202, moisture that is generated inside the casing 202 and falls to the bottom surfaces 216a, 218a is discharged to the exterior from the drain ports 226a, 226b. Moreover, as shown in FIG. 2, the lowermost position of the evaporator 208 faces toward an opening 227 disposed in the interior of the casing 202, so that moisture which is generated at the evaporator 208 falls toward the bottom surfaces 216a, 218a from the opening 227 and is discharged to the exterior from the drain ports 226a, 226b.

Figure 7:
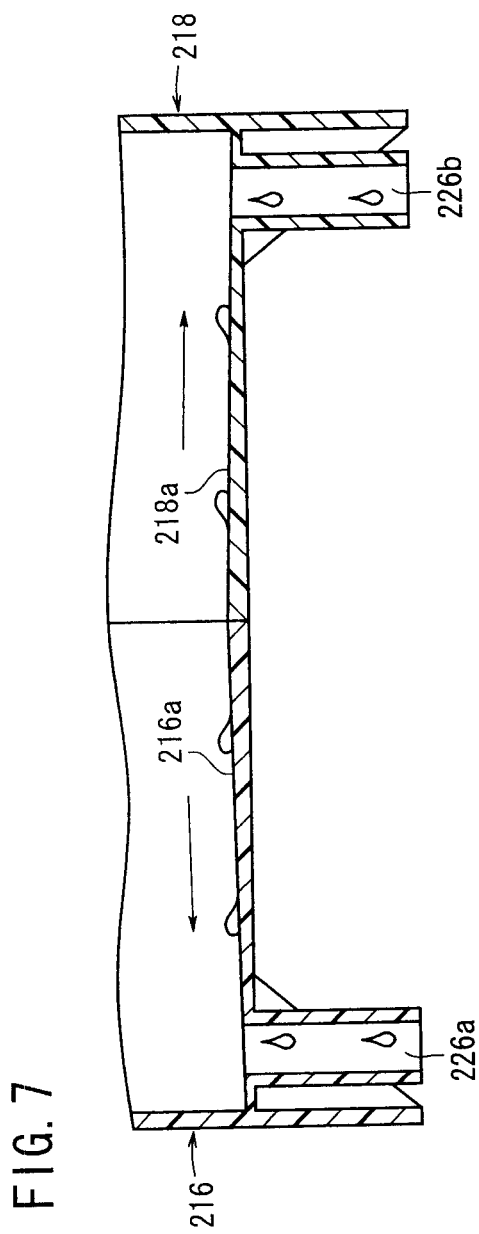
FIG. 7 is a cross sectional view taken along line VII-VII of FIG. 4.

Furthermore, as stated previously, as shown in FIG. 7, since the bottom surfaces 216a, 218a of the first and second divided casings 216, 218 are inclined downward gradually toward opposite side portions of the casing 202, moisture that falls onto the bottom surfaces 216a, 218a is guided suitably to the drain ports 226a, 226b and is discharged to the exterior. In this manner, since the drain ports 226a, 226b are disposed at positions where inclined surfaces on the bottom surfaces 216a, 218a, which gradually decline toward opposite side portions of the casing 202, terminate, compared to a structure in which the bottom surfaces 216a, 218a are inclined in one direction in the widthwise direction of the vehicle, the size in the vertical direction of the casing 202 can be reduced as much as possible. Moreover, the drain ports 226a, 226b are not limited to being provided in a pair, and three or more of such drain ports may also be provided. For example, in the case that the bottom surfaces 216a, 218a of the casing 202 are inclined in only one direction in the widthwise direction of the vehicle, only a single drain port 226a may be disposed at a corner portion on the bottom thereof.

Further, even in the case that the casing 202 is mounted on the floor or the like before the vehicular air conditioning apparatus 200 is installed in the vehicle, since the pair of drain ports 226a, 226b which project from the bottom of the casing 202 are disposed in a pair, the drain ports 226a, 226b can be affixed stably as leg portions. Owing thereto, when components such as the first and second blower units 206, 212 are assembled onto the casing 202, such assembly can be performed easily without requiring a specialized jig or the like.

As shown in FIG. 2, the evaporator 208, which is disposed on the downstream side of the first front passage 224, is disposed to straddle between the first divided casing 216 and the second divided casing 218. One end thereof in the forward direction of the vehicle (the direction of arrow A) is inclined downward at a predetermined angle with respect to the other end thereof in the rearward direction (the direction of arrow B) of the vehicle.

The evaporator 208 includes a first cooling section 228 that faces the first front passage 224 and which cools air that is supplied from the first front passage 224, and a second cooling section 230 that faces a later-described first rear passage 280 and which cools air that is supplied from the first rear passage 280. The first cooling section 228 and the second cooling section 230 are separated by a non-illustrated partitioning means, so that air flowing from the first front passage 224 into the evaporator 208 and air flowing from the first rear passage 280 into the evaporator 208 do not mix together mutually inside the evaporator 208.

On the other hand, a second front passage 232 supplied with air that has passed through the first cooling section 228 is formed on the downstream side of the evaporator 208. Upwardly of the second front passage 232, a third front passage 234 and a fourth front passage 236 are formed in a branching or bifurcated fashion. Further, a first air mixing damper 238 is disposed rotatably in the second front passage 232, so as to face toward the branching portion of the third front passage 234 and the fourth front passage 236. By rotation of the first air mixing damper 238, the blowing condition and blowing rate of the cooled air that has passed through the evaporator 208 into the third front passage 234 and the fourth front passage 236 is adjusted. The third front passage 234 is arranged in a forward direction (the direction of arrow A), whereas the fourth front passage 236 is arranged in a rearward direction (the direction of arrow B), of the casing 202. The heater core 210 is disposed on a downstream side of the fourth front passage 236.

Upstream of the third front passage 234, a cooling vent damper 240 is disposed in a downward direction facing the second front passage 232. The cooling vent damper 240 is formed from a butterfly valve, which is rotatable about a central axis, for switching a communication state between the second front passage 232 and the third front passage 234. More specifically, because the cooling vent damper 240 is arranged in the vicinity of the evaporator 208, the cooling vent damper 240 is disposed such that, under a switching action thereof, chilled air cooled by the evaporator 208 is supplied directly into the third front passage 234.

Further, the third front passage 234 extends upwardly, and a first vent blow-out port 242 opens at an upper portion on the downstream side thereof, where a vent damper 244 is rotatably disposed. The vent damper 244 switches a blowing state of air that flows through the third front passage 234, when air is blown to the first vent blow-out port 242 and to a later-described sixth front passage 256, and also is capable of adjusting the blowing rate thereof.

The heater core 210, similar to the evaporator 208, is arranged so as to straddle between the first divided casing 216 and the second divided casing 218, and is disposed such that one end thereof in the forward direction of the vehicle (the direction of arrow A) is inclined downward at a predetermined angle with respect to the other end thereof in the rearward direction (the direction of arrow B) of the vehicle. The heater core 210 includes a first heating section 246 that faces the fourth front passage 236 and which heats air that is supplied from the fourth front passage 236, and a second heating section 248 that faces a third rear passage 290 (to be described later) and which heats air that is supplied from the third rear passage 290. The first heating section 246 and the second heating section 248 are separated by a non-illustrated partitioning means, so that air flowing from the fourth front passage 236 to the heater core 210 and air flowing from the third rear passage 290 to the heater core 210 do not mix together mutually inside the heater core 210.

On the downstream side of the heater core 210, a fifth front passage 250 is formed. The fifth front passage 250 extends in the forward direction (in the direction of arrow A), and at a location that merges with the downstream side of the third front passage 234, temperature control dampers 252a, 252b are provided, and together therewith, a sub-defroster damper 254 is disposed in an upward direction facing the heater core 210. The temperature control dampers 252a, 252b, similar to the cooling vent damper 240, are formed from a butterfly valve rotatable about a central axis, for switching a communication state between the fifth front passage 250 and the third front passage 234 upon rotation thereof, and for deflecting the blowing direction of warm air supplied from the fifth front passage 250 into the third front passage 234.

On the other hand, the sub-defroster damper 254 is disposed so as to be capable of switching a communication state between the fifth front passage 250 and the sixth front passage 256 formed thereabove. By rotating the sub-defroster damper 254 and thereby establishing communication between the fifth front passage 250 and the sixth front passage 256, that is, by shortening the flow path from the fifth front passage 250 to the sixth front passage 256, in a state in which air resistance is reduced, warm air heated by the heater core 210 can be supplied directly to the sixth front passage 256 without flowing through the third front passage 234. Owing thereto, in the case that the heat mode for blowing air in the vicinity of the feet of passengers, or the defroster mode for blowing air in the vicinity of the front window of the vehicle, is selected, the blowing rate can be increased to quickly heat such areas. Stated otherwise, by reducing the influence of ventilation resistance by bending the passage, even without increasing the rotation of the first blower unit 206, the blowing rate of air in the heat mode for blowing air in the vicinity of the feet of passengers, or in the defroster mode for blowing air in the vicinity of the front window of the vehicle, can be increased. Furthermore, since the flow path from the fifth front passage 250 to the sixth front passage 256 is shortened, loss of heat from the warm air heated by the heater core 210 is reduced as much as possible when air is blown from the defroster blow-out port 260 to the front seats, resulting in electrical power savings during the heat mode and the defroster mode. Moreover, by arranging the sub-defroster damper 254 upwardly of the heater core 210, and arranging the defroster blow-out port 260 further upwardly thereof, the flow of warm air is made substantially linear, such that the ventilation resistance when the warm air flows therethrough can be reduced even more.

Further, in a case where the blowing amount of air is fixed, the rotation number (rotational frequency, RPM) of the first blower unit 206 can be reduced, thereby resulting in electrical power savings during the heat mode and the defroster mode.

Furthermore, during the vent mode, the sub-defroster damper 254 is rotated to establish communication between the fifth front passage 250 and the sixth front passage 256, together with rotating the first air mixing damper 238 somewhat in a direction to increase the flow of cool air, so that the blowing rate can be increased without changing the temperature of the blown out air.

The sixth front passage 256 communicates with the downstream side of the third front passage 234 through the forwardly disposed opening, and communicates with a seventh front passage 258 through the rearwardly disposed opening. Further, a defroster blow-out port 260 opens upwardly of the sixth front passage 256, and a defroster damper 262 is disposed rotatably facing the defroster blow-out port 260. The defroster damper 262 switches the blowing state of air that is supplied to the sixth front passage 256 from the third and fifth front passages 234, 250 when air is blown to the defroster blow-out port 260 and to the seventh front passage 258, and further is provided to enable the blowing rate thereof to be adjusted.

More specifically, with the vehicular air conditioning apparatus 200, the first vent blow-out port 242 and the defroster blow-out port 260 open upwardly of the casing 202, and are disposed substantially centrally in the casing 202, with the first vent blow-out port 242 being positioned on the forward side (in the direction of arrow A), and the defroster blow-out port 260 being positioned rearwardly thereof (in the direction of arrow B) with respect to the first vent blow-out port 242.

The seventh front passage 258 communicates with a first heat blow-out port (not shown) for blowing air through a heat passage 264 in the vicinity of the feet of passengers riding in the front seats (driver's seat, passenger seat) of the vehicle compartment.

Figure 8:
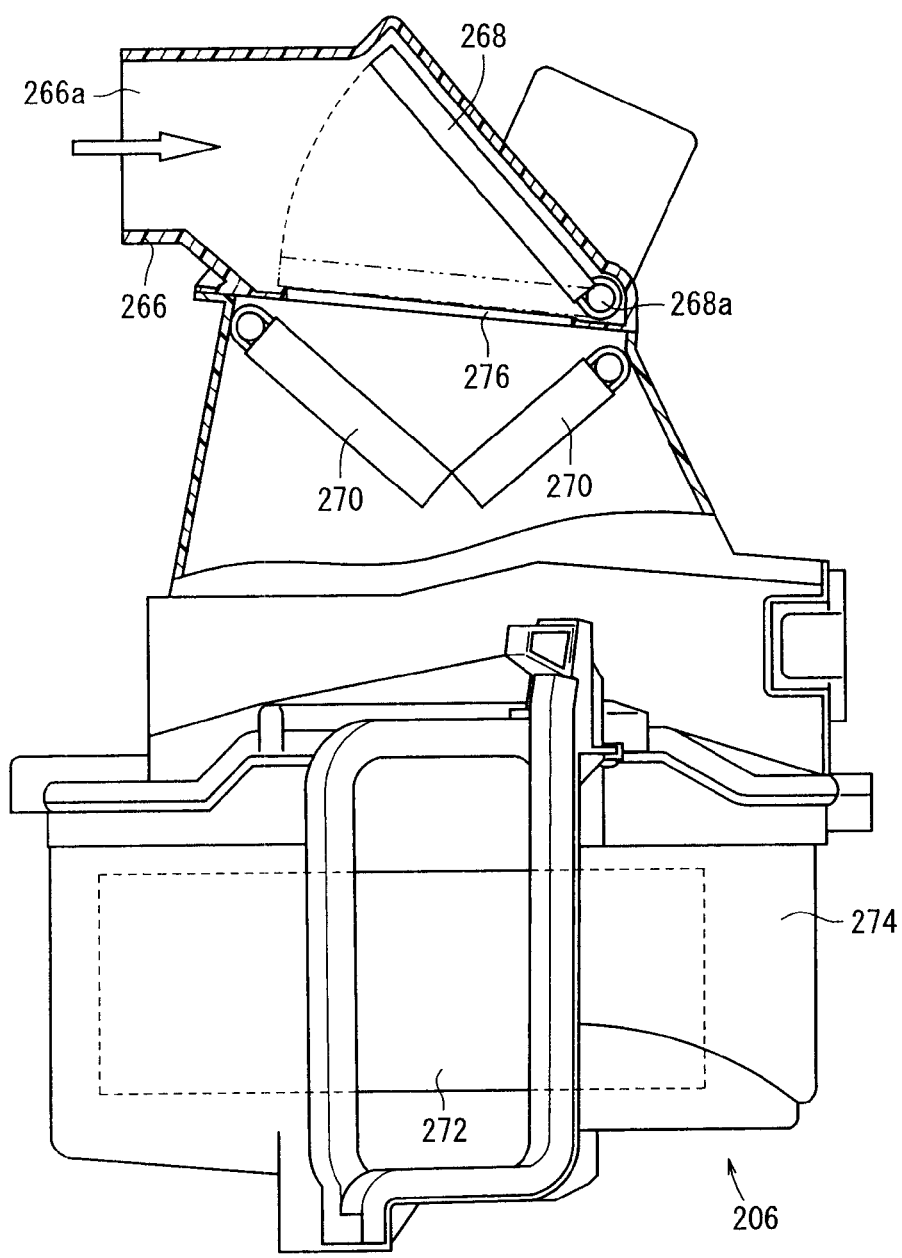
FIG. 8 is an enlarged side view of a first blower unit in the vehicular air conditioning apparatus shown in FIG. 1.

As shown in FIGS. 1 and 8, the first blower unit 206 comprises an adjustment damper 268 disposed in the inlet of a duct 266 for introducing exterior air, for adjusting the intake rate of air taken in through the duct 266, an intake damper 270 disposed on a downstream side of the adjustment damper 268 for carrying out switching between interior and exterior air, and a first blower fan 272 for supplying air taken in from the duct 266 or the like to the interior of the casing 202. A blower case 274 in which the first blower fan 272 is accommodated is connected with the connection duct 204, which in turn is connected to the first intake port 222, and communicates with the interior of the casing 202. Rotation of the first blower fan 272 is controlled by a fan motor (not shown), which is driven by supply of electrical power with respect to a non-illustrated rotary drive source.

The adjustment damper 268 is disposed to face toward an opening 266a of the duct 266, and is openable and closable via a support shaft 268a, which is supported on the downstream side of the duct 266. Stated otherwise, the adjustment damper 268 is disposed so as to confront the direction in which the exterior air is introduced. In addition, through rotation of the adjustment damper 268 by a predetermined angle upwardly from the closed condition blocking a communication hole 276 (the state shown by the two-dot-dash line in FIG. 8), which opens on an upper surface of the blower case 274, the flow rate of intake air to the side of the blower case 274 through the adjustment damper 268 and the communication hole 276 is adjusted. Moreover, an end on the opposite side of the adjustment damper 268 from the support shaft 268a is arranged to face toward and confront the air that is drawn in from the duct 266. More specifically, since the flow of air that is drawn in from the duct 266 is substantially parallel with the adjustment damper 268, air pressure is not received in a direction perpendicular with respect to the flat surface of the adjustment damper 268, and the adjustment damper 268 can be rotated without requiring a large driving force. In this case, the direction of extension of the duct 266 and the adjustment damper 268 may be arranged substantially in parallel.

For example, the running speed of the vehicle is detected by a vehicle speed sensor (not shown), and by adjusting the rotation angle (rotation amount) of the adjustment damper 268 based on the running speed, the flow rate of air that is introduced into the casing 202 from the exterior of the vehicle through the duct 266 is controlled to attain a fixed rate independently of the vehicle running speed.

More specifically, when the vehicle runs at a high speed, since the rate of air taken in from the duct 266 increases, the opening degree of the adjustment damper 268 is made smaller, and the flow rate of air (external air) supplied to the side of the blower case 274 is restricted. On the other hand, when the vehicle runs at a low speed, since the rate of air taken in from the duct 266 decreases compared to when the vehicle runs at a high speed, the opening degree of the adjustment damper 268 is controlled to become larger, so that a greater amount of air (external air) is taken into the interior of the blower case 274.

As described above, air that is supplied from the first blower unit 206 is introduced to the interior of the casing 202 through the connection duct 204 and the first intake port 222, and under rotating actions of the first air mixing damper 238, the vent damper 244, the defroster damper 262, the temperature control dampers 252a, 252b and the sub-defroster damper 254, which collectively constitute the damper mechanism 214, air is supplied selectively to the defroster blow-out port 260, the first vent blow-out port 242 and the heat passage 264, which are capable of blowing air to the front and middle seats inside the vehicle through the first through seventh front passages 224, 232, 234, 236, 250, 256 and 258.

On the other hand, in a lower portion of the casing 202, as shown in FIG. 2, a second intake port 278 through which air is supplied from the second blower unit 212 is formed at a rearward side (in the direction of arrow B) perpendicular to the first intake port 222. The second intake port 278 opens at a position on an upstream side of the evaporator 208, and communicates with the first rear passage 280, and further, is formed alongside the first intake port 222 via the first rear passage 280 and a first dividing wall 281.

The second blower unit 212 includes a second blower fan 282, which takes in air (internal air) from the vehicle compartment and supplies the intake air into the interior of the casing 202. A blower case 284 in which the second blower fan 282 is accommodated is connected to the second intake port 278 of the casing 202, and communicates with the first rear passage 280. In the same manner as the first blower fan 272, rotation of the second blower fan 282 is controlled by a fan motor (not shown), which is driven by supply of electrical power with respect to a non-illustrated rotary drive source.

On a downstream side of the first rear passage 280, a second rear passage 286 is formed through which air having passed through the second cooling section 230 of the evaporator 208 is supplied. The second rear passage 286 is separated from the second front passage 232 by a second dividing wall 287, wherein the second dividing wall 287 extends to a partition means of the evaporator 208. Owing thereto, on the downstream side of the evaporator 208 as well, air that passes through the first rear passage 280 an flows to the second cooling section 230 of the evaporator 208 does not intermix mutually with air that passes through the first front passage 224 and flows to the first cooling section 228 of the evaporator 208.

Figure 3:
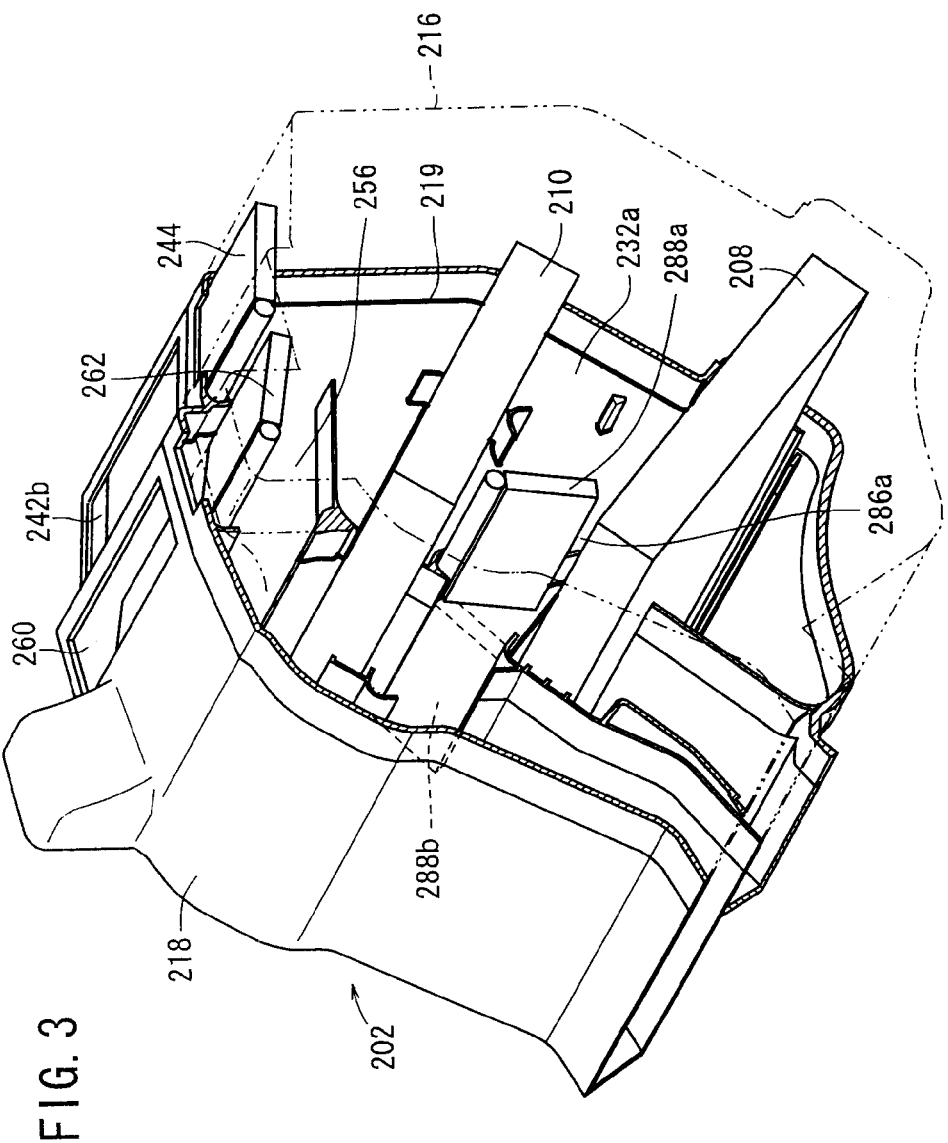
FIG. 3 is a cross sectional view taken along line III-III of FIG. 1.
Figure 4:
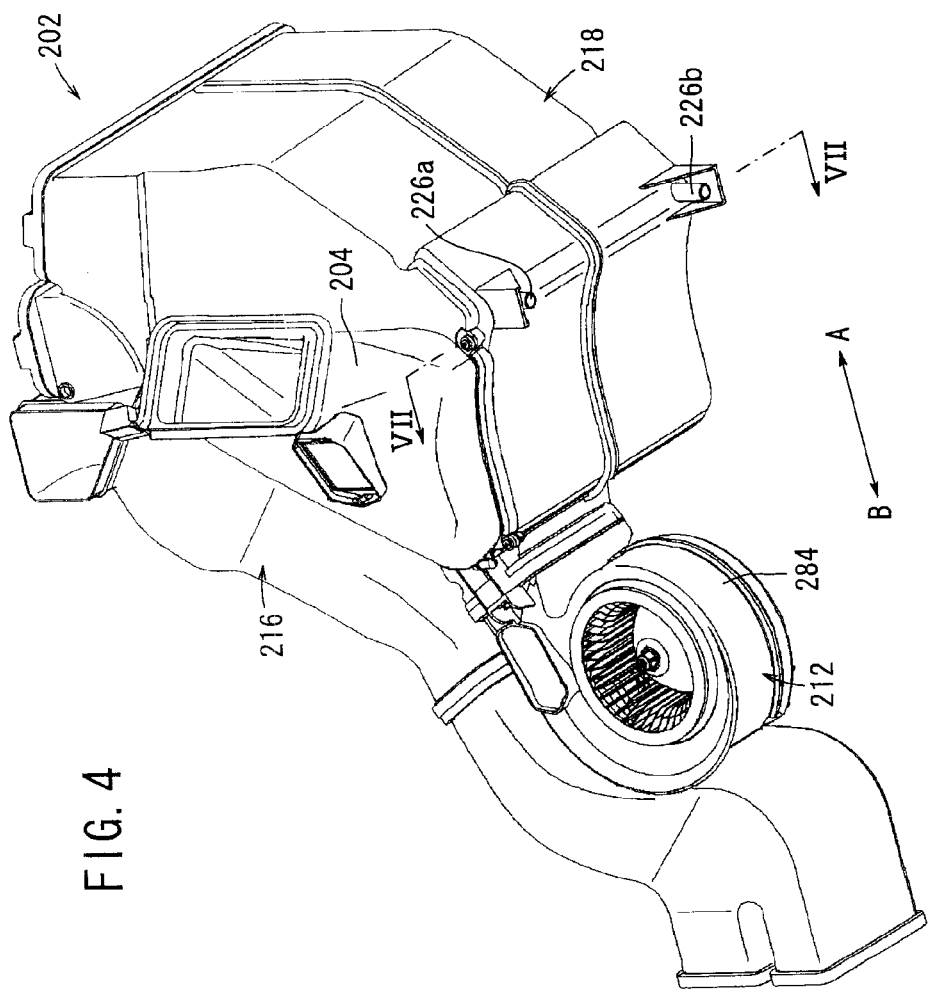
FIG. 4 is an enlarged perspective view showing the vicinity of a bottom portion of a casing in which a pair of drain ports is formed.
Figure 9:
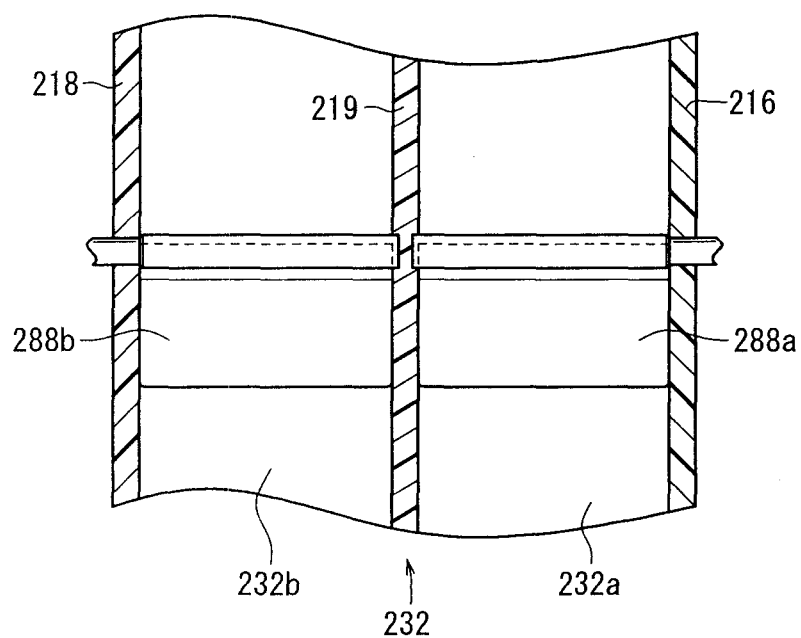
FIG. 9 is a partial cross sectional view taken along line IX-IX of FIG. 2.

Herein, as shown in FIG. 3, the second rear passage 286 and the second front passage 232 are separated respectively on sides of the first and second divided casings 216, 218 about a center plate 219, which is disposed in the center of the casing 202, thereby forming a second rear passage 286a and a second rear passage 286b, as well as a second front passage 232a and a second front passage 232b. Furthermore, as shown in FIG. 9, a pair of communication switching dampers 288a, 288b, which are capable of switching communication states with the second front passage 232a and the second front passage 232b, are disposed in the second rear passage 286a and the second rear passage 286b, wherein one of the communication switching dampers 288a is rotatably controlled separately and independently from the other communication switching damper 288b.

In addition, by rotation of the pair of communication switching dampers 288a, 288b, the second rear passage 286 for blowing air to the middle and rear seats in the vehicle compartment and the second front passage 232 for blowing air to the front seats in the vehicle compartment are brought into mutual communication with each other. Together therewith, by changing, respectively, the rotation amount of one of the communication switching dampers 288a and the rotation amount of the other of the communication switching dampers 288b, for example, the blowing rate of air blown to the passenger seat side of the front seats through the second front passage 232a and from the first vent blow-out port 242a, and the blowing rate of air blown to the driver's seat side of the front seats through the second front passage 232b and from the first vent blow-out port 242b, as well as the blowing temperatures thereof, can be controlled separately from each other.

On a downstream side from the second rear passage 286, a third rear passage 290 facing the heater core 210 is formed. The third rear passage 290 opens onto a side of the heater core 210, and further, opens alongside a fourth rear passage 292 adjacent thereto. In addition, a second air mixing damper 294, which mixes, at a predetermined mixing ratio, cool air and warm air supplied to the third rear passage 290, to thereby form mixed air, is disposed rotatably in the third rear passage 290. The second air mixing damper 294 switches the communication state between the third rear passage 290 and the upstream or downstream side of the fourth rear passage 292, which is connected to a downstream side of the heater core 210. Consequently, by rotating the second air mixing damper 294, cool air that is cooled by the evaporator 208 and supplied to the third rear passage 290 and warm air that is heated by the heater core 210 and which flows through the fourth rear passage 292 are mixed at a predetermined mixing ratio within the fourth rear passage 292, and are blown out therefrom.

In other words, an intermediate location of the fourth rear passage 292 functions as a mixing section for mixing warm air and cool air, which is then blown out to the middle seats and rear seats in the vehicle compartment.

Further, the fourth rear passage 292, after curving around so as to circumvent the end portion of the heater core 210, extends downwardly while curving to avoid an upper part of the second blower unit 212. Additionally, a downstream side of the fourth rear passage 292 communicates with the fifth and sixth rear passages 296, 298 at a branching location of the fifth and sixth rear passages 296, 298, at which a rotatable mode switching damper 300 is disposed. By rotating the mode switching damper 300, the communication state of the fourth rear passage 292 with the fifth or sixth rear passages 296, 298 is switched.

The fifth and sixth rear passages 296, 298 extend respectively in the rearward direction (the direction of arrow B) of the vehicle. The fifth rear passage 296 communicates with a second vent blow-out port (not shown), which serves to blow air in the vicinity of faces of passengers in the middle seats in the vehicle. On the other hand, the sixth rear passage 298 communicates with second and third heat blow-out ports (not shown) that serve to blow air in the vicinity of the feet of passengers in the middle and rear seats.

More specifically, air that is supplied from the second blower unit 212 is introduced to the interior of the casing 202 through the second intake port 278. The air then is selectively supplied to a second vent blow-out port, and to the second and third heat blow out ports (not shown), which are capable of blowing air to the middle seats and rear seats in the vehicle, through the first through sixth rear passages 280, 286, 290, 292, 296, 298, under rotary actions of the second air mixing damper 294 and the mode switching damper 300 that constitute the damper mechanism 214.

Moreover, because the aforementioned second to seventh front passages 232, 234, 236, 250, 256, 258 and the second rear passage 286 are divided in half at a substantially central portion of the casing 202 by the center plate 219, the second to seventh front passages 232, 234, 236, 250, 256, 258 and the second rear passage 286 are disposed respectively in the interiors of the first and second divided casings 216, 218.

The vehicular air conditioning apparatus 200 according to the first embodiment of the present invention is basically constructed as described above. Next, explanations shall be made concerning operations and effects of the present invention.

First, when operation of the vehicular air conditioning apparatus 200 is started, the first blower fan 272 of the first blower unit 206 is rotated upon supply of electricity with respect to a non-illustrated rotary drive source, and air (interior or exterior air) that is taken in through the duct 266 or the like is supplied to the first front passage 224 of the casing 202 through the connection duct 204. Simultaneously, air (interior air) that is taken in by rotation of the second blower fan 282 of the second blower unit 212 upon supply of electricity with respect to a non-illustrated rotary drive source is supplied to the first rear passage 280 from the blower case 274 while passing through the second intake port 278. In the following descriptions, the air supplied to the interior of the casing 202 by the first blower fan 272 shall be referred to as "first air," and the air supplied to the interior of the casing 202 by the second blower fan 282 shall be referred to as "second air."

The first air and the second air supplied to the interior of the casing 202 are each cooled by passing respectively through the first and second cooling sections 228, 230 of the evaporator 208, and flow respectively as chilled air to the second front passage 232 and the second rear passage 286, in which the first air mixing damper 238 and the communication switching dampers 288a, 288b are disposed. In this case, because the interior of the evaporator 208 is divided into the first cooling section 228 and the second cooling section 230 by a non-illustrated partitioning means, the first air and the second air do not mix with one another.

Herein, for example, in the case that a vent mode is selected by a vehicle occupant for blowing air in the vicinity of the faces of passengers, due to the first air mixing damper 238 blocking communication between the second front passage 232 and the fourth front passage 236, the first air (cooled air) flows from the second front passage 232 and through the third front passage 234. In this case, since it is unnecessary for warm air that is supplied to the fifth front passage 250 to be mixed with respect to the cool air in the third front passage 234, the temperature control dampers 252a, 252b are rotated so as to be substantially parallel with the third front passage 234, thereby blocking communication between the fifth front passage 250 and the third front passage 234. In addition, since the vent damper 244 is rotated and communication between the third front passage 234 and the sixth front passage 256 is blocked, the first air (cooled air) that flows into the third front passage 234 is blown out from the opened first vent blow-out port 242 in the vicinity of the faces of passengers in the front seats in the vehicle compartment.

On the other hand, since the communication switching dampers 288a, 288b block communication between the second front passage 232 and the second rear passage 286, the second air (cooled air) flows from the second rear passage 286 and to the third rear passage 290. Furthermore, because the second air mixing damper 294 blocks the flow of second air to the heater core 210, the second air (cooled air) flows from the third rear passage 290, passing through the fourth rear passage 292, and to the downstream side. Additionally, under a switching action of the mode switching damper 300, second air (cooled air) that passes through the fifth rear passage 296 is blown from a second vent blow-out port (not shown) in the vicinity of the faces of passengers in the middle seats in the vehicle compartment.

Further, for example, in the vent mode, in the case that the vehicle compartment is to be cooled rapidly, the temperature control dampers 252a, 252b are rotated to become substantially parallel with the third front passage 234 and to block communication between the fifth front passage 250 and the third front passage 234. As a result, cooled air in the third front passage 234 can be supplied to the first vent blow-out port 242 without being raised in temperature. In addition, because the temperature control dampers 252a, 252b suppress flow passage resistance when cool air flows through the third front passage 234, low electrical power consumption of the first blower fan 272 is realized, along with reducing noise. Furthermore, the cooling vent damper 240, by establishing communication between the second front passage 232 and the third front passage 234, increases the blowing rate of the first air (cooled air) that flows from the second front passage 232 to the third front passage 234, thereby enabling the vehicle compartment to be cooled rapidly by the first air, which is blown out from the first vent blow-out port 242 and the second vent blow-out port (not shown).

Next, in the case that a bi-level mode is selected for blowing air in the vicinity of faces and feet of passengers in the vehicle compartment, the first air mixing damper 238 is rotated somewhat more toward the side of the third front passage 234 than the position thereof during the aforementioned vent mode. Furthermore, the temperature control dampers 252a, 252b are rotated, whereupon air heated by the heater core 210 is supplied into the third front passage 234 from the fifth front passage 250. At this time, the vent damper 244 is positioned at an intermediate position between the first vent blow-out port 242 and the opening of the sixth front passage 256, while the defroster blow-out port 260 is blocked by the defroster damper 262.

Further, one end of the temperature control dampers 252a, 252b, which are made up of butterfly valves, projects about the support shaft toward the side of the third front passage 234 (in the direction of arrow A), whereas the lower end side thereof is rotated to project toward the side of the fifth front passage 250 (in the direction of arrow B), and is tilted at a predetermined angle such that the third front passage 234 side thereof is inclined upwardly, and the fifth front passage 250 side thereof is inclined downwardly. Owing thereto, warm air is guided to the rearward side in the third front passage 234 along the temperature control dampers 252a, 252b, and the warm air, without being mixed with cooled air, is supplied to the heat passage 264 from the opened sixth front passage 256 and through the seventh front passage 258, and then is blown out in the vicinity of the feet of passengers riding in the front seats in the vehicle compartment from a first heat blow-out port (not shown).

On the other hand, because the first vent blow-out port 242 is disposed upwardly of the third front passage 234, a portion of the first air (cooled air) that passes through the evaporator 208 and is supplied from the second front passage 232 to the third front passage 234 is blown in the vicinity of the faces of passengers directly from the first vent blow-out port 242, without being mixed with the heated air.

More specifically, in the bi-level mode, because warm air can be guided suitably by the temperature control dampers 252a, 252b effectively to the side of the sixth front passage 256 that communicates with the first heat blow-out port (not shown), lowering in temperature of the warm air by mixing with cooled air can be suppressed. In addition, rising in temperature of the cooled air by mixing with the heated air can be suppressed as well. As a result, the temperature difference between the mixed air that is blown in the vicinity of faces of the passengers from the first vent blow-out port 242 and the mixed air that is blown in the vicinity of the feet of passengers from the first heat blow-out port is made greater, and comfort can be enhanced.

Furthermore, at the same time, the second air mixing damper 294 is rotated in a direction to separate slightly away from the heater core 210, and moreover, the mode switching damper 300 is rotated to an intermediate position in the interior of the fourth rear passage 292. Additionally, concerning the second air, warm air that is heated by the heater core 210, and cooled air that is supplied from the third rear passage 290 to the fourth rear passage 292 through the opening are mixed together. The mixed air, after passing through the second vent blow-out port (not shown) from the fifth rear passage 296, is blown out in the vicinity of faces of passengers riding in the middle seats in the vehicle compartment, and together therewith, after passing through the second and third heat blow-out ports (not shown) from the sixth rear passage 298, is blown out in the vicinity of the feet of passengers riding in the middle and rear seats in the vehicle compartment.

Moreover, the sub-defroster damper 254 may be rotated so as to establish communication between the fifth front passage 250 and the sixth front passage 256. In accordance therewith, first air is added, which passes through the heater core 210 and is supplied to the sixth front passage 256 via the third front passage 234, and since the first air can be supplied directly into the sixth front passage 256, it is possible to increase the blowing rate of warm air that is blown from the first heat blow-out port (not shown) in the vicinity of the feet of passengers riding in the front seats of the vehicle compartment. Stated otherwise, warm air that is blown in the vicinity of the feet of passengers can be supplied at a more stable temperature.

Next, in the case that a heat mode is selected for blowing air in the vicinity of the feet of passengers in the vehicle compartment, in comparison to the bi-level mode, the first air mixing damper 238 is rotated further to the side of the third front passage 234. Further, the temperature control dampers 252a, 252b are rotated somewhat to place the third front passage 234 and the fifth front passage 250 in communication. Furthermore, the cooling vent damper 240 blocks communication between the second front passage 232 and the third front passage 234, and together therewith, the vent damper 244 and the defroster damper 262 are rotated respectively to block the first vent blow-out port 242 and the defroster blow-out port 260.

Consequently, heated first air that has passed through the heater core 210 is supplied from the fifth front passage 250 to the third front passage 234. First air (cooled air) and first air (heated air) are mixed together in the third front passage 234, whereupon the mixed air flows rearwardly through the sixth and seventh front passages 256, 258, is supplied to the heat passage 264, and is blown out from the non-illustrated first heat blow-out port in the vicinity of the feet of passengers riding in the front seats in the vehicle compartment.

Further, similar to the case of the aforementioned bi-level mode, the sub-defroster damper 254 may be rotated to establish communication between the fifth front passage 250 and the sixth front passage 256. In accordance therewith, since heated air that has passed through the heater core 210 can be supplied directly into the sixth front passage 256, it is possible to increase the blowing rate of the first air that is blown from the first heat blow-out port (not shown).

On the other hand, the second air mixing damper 294 is rotated in a direction to separate further away from the heater core 210 compared to the case of the bi-level mode, and further, the mode switching damper 300 is positioned to block the fifth rear passage 296. Consequently, the second air (mixed air) made up of cooled air and heated air which is mixed in the fourth rear passage 292, after passing through the sixth rear passage 298 from the fourth rear passage 292, is supplied to the second and third heat blow-out ports (not shown), where it is blown in the vicinity of the feet of passengers riding in the middle and rear seats in the vehicle compartment.

Next, an explanation shall be made concerning a heat/defroster mode, in which air is blown in the vicinity of the feet of passengers in the vehicle compartment and in the vicinity of the front window for eliminating fog (condensation) from the front window. In the case that the heat/defroster mode is selected, the defroster damper 262 is rotated in a direction to separate from the defroster blow-out port 260, and together therewith, the first vent blow-out port 242 is blocked by the vent damper 244 (refer to the solid line in FIG. 2). As a result, a portion of the first air (mixed air), which is mixed in the third front passage 234 and the sixth front passage 256, is blown in the vicinity of the front window of the vehicle through the defroster blow-out port 260, while the other portion of the first air (mixed air), after passing through the sixth and seventh front passages 256, 258, is blown in the vicinity of the feet of passengers in the front seats in the vehicle compartment from the heat passage 264 and the first heat blow-out port (not shown).

On the other hand, in the heat/defroster mode, in the case that second air is blown to the middle and rear seats in the vehicle compartment, handling thereof is carried out in the same manner as the above-described heat mode, and therefore detailed descriptions of this aspect of the heat/defroster mode are omitted.

Lastly, an explanation shall be made concerning a defroster mode, in which blowing of air only in the vicinity of the front window is carried out for eliminating fog (condensation) from the front window. In this case, the first air mixing damper 238 and the cooling vent damper 240 block communication between the second front passage 232 and the third front passage 234, and the vent damper 244 is rotated to block the first vent blow-out port 242. Consequently, heated first air that has passed through the heater core 210 is supplied from the fifth front passage 250, past the third front passage 234, and to the sixth front passage 256. Additionally, since the defroster damper 262 is rotated and communication is blocked between the sixth front passage 256 and the seventh front passage 258, the first air (warm air) is supplied from the sixth front passage 256 to the opened defroster blow-out port 260, and is blown in the vicinity of the front window of the vehicle. In this case, the defroster mode can be handled by blowing the first air only, which is supplied from the first blower unit 206, without driving the second blower unit 212.

Further, as mentioned above, under a switching action of the communication switching dampers 288*a*, 288*b*, by placing the second rear passage 286 and the second front passage 232 in communication, second air that is supplied from the second blower unit 212 can also be used for carrying out the defroster mode, by supplying the second air to the second front passage 232.

Still further, as mentioned above, by rotating the sub-defroster damper 254 in a direction to separate away from the sixth front passage 256, and thus directly placing the fifth front passage 250 and the sixth front passage 256 in communication, heated air that has passed through the heater core 210 may be supplied directly into the sixth front passage 256 without flowing through the third front passage 234. Consequently, the amount of warm air that is introduced to the sixth front passage 256 can be increased, and the blowing rate of air that is blown out from the defroster blow-out port 260 can be increased advantageously.

In the foregoing manner, according to the first embodiment, because the bottom surfaces 216*a*, 218*a* of the first and second divided casings 216, 218 are configured in an inclined manner, the size in the vertical direction of the casing 202 can be reduced as much as possible, while moisture that falls onto the bottom surfaces 216*a*, 218*a* is guided to the drain ports 226*a*, 226*b* and such moisture can be discharged efficiently to the exterior of the casing 202. Furthermore, during assembly thereof, even in the case that the casing 202 is positioned on the floor or the like, since the pair of first drain ports 226*a*, 226*b* which project from the bottom of the casing 202 are disposed in a pair, the drain ports 226*a*, 226*b* can be affixed stably as leg portions.

Figure 11:
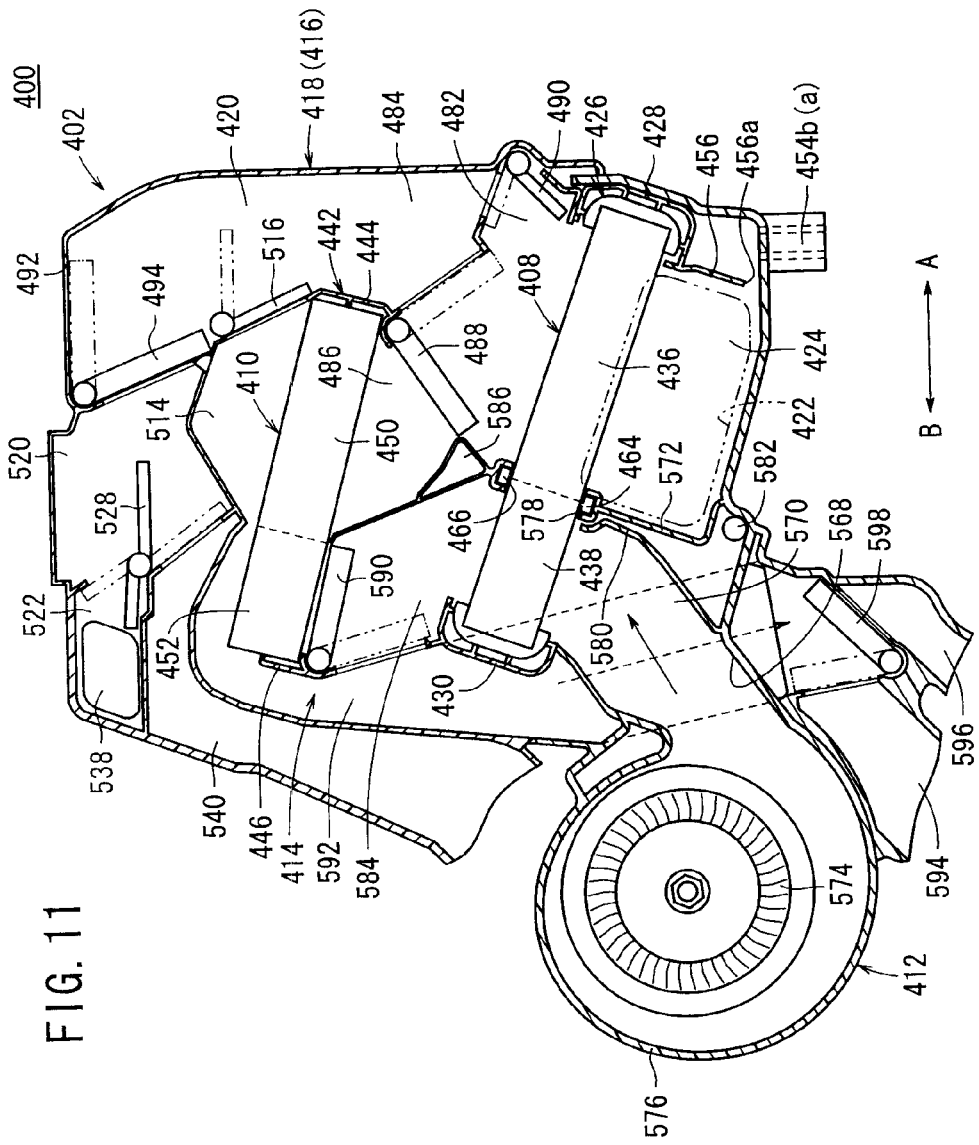
FIG. 11 is a cross sectional view taken along line XI-XI of FIG. 10.
Figure 12:
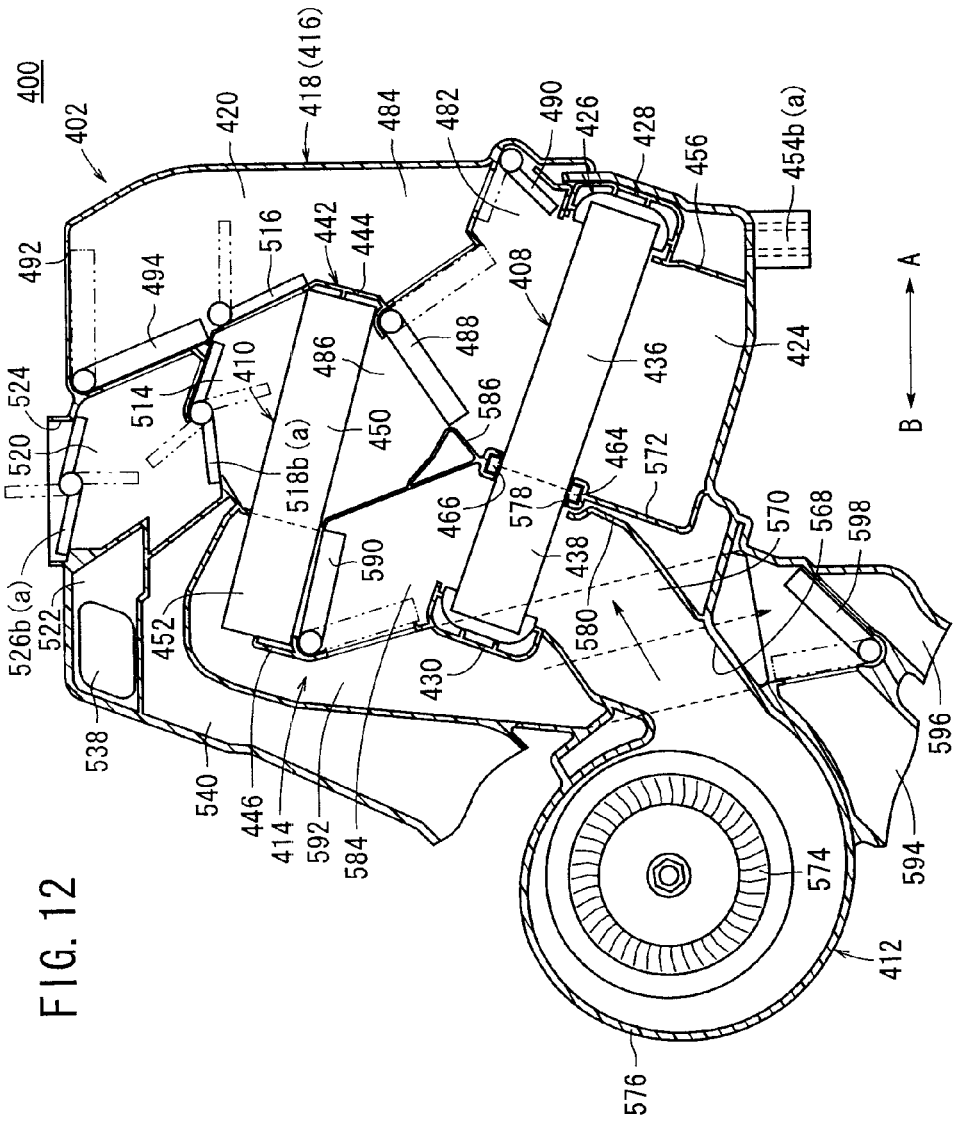
FIG. 12 is a cross sectional view taken along line XII-XII of FIG. 10.
Figure 13:
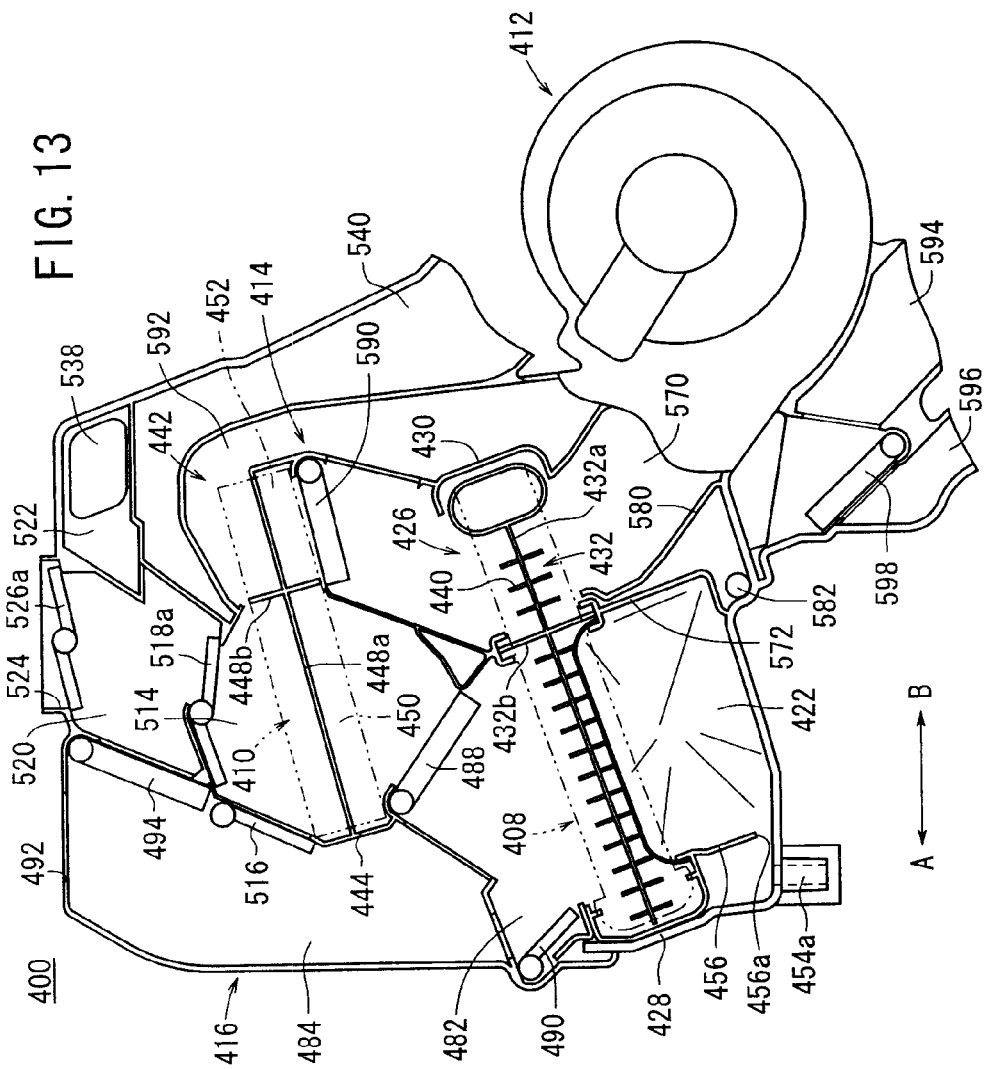
FIG. 13 is a side view of a first divided casing as seen from an interior side thereof.
Figure 14:
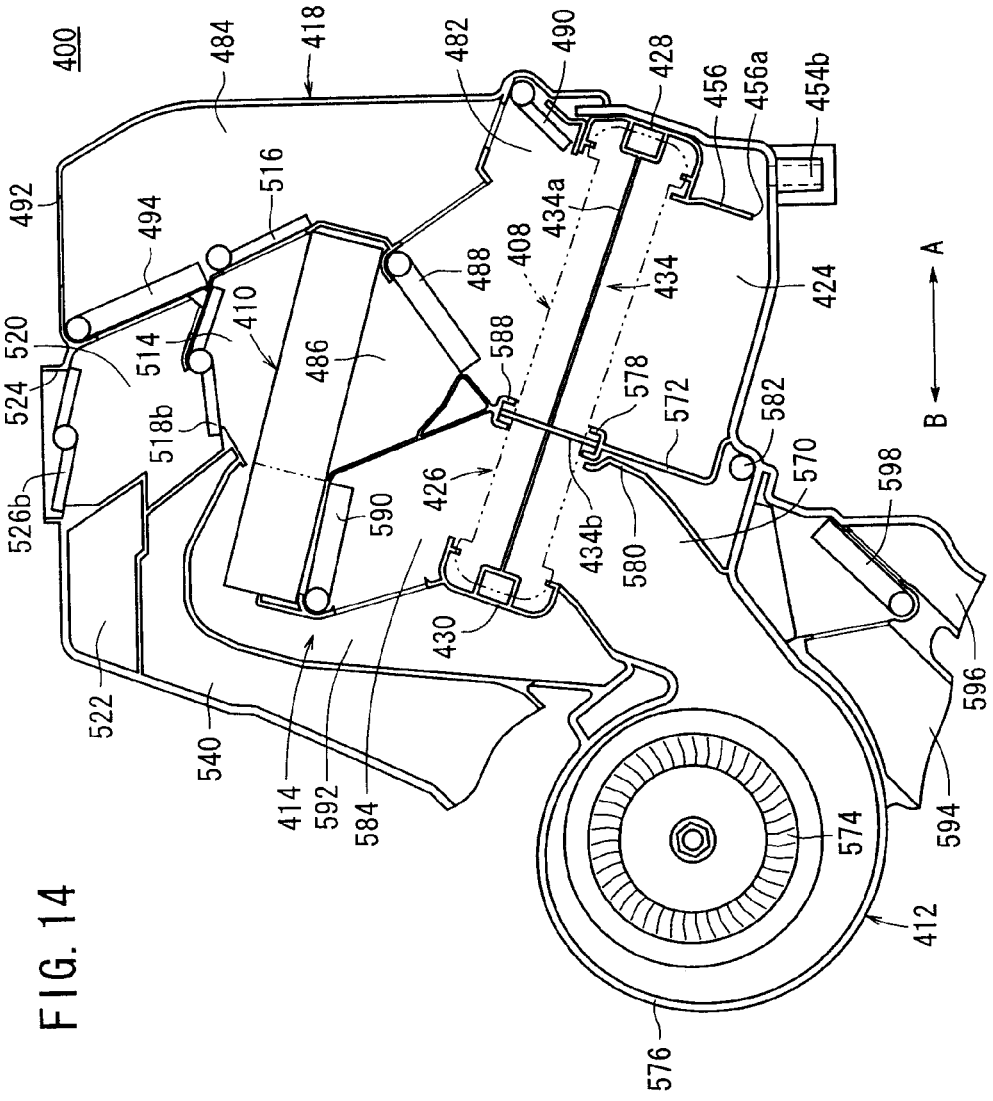
FIG. 14 is a side view of a second divided casing as seen from an interior side thereof.

Next, a vehicular air conditioning apparatus 400 according to a second embodiment is shown in FIGS. 10 to 53. FIG. 11 is a cross sectional view in a central portion (taken along line XI-XI in FIG. 10) along the widthwise direction of a vehicular air conditioning apparatus 400, whereas FIG. 12 is a cross sectional view of a region (taken along line XII-XII in FIG. 10) somewhat deviated to the side of a second divided casing 418 from the aforementioned central portion.

As shown in FIGS. 10 to 14, the vehicular air conditioning apparatus 400 according to the second embodiment includes a casing 402 constituted by respective air passages, a first blower unit 406 connected through a connection duct 404 to a side portion of the casing 402 for blowing air to the front seats in the vehicle, an evaporator (cooling means) 408 arranged inside the casing 402 for cooling the air, a heater core 410 for heating the air, a second blower unit 412 connected to a lower portion of the casing 402 for blowing air toward the middle seats and rear seats of the vehicle, and a damper mechanism 414 for switching the flow of air that flows through and inside each of the respective passages.

The casing 402 is constituted by first and second divided casings 416, 418 having substantially symmetrical shapes, wherein a center plate 420 (see FIG. 44) is disposed between the first divided casing 416 and the second divided casing 418. The connection duct 404 is connected on a lower side portion of the first divided casing 416, and a first intake port 422 is formed through which air is supplied from the first blower unit 406. The first intake port 422 communicates with a first front passage 424 disposed on an upstream side of the evaporator 408.

Figure 10:
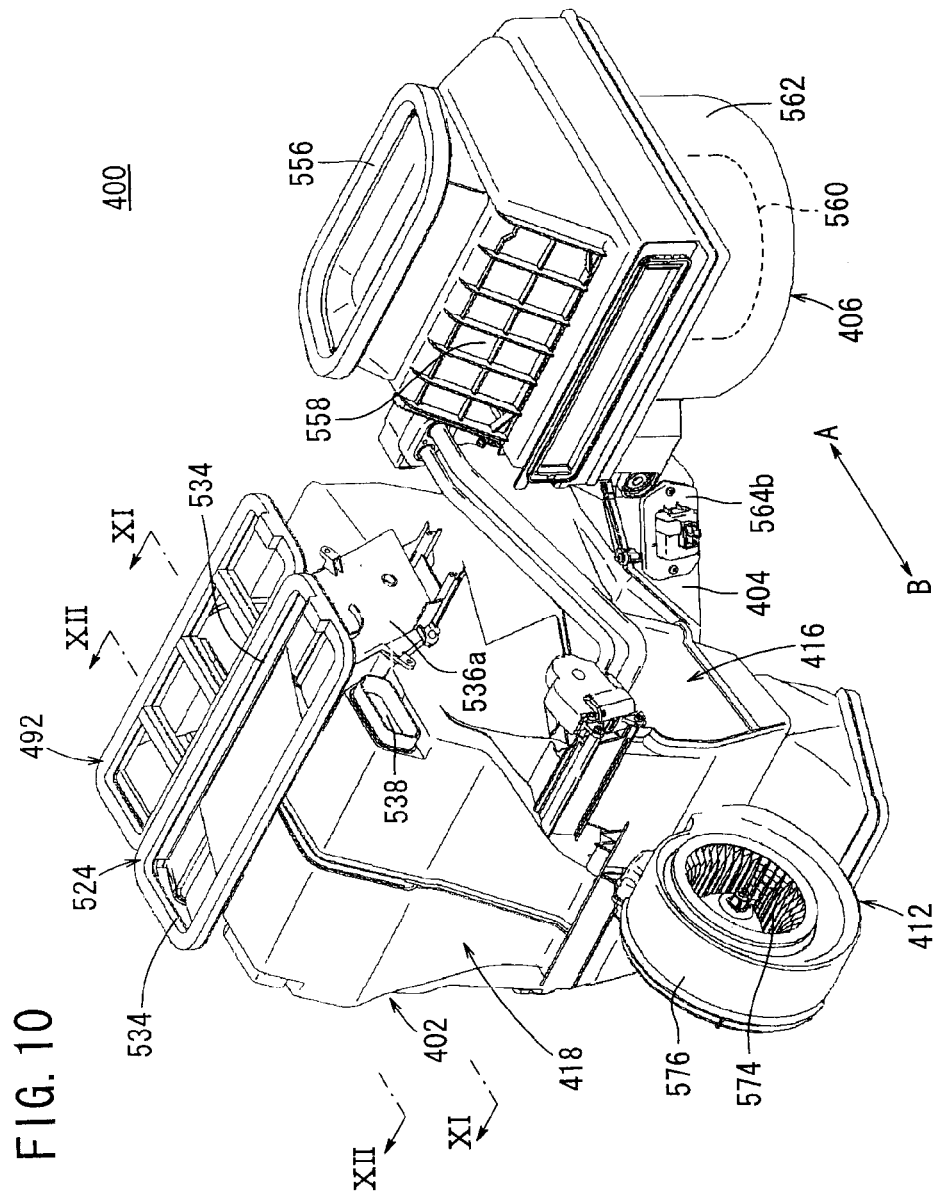
FIG. 10 is an external perspective view of a vehicular air conditioning apparatus according to a second embodiment of the present invention.

As easily understood from FIG. 10, the second blower unit 412 expands outwardly and is disposed at a joined region of the substantially symmetrical first divided casing 416 and second divided casing 418 that make up the casing 402, more specifically, at a center portion of the casing 402. Further, the second blower unit 412 is positioned inside a console of the non-illustrated center vehicle.

As shown in FIGS. 11 to 14, in the first and second divided casings 416, 418, an evaporator holder 426 is formed for maintaining the evaporator 408, which has a rectangular shape in cross section. The evaporator holder 426 is provided on a lower part of the casing 402 facing the first intake port 422. The evaporator holder 426 includes a first retaining member 428 that holds one end of the evaporator 408 that is disposed on the forward side (in the direction of arrow A) of the casing 402, and a second retaining member 430 that holds another end of the evaporator 408 that is disposed on the rearward side (in the direction of arrow B) of the casing 402. The first and second retaining members 428, 430 are formed with U-shapes in cross section, which open toward one another in mutually facing directions, and extend in the widthwise direction of the casing 402, from an inner wall surface of the first divided casing 416 to an inner wall surface of the second divided casing 418.

Further, because the first retaining member 428 confronts the second retaining member 430 and is disposed downwardly with respect to the second retaining member 430, the evaporator 408, which is retained by the first and second retaining members 428, 430, is disposed such that one end thereof in the forward direction of the vehicle (the direction of arrow A) is inclined downward at a predetermined angle with respect to the other end thereof.

Figure 15:
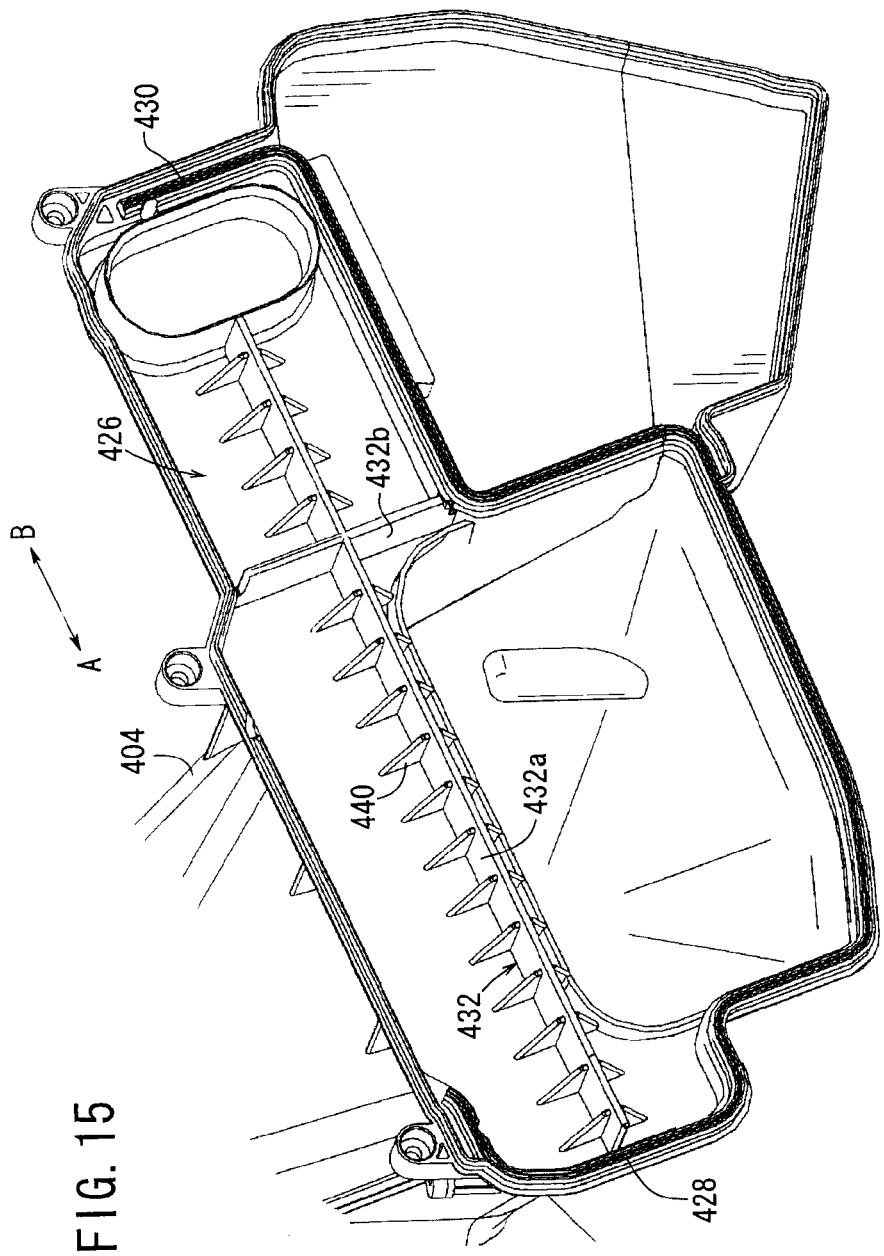
FIG. 15 is an enlarged perspective view of (an evaporator holder of) a connecting duct that fixes an evaporator connected with the first divided casing.
Figure 16:
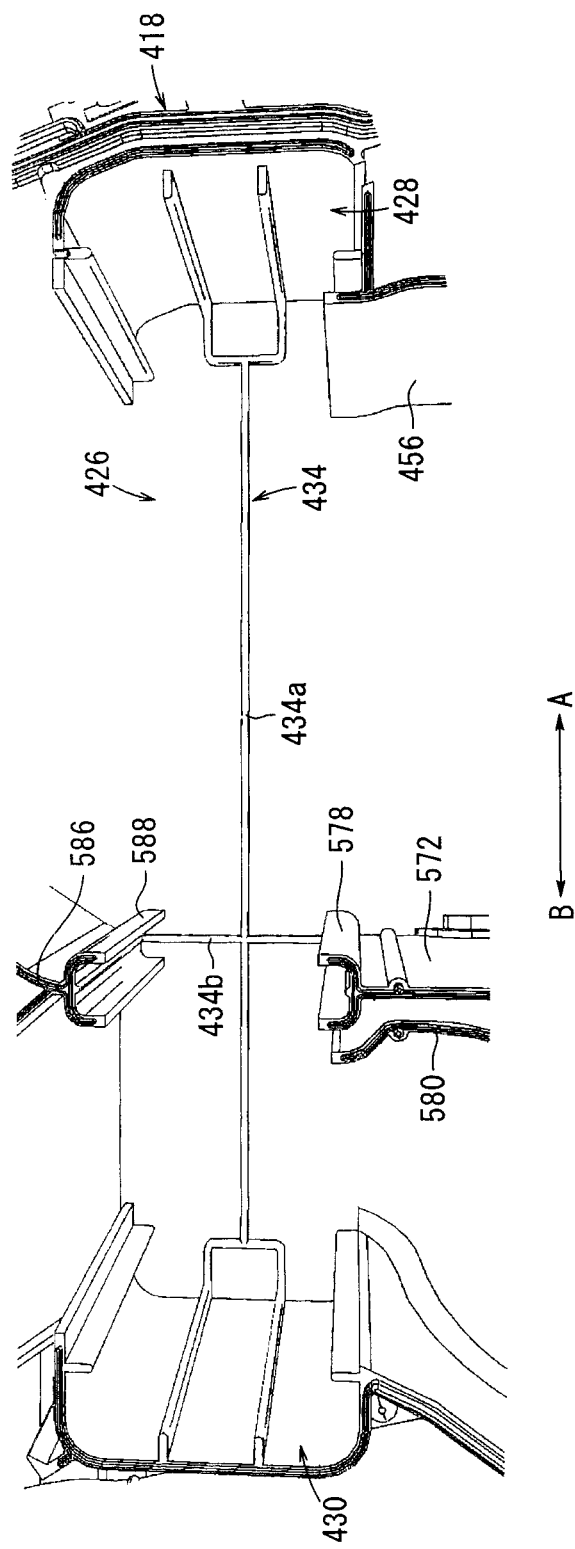
FIG. 16 is an enlarged perspective view of the evaporator holder, which is disposed on an inner wall surface of the second divided casing.
Figure 17:
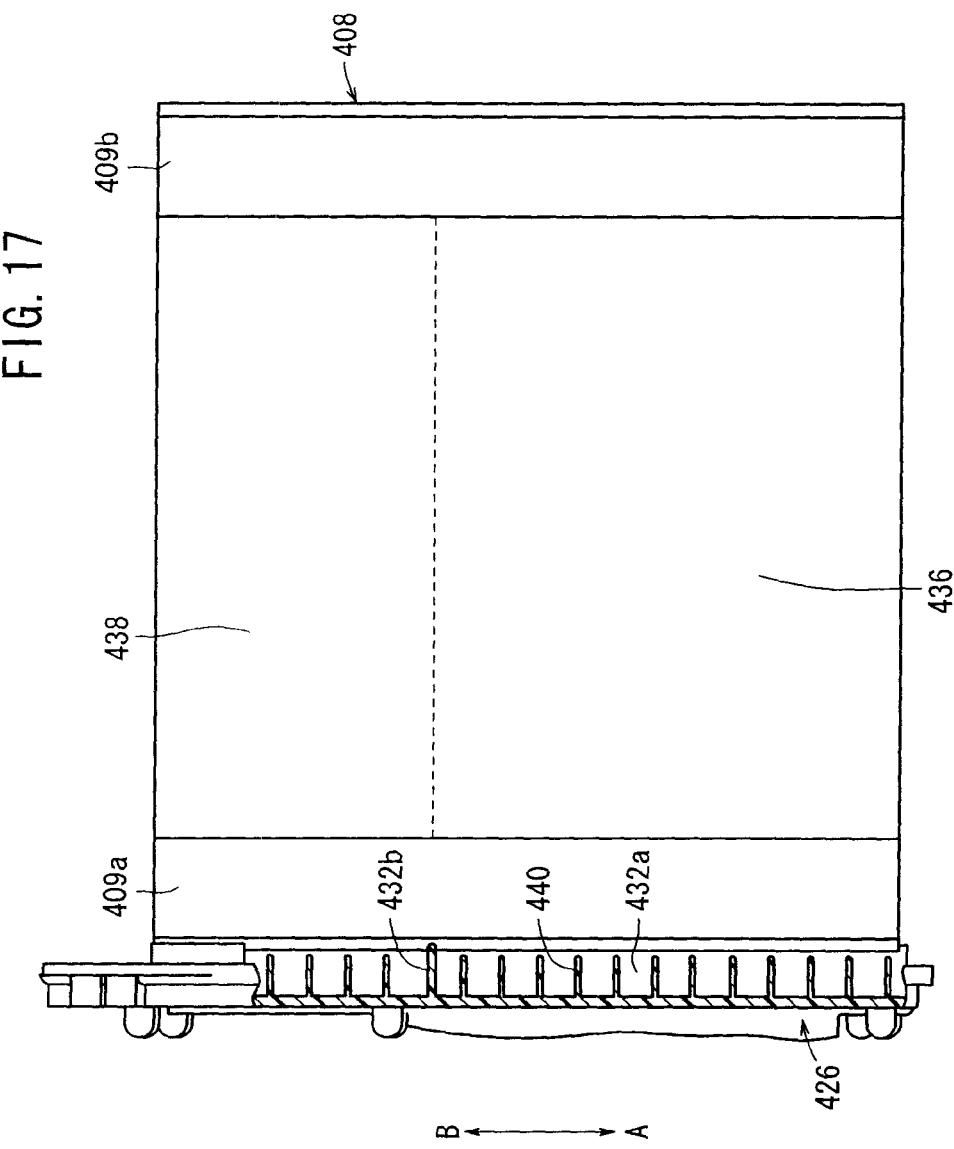
FIG. 17 is a plan view with partial omission showing an evaporator, which is retained on an inner wall surface of the first divided casing.
Figure 18:
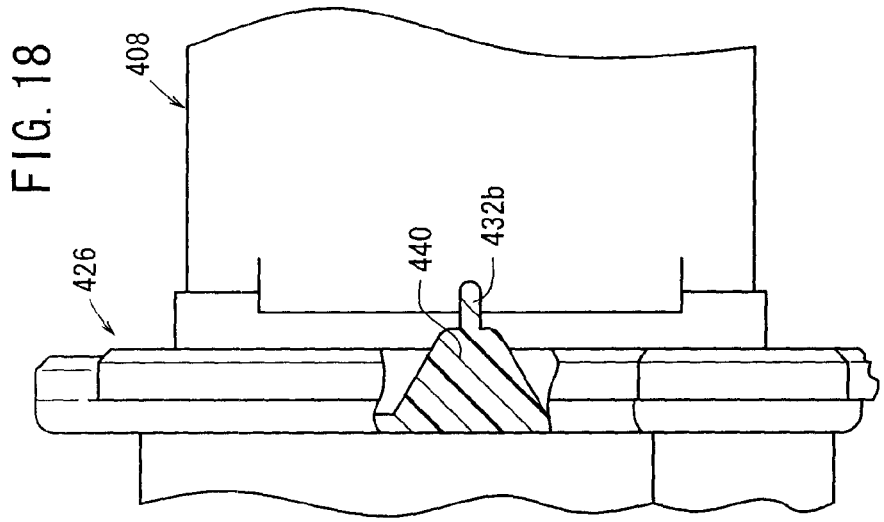
FIG. 18 is a partial enlarged side view of the evaporator of FIG. 17.

As shown in FIG. 15, a first rib 432, which projects a predetermined height from the inner wall surface at a position between the first retaining member 428 and the second retaining member 430, is formed on the inner wall surface of the first divided casing 416, wherein the first rib 432 abuts against one side surface of the evaporator 408. On the other hand, as shown in FIG. 16, a second rib 434, which projects a predetermined height from the inner wall surface of the second divided casing 418 at a position between the first retaining member 428 and the second retaining member 430, is formed on the inner wall surface thereof, confronting the first rib 432, wherein the second rib 434 abuts against the other side surface of the evaporator 408.

The first and second ribs 432, 434 are formed respectively with cross-like shapes, such that horizontal ribs 432a, 434a thereof, which extend from the first retaining member 428 to the second retaining member 430, abut roughly in the center of the evaporator 408 to divide the evaporator 408 in half in the thickness direction thereof. On the other hand, vertical ribs 432b, 434b, which are perpendicular to the horizontal ribs 432a, 434a, abut against a boundary portion in the evaporator 408 of a first cooling section 436 through which air supplied from the first blower unit 406 passes, and a second cooling section 438 through which air supplied from the second blower unit 412 passes (refer to FIG. 17). Further, compared to the second rib 434, the first rib 432 is set to have a greater height from the inner wall surface of the first divided casing 416, and the horizontal rib 432a and vertical rib 432b are formed perpendicularly with respect to the inner wall surface.

More specifically, by abutment of the horizontal ribs 432a, 434a of the first and second ribs 432, 434 against side surfaces of the evaporator 408, air is prevented from flowing to the downstream side between inner wall surfaces of the first and second divided casings 416, 418 and the evaporator 408. On the other hand, by abutment of the vertical ribs 432b, 434b of the first and second ribs 432, 434 against the boundary portion of the first cooling section 436 and the second cooling section 438, air supplied from the first blower unit 406 is prevented from flowing through the side of the second cooling section 438 at times when the second blower unit 412 is halted, and conversely, air supplied from the second blower unit 412 is prevented from flowing through the side of the first cooling section 436 at times when the first blower unit 406 is halted.

Furthermore, on the inner wall surface of the first divided casing 416, a plurality of reinforcement ribs 440 are formed substantially parallel with the vertical ribs 432b. The reinforcement ribs 440 are disposed with respect to upper and lower surface sides of the horizontal rib 432a, and are formed with substantially triangular shapes in cross section, which taper in a direction away from the inner wall surface (see FIGS. 15 and 18).

Further, as shown in FIGS. 11 and 12, on the first and second divided casings 416, 418, a heater holder 442 is formed for maintaining a heater, which has a rectangular shape in cross section. The heater holder 442 is provided upwardly of the evaporator holder 426. The heater holder 442 includes a first retaining member 444 that holds one end of the heater core 410 that is disposed on the forward side (in the direction of arrow A) of the casing 402, and a second retaining member 446 that holds another end of the heater core 410 that is disposed on the rearward side (in the direction of arrow B) of the casing 402. The first retaining member 444 is formed to cover one end portion of the heater core 410, whereas the second retaining member 446 is formed to cover a lower half part only of the other end of the heater core 410. The first and second retaining members 444, 446 extend along the widthwise direction of the casing 402, from an inner wall surface of the first divided casing 416 to an inner wall surface of the second divided casing 418.

Further, because the first retaining member 444 confronts the second retaining member 446 and is disposed downwardly with respect to the second retaining member 446, the heater core 410, which is retained by the first and second retaining members 444, 446, is disposed such that one end thereof in the forward direction of the vehicle (the direction of arrow A) is inclined downward at a predetermined angle with respect to the other end thereof.

Figure 19:
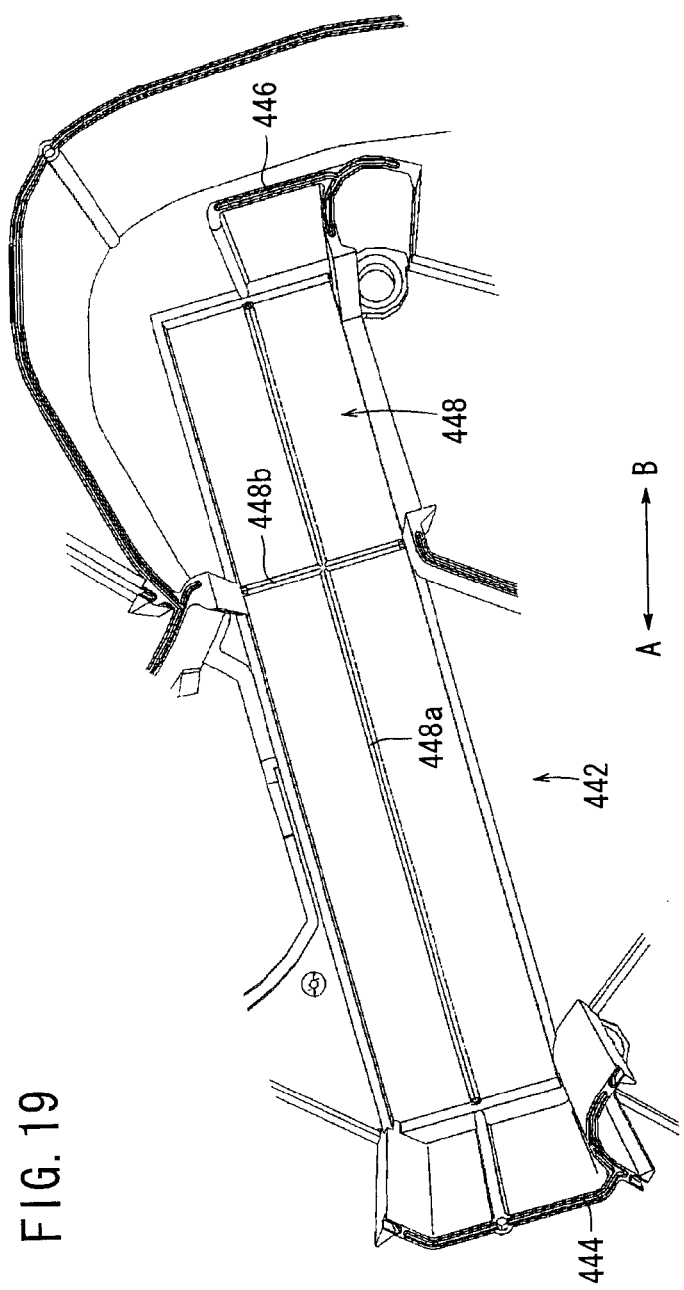
FIG. 19 is an enlarged perspective view of a heater holder disposed on an inside wall surface of the first divided casing.

Furthermore, as shown in FIG. 19, a rib 448, which projects a predetermined height from the inner wall surface at a position between the first retaining member 444 and the second retaining member 446, is formed on the inner wall surface of the first divided casing 416, such that the rib 448 abuts against one side surface of the heater core 410. The rib 448 is formed with a cross-like shape, such that a horizontal rib 448a thereof, which extends from the first retaining member 444 to the second retaining member 446, abuts roughly in the center of the heater core 410 to divide the heater core 410 in half in the thickness direction thereof. On the other hand, a vertical rib 448b, which is perpendicular to the horizontal rib 448a, abuts against a boundary portion in the heater core 410 of a first heating section 450 through which air supplied from the first blower unit 406 passes, and a second heating section 452 through which air supplied from the second blower unit 412 passes (refer to FIG. 13). Further, in the second divided casing 418, a region thereof opens in a direction facing toward the heater core 410.

More specifically, by abutment of the horizontal rib 448a of the rib 448 against a side surface of the heater core 410, air is prevented from flowing to the downstream side between the inner wall surface of the first divided casing 416 and the heater core 410. At the same time, by abutment of the vertical rib 448b against the boundary portion of the first heating section 450 and the second heating section 452, air supplied from the first blower unit 406 is prevented from flowing through the side of the second heating section 452 at times when the second blower unit 412 is halted, and conversely, air supplied from the second blower unit 412 is prevented from flowing through the side of the first heating section 450 at times when the first blower unit 406 is halted.

Moreover, reinforcement ribs similar to the reinforcement ribs 440 provided on the evaporator holder 426 may also be provided on the heater holder 442. More specifically, by providing such reinforcement ribs substantially parallel with the vertical rib 448b, strength of the horizontal rib 448a can be increased and the heater core 410 can be supported more firmly, while leakage of air between the heater core 410 and the first and second divided casings 416, 418 can be prevented.

Figure 20:
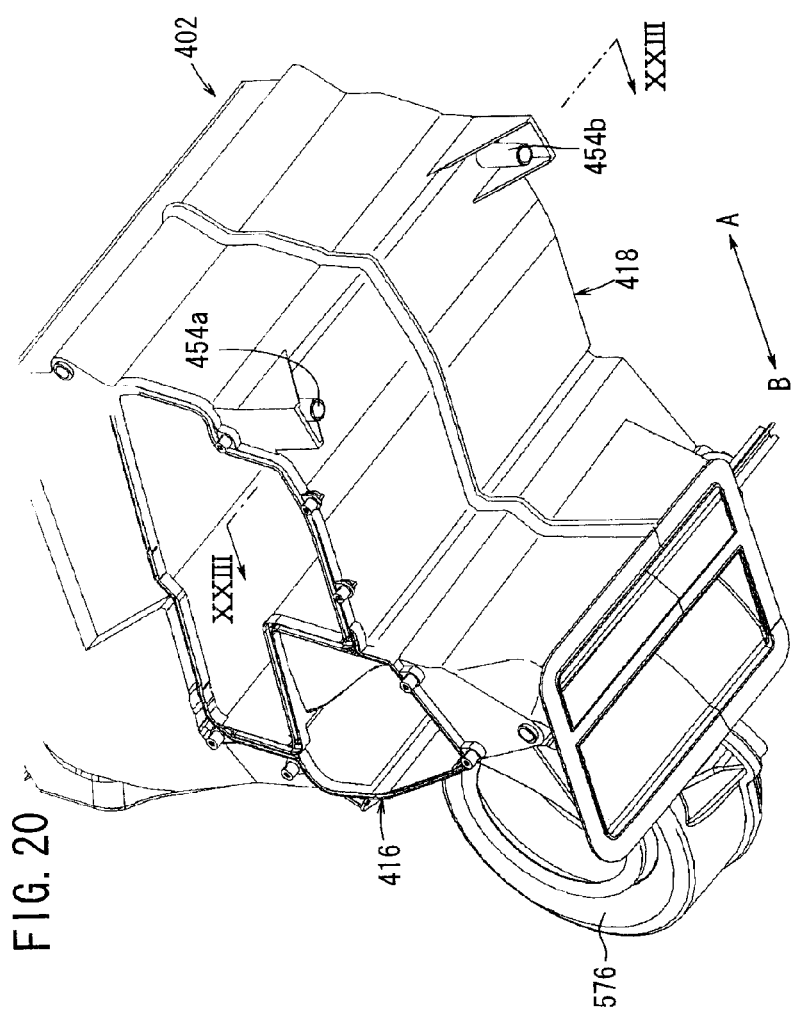
FIG. 20 is an enlarged perspective view showing the vicinity of a bottom portion of a casing in which a pair of drain ports is formed.
Figure 21:
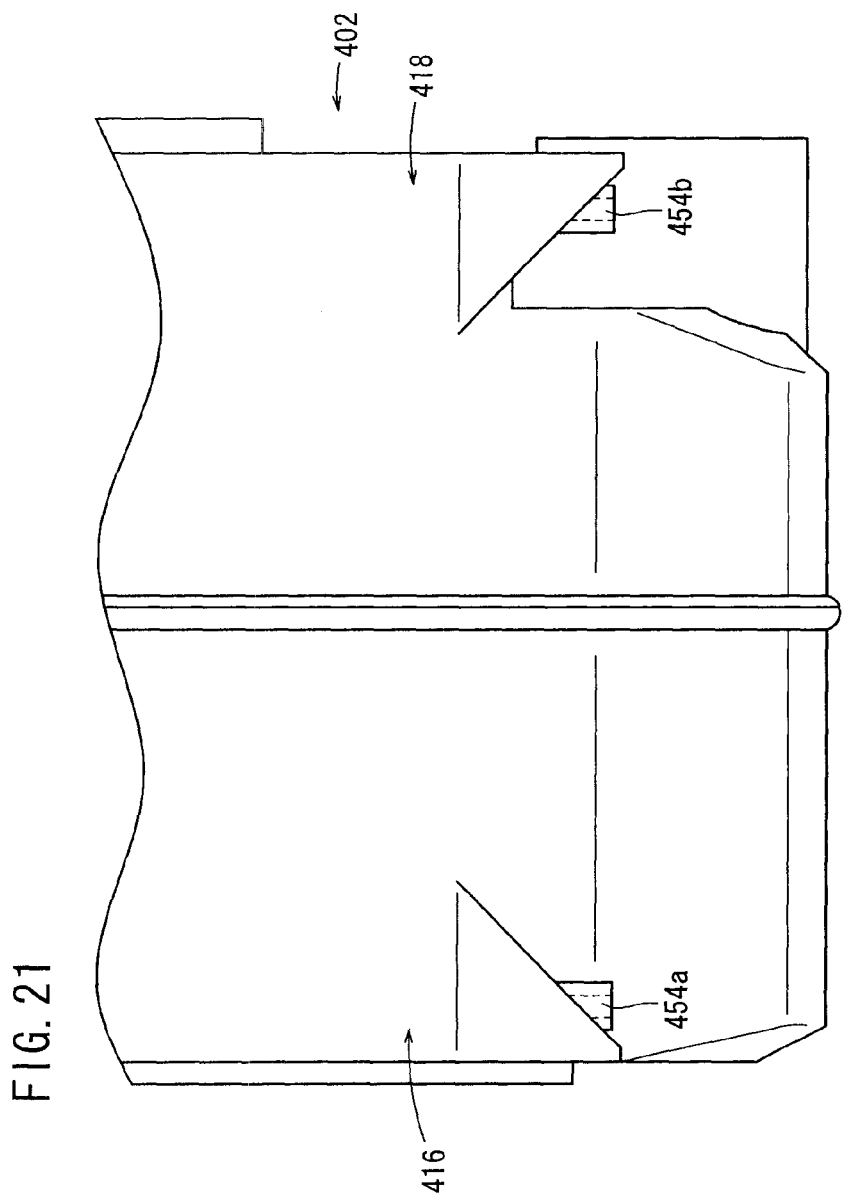
FIG. 21 is an enlarged frontal view of the vicinity of a bottom portion of the casing shown in FIG. 20.
Figure 22:
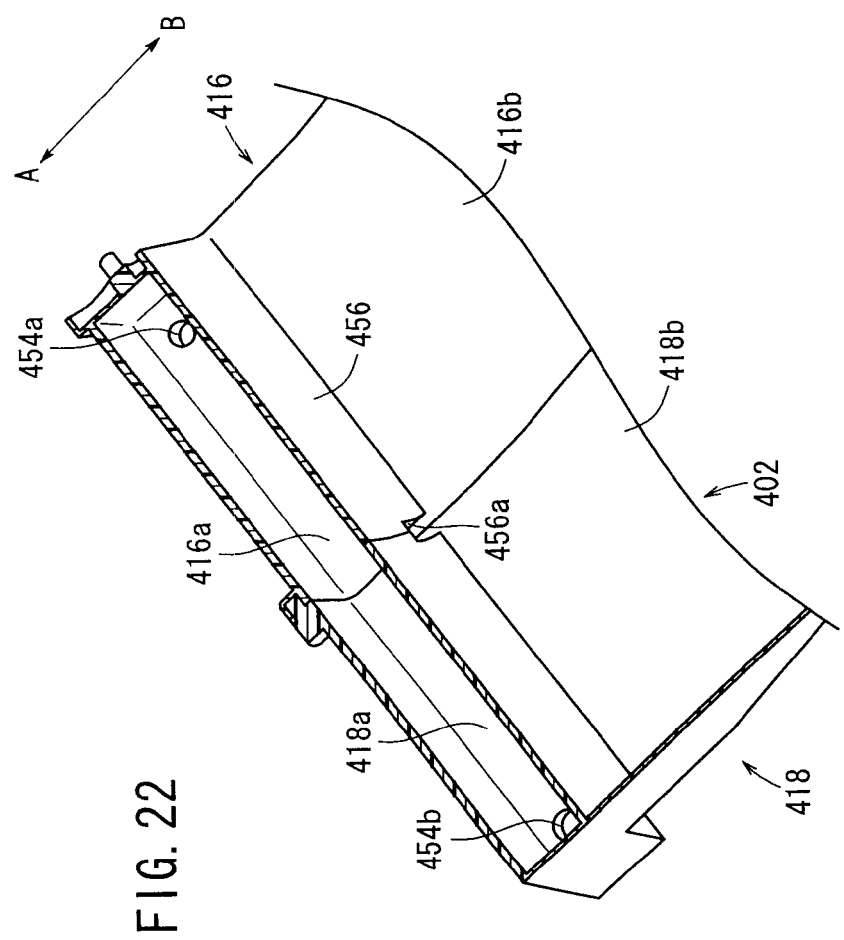
FIG. 22 is an enlarged perspective view of the vicinity of a bottom portion of the casing shown in FIG. 20 as seen from an inner side of the casing.
Figure 23:
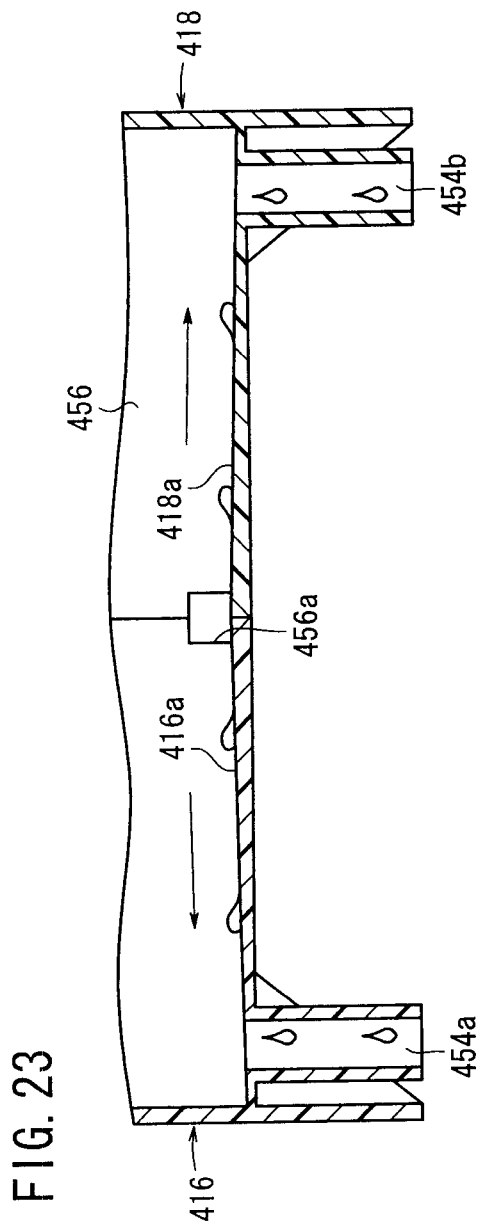
FIG. 23 is a cross sectional view taken along line XXIII-XXIII of FIG. 20.

On the other hand, as shown in FIGS. 11 and 20, the bottom portion of the casing 402 is formed such that the front side thereof (in the direction of arrow A) is lowest, with a pair of first drain ports 454a, 454b being disposed at this location. The first drain ports 454a, 454b are formed in tubular shapes and extend in vertically downward directions from forward bottom surfaces 416a, 418a on a forward side (the direction of arrow A) from a first guide panel 456 in the first and second divided casings 416, 418. Further, the first drain ports 454a, 454b are disposed in the vicinity of opposite side portions, mutually separated in the widthwise direction of the casing 402, and communicate from the interior of the casing 402 to the exterior thereof.

Further, as shown in FIGS. 11 to 14, on the bottom portion of the casing 402, the first guide panel 456 is formed, which faces toward the first front passage 424 on a forward side (in the direction of arrow A) adjacent to the first drain ports 454a, 454b. The first guide panel 456 is arranged in an upstanding manner along the extending direction of the first front passage 424. An upper end part thereof extends to the vicinity of the lower surface of the evaporator 408, and is bent in a direction (the direction of arrow B) separating from the evaporator holder 426 that retains the evaporator 408.

Owing thereto, in the evaporator 408, for example, although water condensation is generated when air passing through the interior of the evaporator 408 is cooled, because one end side thereof is disposed to be inclined downwardly at a predetermined angle, moisture that is generated inside the evaporator 408 can be moved to one end side, i.e., the front side of the vehicle (in the direction of arrow A), along the lower surface of the evaporator 408.

Further, when the moisture moves along the lower surface of the evaporator 408, it comes into contact with the upper end of the first guide panel 456 and is guided downwardly along the first guide panel 456, and falls onto rearward bottom surfaces 416b, 418b (see FIG. 22) that form a bottom surface between the first guide panel 456 and a first dividing wall 572 in the first and second divided casings 416, 418. In addition, the fallen moisture is guided to the forward bottom surfaces 416a, 418a of the first and second divided casings 416, 418 through a hole 456a disposed at a bottom part of the first guide panel 456 (see FIG. 22). Since the first drain ports 454a, 454b are disposed at positions where inclined surfaces of the forward bottom surfaces 416a, 418a, which gradually decline toward opposite side portions of the casing 402, terminate (see FIG. 23), moisture that is guided toward the forward bottom surfaces 416a, 418a is directed suitably to the first drain ports 454a, 454b and is discharged to the exterior.

In this case, although the rearward bottom surfaces 416b, 418b are inclined downwardly toward the hole 456a such that fallen moisture is guided suitably to the hole 456a, the inclination of the rearward bottom surfaces 416b, 418b is not strictly limited to this form.

Further, in this manner, since the first drain ports 454a, 454b are disposed at positions where inclined surfaces on the forward bottom surfaces 416a, 418a, which gradually decline toward opposite side portions of the casing 402, terminate, compared to a structure in which the forward bottom surfaces 416a, 418a are inclined in one direction in the widthwise direction of the vehicle, the size in the vertical direction of the casing 402 can be reduced as much as possible. Also, in FIG. 19, although only one hole 456a is provided, the invention is not necessarily limited to this feature, and two or more of such holes may also be provided.

Owing thereto, accumulation and retention of moisture discharged from the evaporator 408 within the first front passage 424, thus becoming a cause of foul odors, and further, leakage of moisture into the interior of the vehicle compartment, are prevented.

Moreover, the first drain ports 454a, 454b are not limited to being provided in a pair, and three or more drain ports may also be provided.

Further, even in the case that the casing 402 is mounted on the floor or the like before the vehicular air conditioning apparatus 400 is installed in the vehicle, since the pair of first drain ports 454a, 454b which project from the bottom of the casing 402 are disposed in a pair, the first drain ports 454a, 454b can be mounted stably as leg portions. Owing thereto, when components such as the first and second blower units 406, 412 are assembled onto the casing 402, such assembly can be performed easily without requiring a specialized jig or the like.

Figure 24:
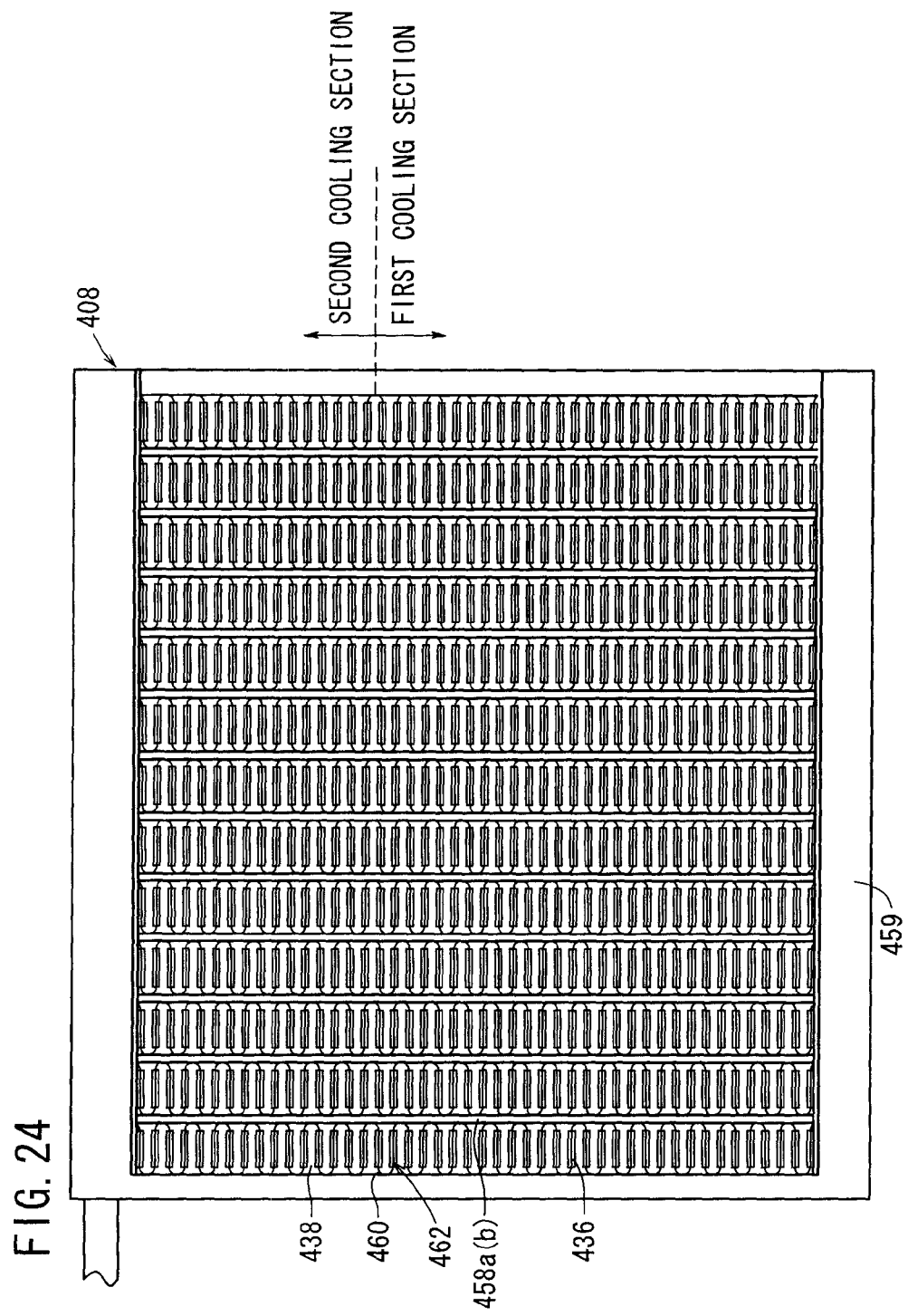
FIG. 24 is a plan view of an evaporator.

As shown in FIG. 24, in the evaporator 408, for example, tubes 458a, 458b are formed from thin plates of aluminum or the like, and fins 460, which are folded in a serpentine-like undulating shape, are disposed respectively between the stacked tubes 458a, 458b. On the fins 460, a plurality of louvers 462 are formed, which are cut out so as to be inclined at predetermined angles with respect to the planar surface of the fins 460. By causing a coolant medium to flow through the interior of the tubes 458a, 458b, air that passes through the louvers 462 and flows between the fins 460 is cooled by the coolant medium and is supplied to the downstream side as chilled air. At the evaporator 408, the paired tubes 458a, 458b are arrayed in parallel and arranged in two layers in the thickness direction of the evaporator 408.

Further, the evaporator 408 includes the first cooling section 436, which cools air supplied from the first blower unit 406, and the second cooling section 438, which cools air supplied from the second blower unit 412. Additionally, the first cooling section 436 is arranged in the forward direction (the direction of arrow A) of the casing 402, whereas the second cooling section 438 is arranged in the rearward direction (the direction of arrow B) of the casing 402.

Figure 25:
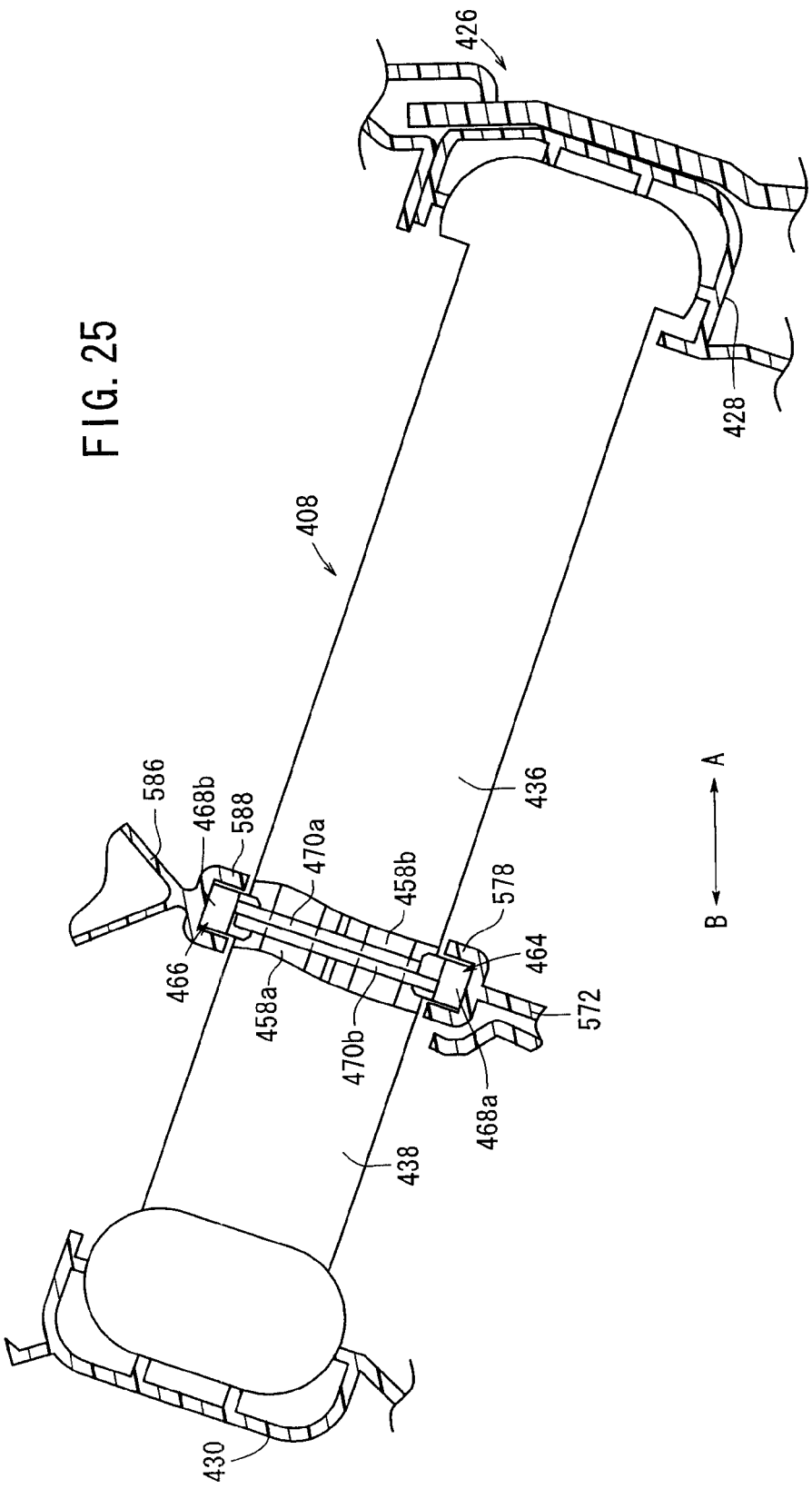
FIG. 25 is an enlarged side view showing a condition in which the evaporator of FIG. 24 is retained in an evaporator holder, and further wherein first and second partitioning members are installed thereon.
Figure 26:
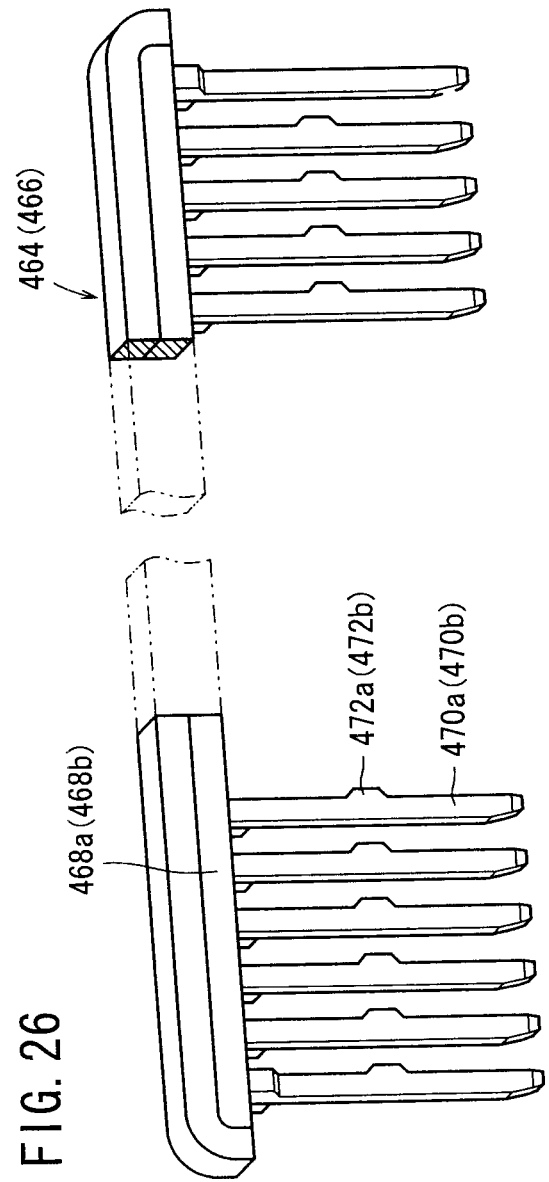
FIG. 26 is a perspective view with partial omission of the first and second partitioning members shown in FIG. 25.
Figure 27:
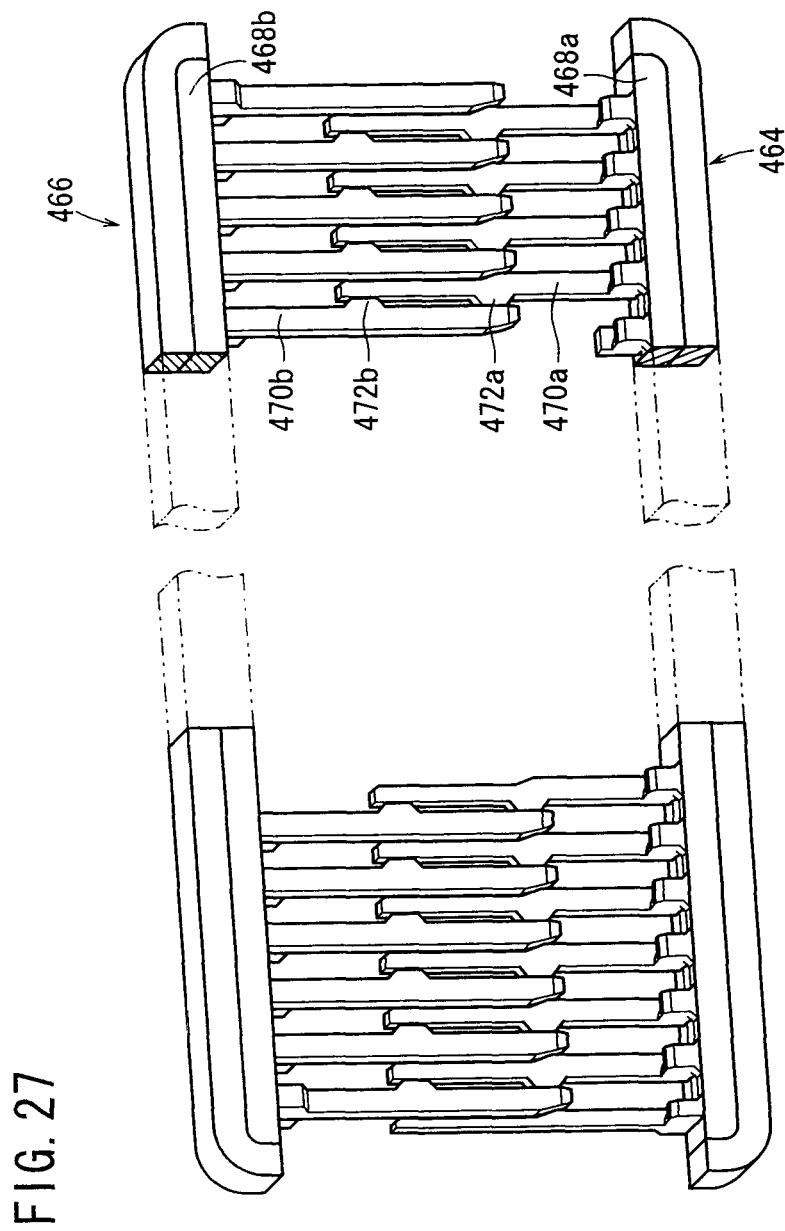
FIG. 27 is a perspective view with partial omission showing a condition during assembly of the first partitioning member and the second partitioning member.
Figure 28:
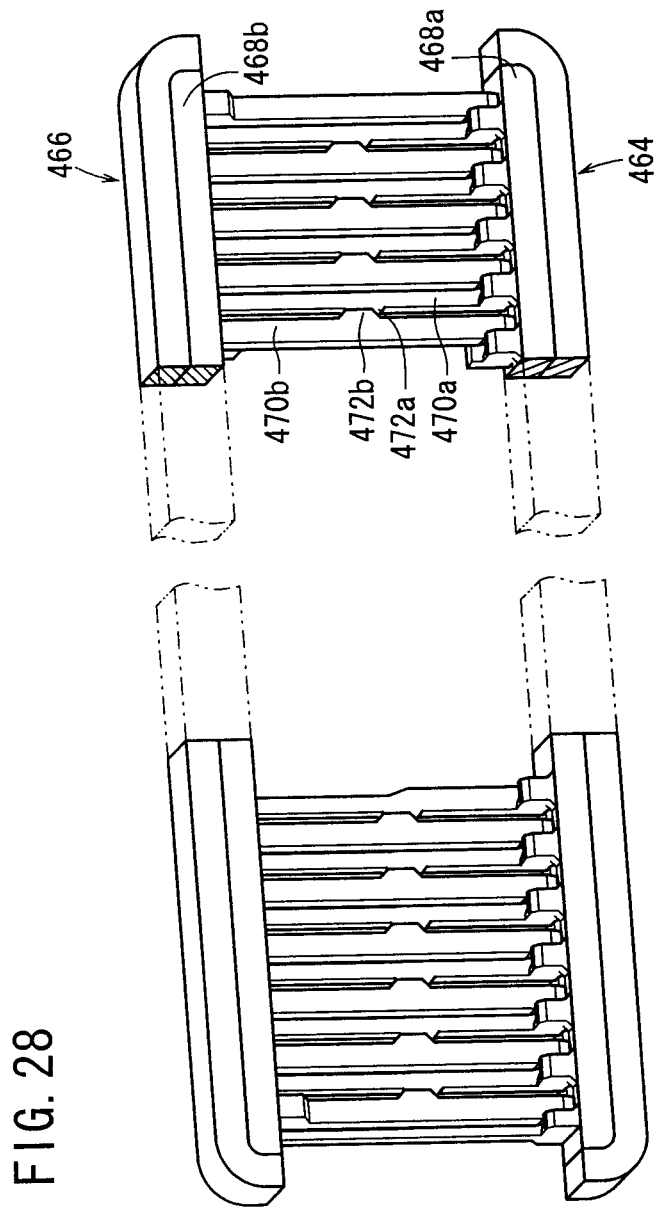
FIG. 28 is a perspective view with partial omission showing an evaporator installed state, in which the first partitioning member and the second partitioning member shown in FIG. 27 are completely assembled.

At the boundary region between the first cooling section 436 and the second cooling section 438, as shown in FIG. 25, a pair of first and second partitioning members 464, 466 are installed for blocking communication of air between the first cooling section 436 and the second cooling section 438. As shown in FIGS. 26 to 28, the first and second partitioning members 464, 466 are formed from a resin material, for example, and are equipped with straightly formed base portions 468a, 468b, and a plurality of sealing portions 470a, 470b, which project at a predetermined length from the lower surface of the base portions 468a, 468b. Also, projections 472a, 472b are formed thereon, which project in a direction perpendicular to the lengthwise direction, centrally along the lengthwise direction of the sealing portions 470a, 470b. The sealing portions 470a, 470b are formed with the same length, and are disposed so as to be separated mutually at equal intervals along the base portions 468a, 468b. Further, the projections 472a, 472b project in the same directions with respect to the sealing portions 470a, 470b.

Additionally, as shown in FIG. 25, the first partitioning member 464 is mounted on a lower surface side of the evaporator 408 on the upstream side thereof, such that the sealing portions 470a thereof are inserted respectively between the stacked tubes 458a, 458b in the evaporator 408, and the base portion 468a abuts against the lower surface. On the other hand, the second partitioning member 466 is mounted on an upper surface side of the evaporator 408 on the downstream side thereof, such that the sealing portions 470b thereof are inserted on an opposite side from the first partitioning member 464 between the tubes 458a, 458b, and the base portion 468b abuts against the upper surface.

Figure 29:
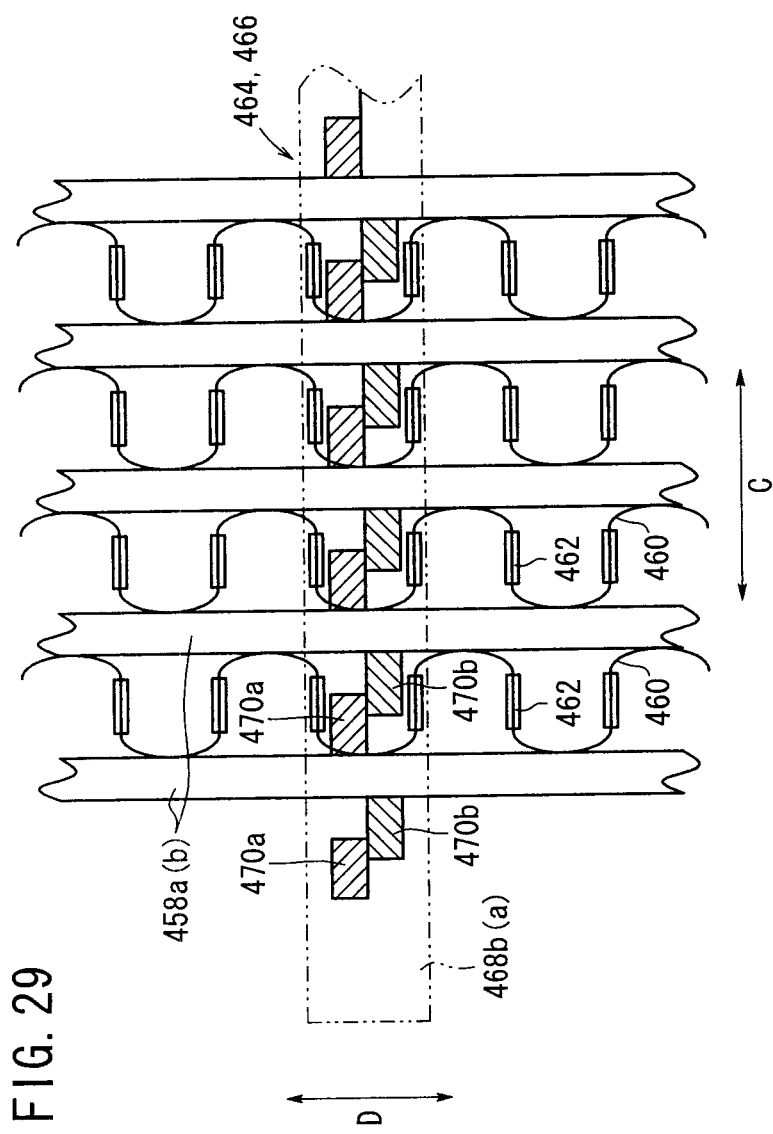
FIG. 29 is a cross sectional view with partial omission showing a condition in which a first partitioning member and a second partitioning member are installed on an evaporator.
Figure 30:
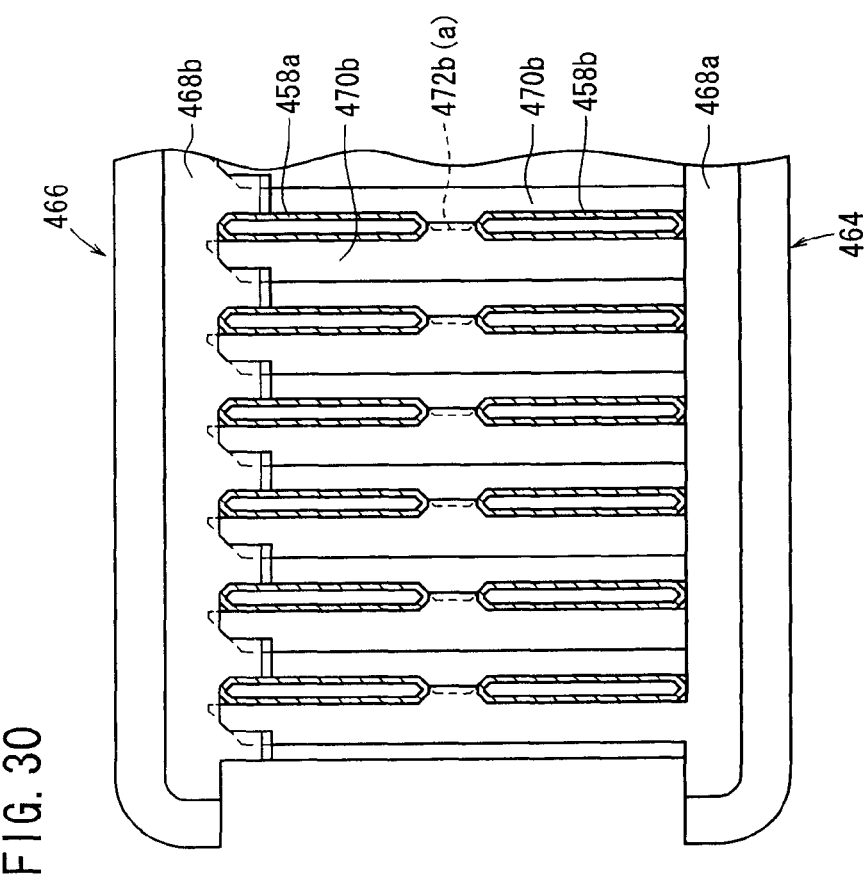
FIG. 30 is a front view, partially in cross section, showing a condition in which a first partitioning member and a second partitioning member are installed on an evaporator.

At this time, as shown in FIG. 29, the sealing portions 470a of the first partitioning member 464 and the sealing portions 470b of the second partitioning member 466 are offset from each other along the direction of extension (the direction of arrow C) of the base portions 468a, 468b, and further, overlap in the direction of extension of the tubes 458a, 458b. Owing to the two sealing portions 470a, 470b, which are mutually overlapped in this manner, intervals between adjacent tubes 458a, 458b in the same layer are sealed respectively. Next, projections 472a of the first partitioning member 464 and the projections 472b of the second partitioning member 466 are inserted between the adjacent tubes 458a and the tubes 458b, while the first partitioning member 464 and the second partitioning member 466 are slid respectively along the direction of extension (the direction of arrow C) of the base portions 468a, 468b. Consequently, the projections 472a of the first partitioning member 464 and the projections 472b of the second partitioning member 466 overlap in the direction of extension of the tubes 458a, 458b, and gaps occurring between the tubes 458a disposed on the upper surface side and the tubes 458b disposed on the lower surface side are sealed (see FIG. 30).

Consequently, since the flow of air between the tubes 458a, 458b, which are disposed in two layers, is blocked by the first and second partitioning members 464, 466 installed between the first cooling section 436 and the second cooling section 438, flow of air between the first cooling section 436 and the second cooling section 438 is prevented (see FIG. 29).

Moreover, in a condition of being installed on the evaporator 408, the base portions 468a, 468b of the first and second partitioning members 464, 466 are retained respectively in base holders 578, 588, which are formed in the casing 402 (see FIG. 25).

Further, the means for blocking communication of air between the first cooling section 436 and the second cooling section 438 in the evaporator 408 is not limited to the aforementioned first and second partitioning members 464, 466. For example, as shown in FIG. 31, in place of the aforementioned first and second partitioning members 464, 466, a plate-shaped partition plate 474 may also be disposed at the boundary region between the first cooling section 436 and the second cooling section 438.

Figure 31:
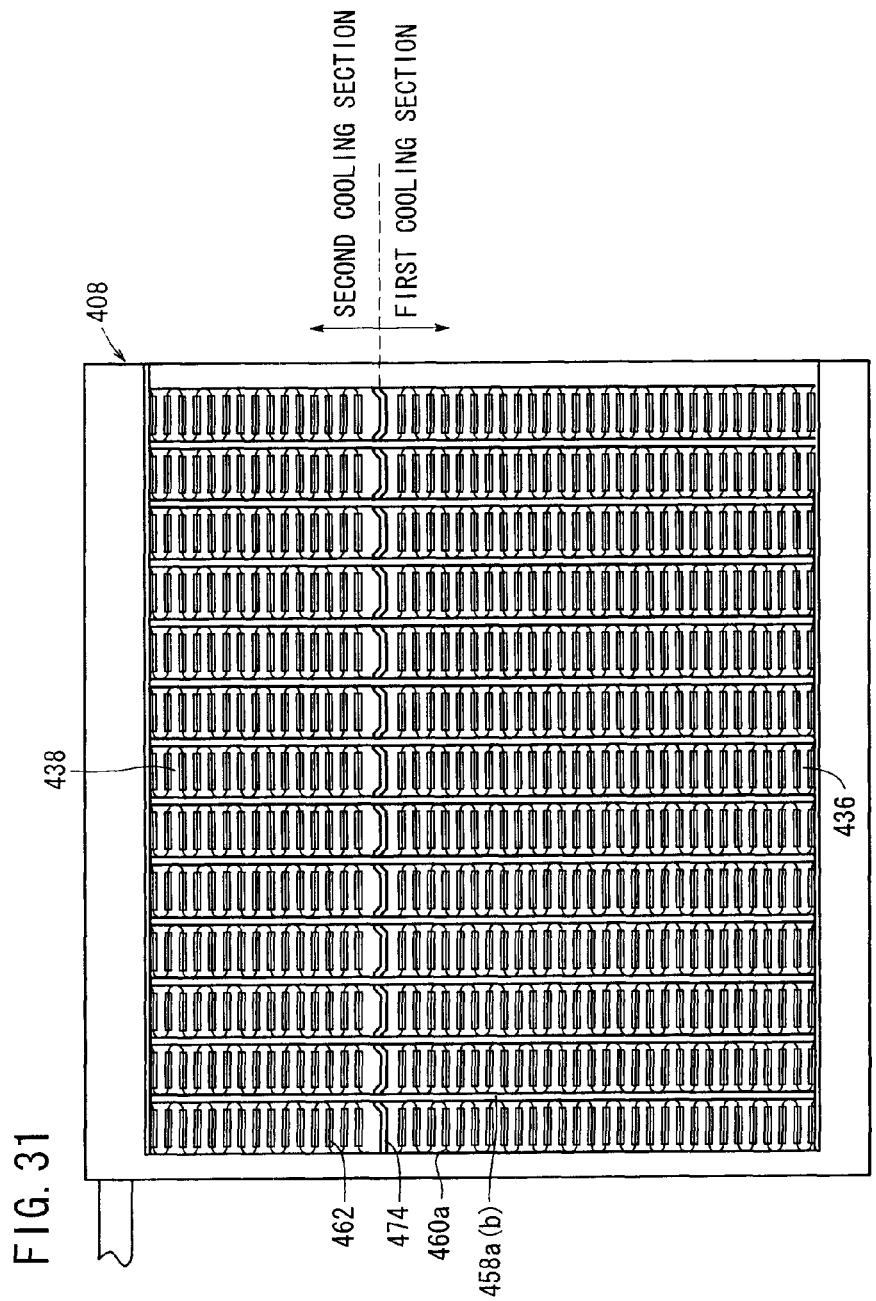
FIG. 31 is a plan view of an evaporator according to a modified example, in which a partition plate is installed thereon in place of the first and second partitioning members of FIG. 30.
Figure 32:
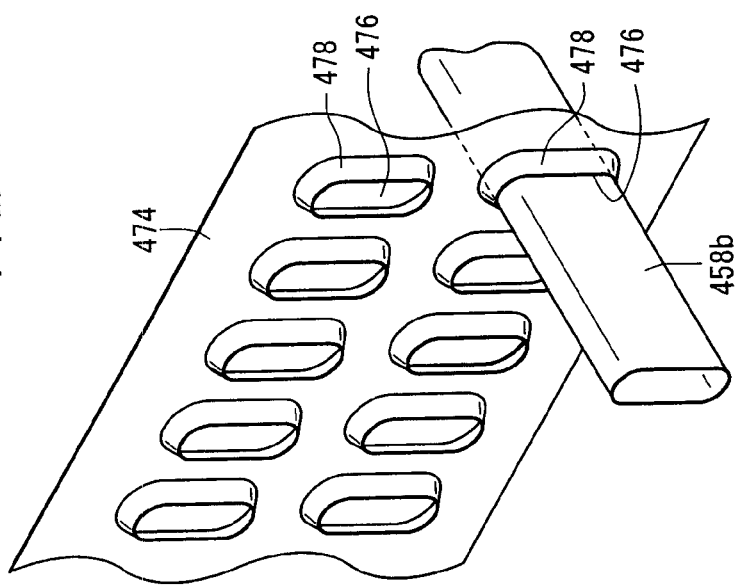
FIG. 32 is an enlarged perspective view with partial omission showing a condition in which tubes are retained in the partition plate of FIG. 31.

The partition plate 474, as shown in FIGS. 31 and 32, includes a plurality of insertion holes 476 therein through which the tubes 458a, 458b are inserted. Pressing members 478, which are inclined at predetermined angles from the partition plate 474 about centers of the insertion holes 476, are formed in openings of the insertion holes 476. The pressing members 478 are substantially chevron shaped in cross section about the center of the insertion holes 476, and are tiltable with a certain resiliency in a radial direction of the insertion holes about a fulcrum point defined by an adjoining region with the partition plate 474.

Figure 33A:
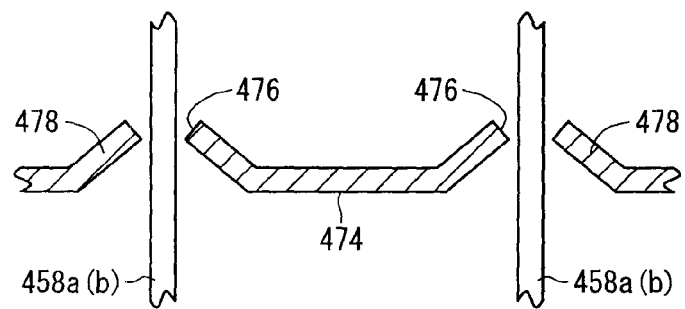
FIG. 33A is a cross sectional view showing, during a manufacturing process for the evaporator, a temporarily assembled state in which tubes are inserted through insertion holes of a partition plate.
Figure 33B:
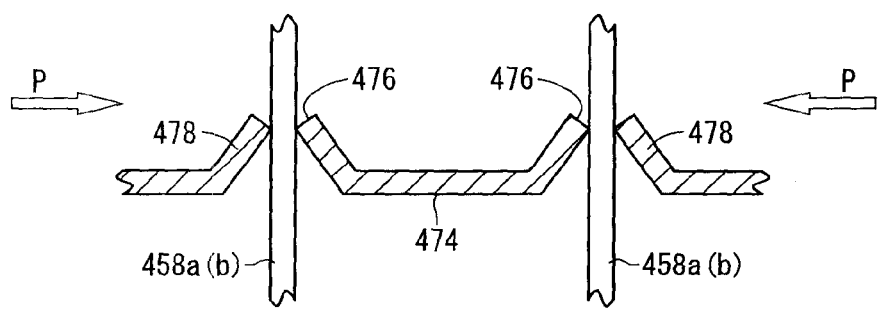
FIG. 33B is a cross sectional view showing, during a manufacturing process for the evaporator, a state in which, from the condition shown in FIG. 33A, the insertion holes are pressed against sides of the tubes to retain the tubes.

In addition, for example, a cut line or seam is disposed in fins 460a forming a boundary between the first cooling section 436 and the second cooling section 438. After the partition plate 474 is inserted between the fins 460a, the tubes 458a, 458b are inserted respectively through the insertion holes 476 of the partition plate 474 (see FIG. 33A). Then, in such a provisionally assembled state, as shown in FIG. 33B, a pressing force P is applied respectively from the right and left in a direction to approach mutually toward the plural tubes 458a, 458b, and while heat is applied thereto, welding (e.g., using solder) is carried out, whereby the tubes 458a, 458b, the fins 460a, and the partition plate 474 are mutually bonded together to manufacture the evaporator 408 (see FIG. 31).

At this time, the pressing members 478 of the partition plate 474 contact the side surfaces of the tubes 458a, 458b due to the pressing force P, and further, because the tubes 458a, 458b are retained by the resilient force thereof, a state in which the partition plate 474 and the tubes 458a, 458b are mutually positioned can be realized. By performing welding in such a positioned state, for example, generation of thermal shrinkage after welding and the occurrence of gaps between the partition plate 474 and the tubes 458a, 458b is prevented.

Figure 35:
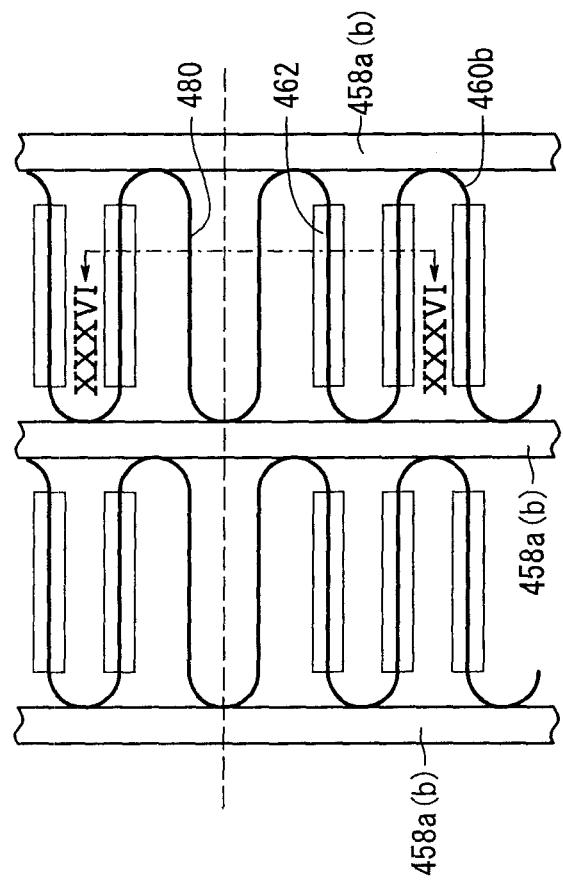
FIG. 35 is an enlarged plan view with partial omission showing the vicinity of the louverless portions of FIG. 34.
Figure 36:
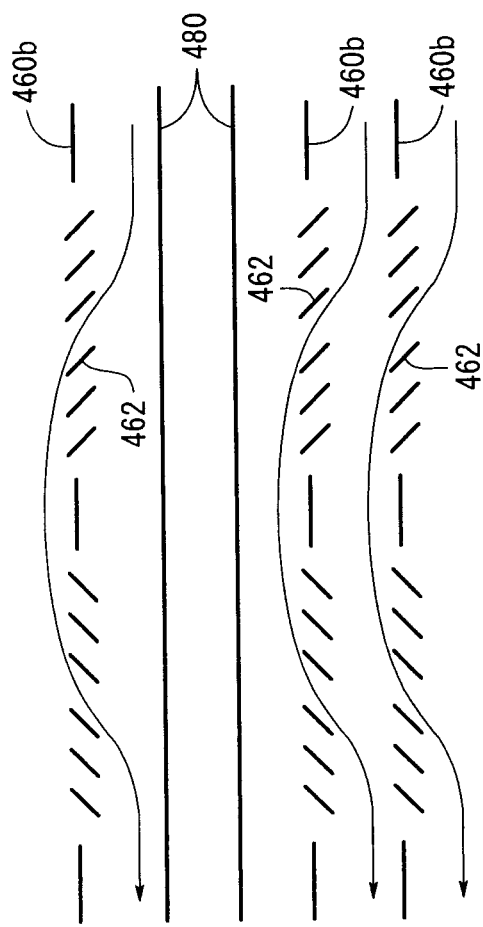
FIG. 36 is a cross sectional view taken along line XXXVI-XXXVI of FIG. 35.

Furthermore, in place of the above-discussed first and second partitioning members 464, 466 or the partition plate 474, for example, as shown in FIGS. 34 and 35, louverless portions 480, without the louvers 462 being provided thereon, may also be formed in fins 460b, at a boundary region located between the first cooling section 436 and the second cooling section 438. As a result thereof, as shown in FIG. 36, by providing the louverless portions 480 at an intermediate location of the fins 460b that have the louvers 462 thereon, flow of air through the louvers 462 is interrupted, and flowing of air between the first cooling section 436 and the second cooling section 438 can be prevented.

Figure 37A:
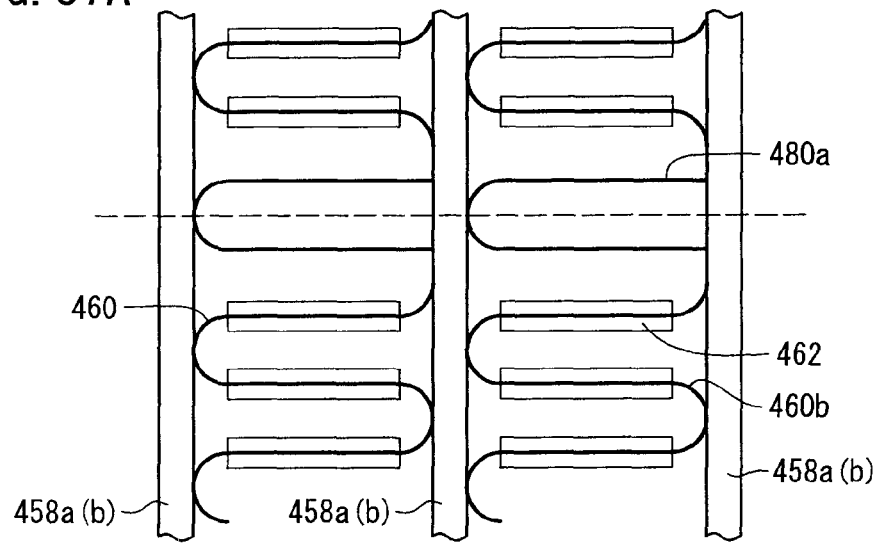
FIG. 37A and FIG. 37B are enlarged plan views showing a modified example of the louverless portion.
Figure 37B:
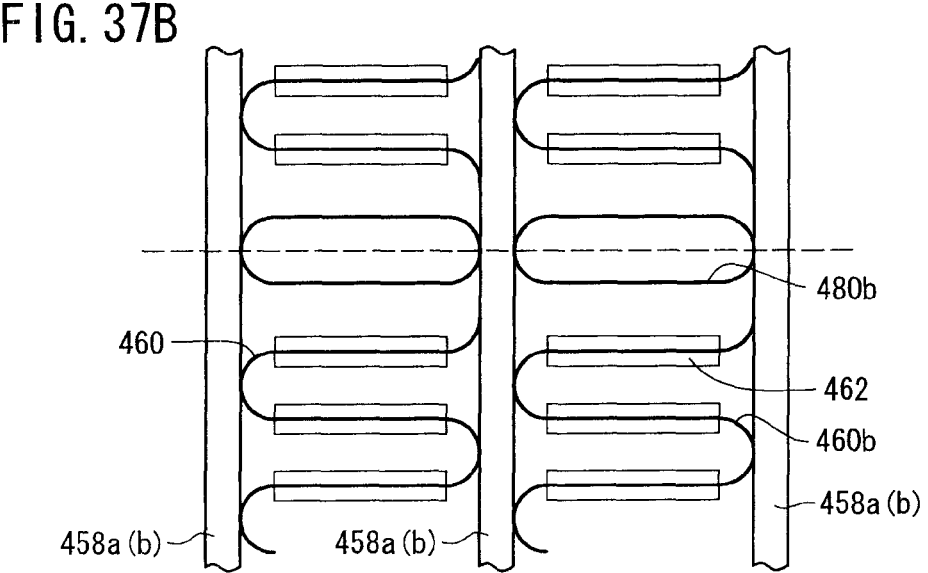

Further, the aforementioned louverless portions 480 are not limited to a case of being provided as a unitary body with the fins 460b having the louvers 462. For example, as shown in FIG. 37A, cutouts may be provided in the fins 460b having the louvers 462 thereon, wherein U-shaped louverless portions 480a are then inserted through the cutouts and joined therein. Similarly, as shown in FIG. 37B, louverless portions 480b having elliptical shapes in cross section may be inserted therein and joined, so as to prevent air from flowing between the first cooling section 436 and the second cooling section 438.

On the other hand, as shown in FIG. 11, on a downstream side of the evaporator 408, a second front passage 482 is formed, through which air having passed through the first cooling section 436 is supplied. Upwardly of the second front passage 482, a third front passage 484 and a fourth front passage 486 are formed in a branching or bifurcated manner. Further, a first air mixing damper 488 is rotatably disposed so as to face toward the branching portion of the third front passage 484 and the fourth front passage 486.

By rotation of the first air mixing damper 488, the blowing condition and blowing rate of the cooled air that has passed through the evaporator 408 into the third front passage 484 and the fourth front passage 486 is adjusted. The third front passage 484 is arranged in the forward direction (the direction of arrow A), whereas the fourth front passage 486 is arranged in the rearward direction (the direction of arrow B), of the casing 402. The heater core 410 is disposed on a downstream side of the fourth front passage 486.

Upstream of the third front passage 484, a cooling vent damper 490 is disposed in a downward direction facing the second front passage 482, for switching a communication state between the second front passage 482 and the third front passage 484. More specifically, because the cooling vent damper 490 is arranged in the vicinity of the evaporator 408, the cooling vent damper 490 is disposed such that, under a switching action thereof, chilled air cooled by the evaporator 408 is supplied directly into the third front passage 484.

Further, the third front passage 484 extends upwardly, and a first vent blow-out port 492 opens at an upper portion on the downstream side thereof, where a vent damper 494 is rotatably disposed. The vent damper 494 switches a blowing state of air that flows through the third front passage 484, when the air is blown to the first vent blow-out port 492 and a later described sixth front passage 520, and also is capable of adjusting the blowing rate thereof.

The heater core 410 is arranged to straddle between the first divided casing 416 and the second divided casing 418, and is disposed such that one end thereof in the forward direction of the vehicle (the direction of arrow A) is inclined downward at a predetermined angle with respect to the other end thereof in the rearward direction (the direction of arrow B) of the vehicle. The heater core 410 includes the first heating section 450 that heats air supplied from the first blower unit 406, and the second heating section 452 that heats air supplied from the second blower unit 412, wherein the first heating section 450 is arranged on the forward side of the casing 402.

Figure 38:
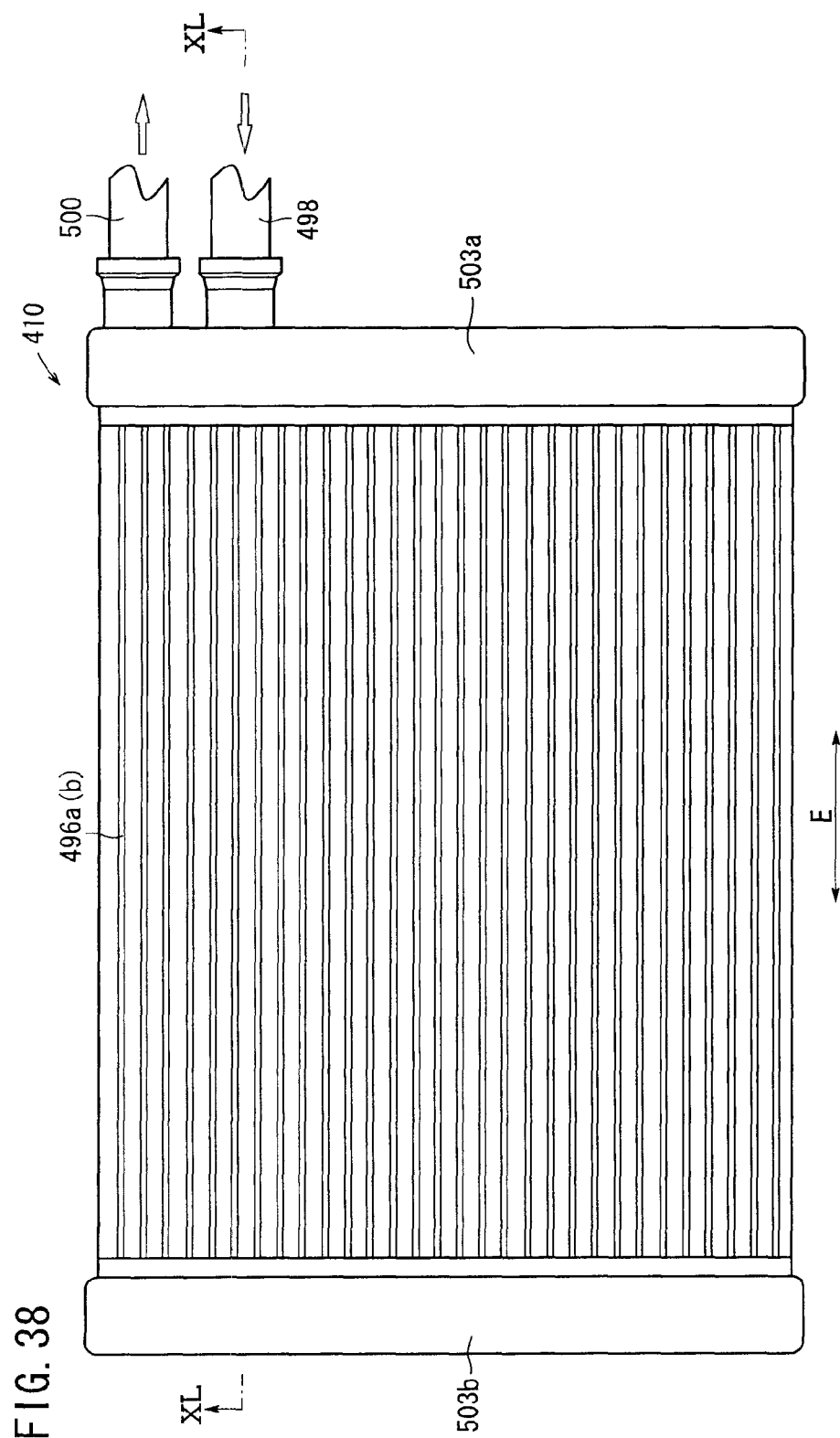
FIG. 38 is a plan view of a heater core.

As shown in FIG. 38, in the heater core 410, tubes 496a, 496b are formed from thin plates of aluminum or the like, and fins (not shown), which are folded in a serpentine-like undulating shape, are disposed respectively between the stacked tubes 496a, 496b. On the fins, a plurality of louvers are formed, which are cut out so as to be inclined at predetermined angles with respect to planar surfaces of the fins. By causing heated water to flow through the interior of the tubes 496a, 496b, air that passes through the louvers and flows between the fins is heated by the heated water and is supplied to the downstream side as heated air. At the heater core 410, the tubes 496a, 496b are arrayed in parallel and arranged in two layers in the thickness direction of the heater core 410.

Figure 39:
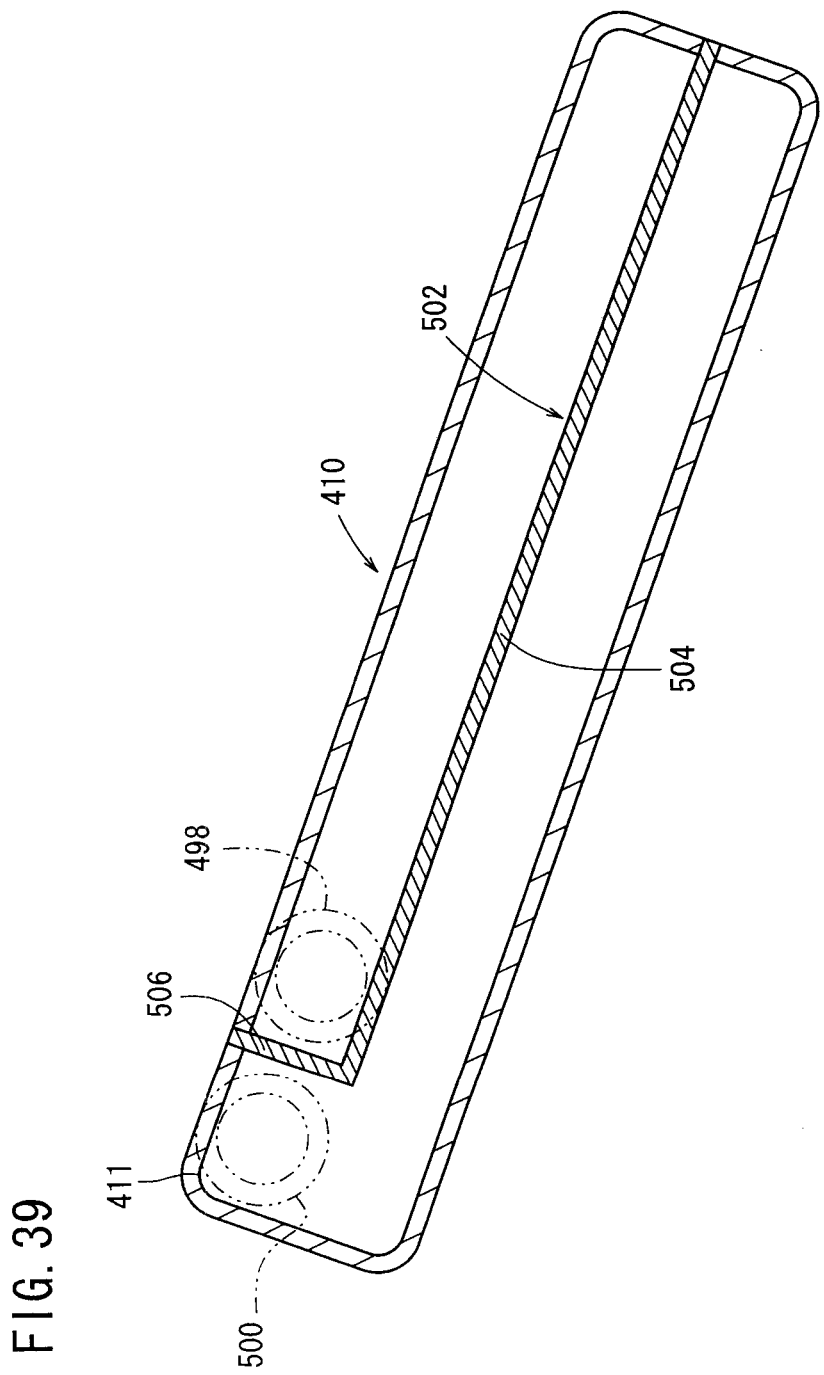
FIG. 39 is a schematic cross sectional view of the heater core shown in FIG. 38.

On both ends of the tubes 496a, 496b, respective hollow tank portions 503a, 503b are connected, which retain the heated water that flows inside the tubes 496a, 496b. In addition, as shown in FIGS. 38 and 39, on one of the tank portions 503a on a side surface of the heater core 410, a supply conduit 498 through which heated water is supplied from the exterior, and a discharge conduit 500 through which heated water having circulated through the interior of the heater core 410 is discharged, are connected respectively. The discharge conduit 500 is arranged in the vicinity of a corner portion in a rear upward direction of the casing 402, whereas the supply conduit 498 is arranged in parallel adjacent to the discharge conduit 500.

Figure 40:
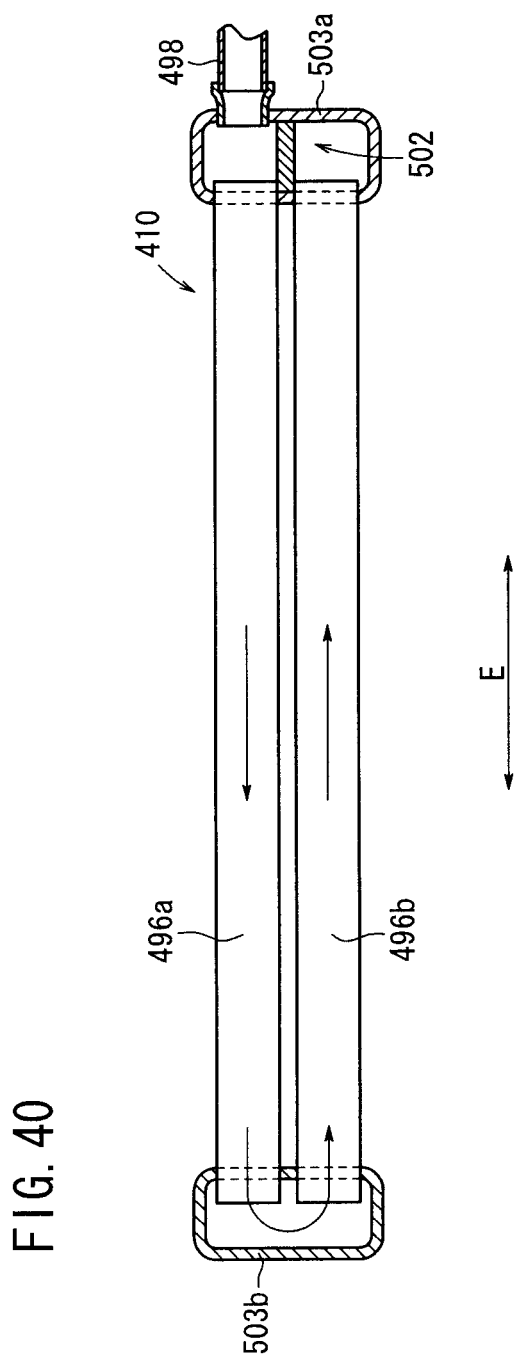
FIG. 40 is a cross sectional view taken along line XL-XL of FIG. 38.
Figure 41A:
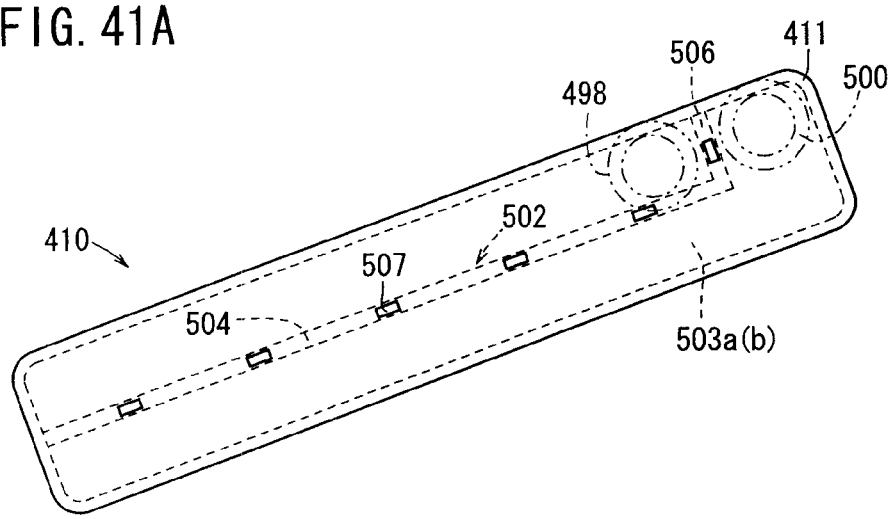
FIG. 41A is a side view of the heater core of FIG. 38.
Figure 41B:
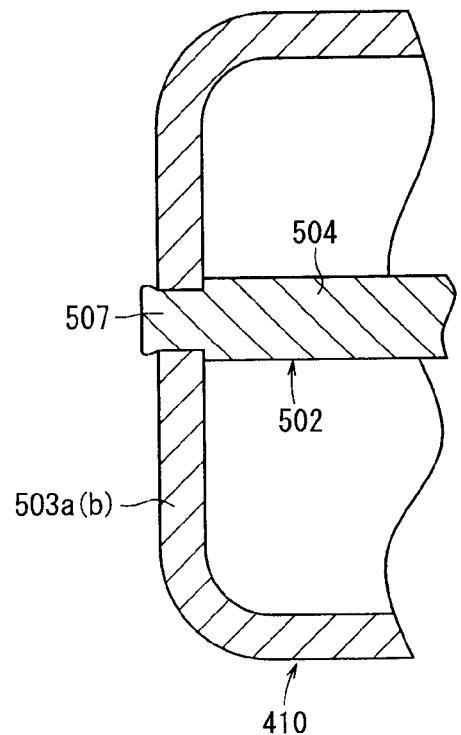
FIG. 41B is an enlarged cross sectional view with partial omission showing a caulked region of a baffle plate and a housing that make up the heater core.

On the other hand, in the interior of the tank portion 503a, a baffle plate 502 is disposed, which is substantially L-shaped in cross section. The baffle plate 502 extends at a predetermined width in an extending direction (the direction of arrow E) of the supply conduit 498 and the discharge conduit 500, and the baffle plate 502 is arranged between one of the tubes 496a and the other of the tubes 496b. Additionally, as shown in FIG. 40, the pair of tubes 496a, 496b are separated inside the tank portion 503a by the baffle plate 502.

The baffle plate 502, as shown in FIG. 39, is made up from a planar portion 504 arranged centrally in the thickness direction of the heater core 410 and a bent portion 506, which is bent at a right angle at one end of the planar portion 504. The bent portion 506 is disposed between the discharge conduit 500 and the supply conduit 498.

Further, on the baffle plate 502, a plurality of caulking projections 507 (see FIG. 41A) are disposed respectively on both ends thereof along the longitudinal direction (the direction of arrow E) of the heater core 410. After such caulking projections 507 have been inserted through holes formed in a side surface of the tank portion 503a to project outwardly therefrom, the projecting regions thereof are pressed and crushed by a non-illustrated jig or the like (see FIG. 41B). Moreover, the caulking projections 507 are formed with rectangular shapes in cross section and are disposed while being mutually separated at predetermined distances on side surfaces of the planar portion 504 and the bent portion 506. Together therewith, holes facing the planar portion 504 are disposed centrally in the thickness direction on the tank portion 503a, and holes facing the bent portion 506 are disposed at positions between the supply conduit 498 and the discharge conduit 500 (see FIG. 41A).

As a result thereof, the baffle plate 502 is affixed securely with respect to the tank portion 503a disposed on the end of the heater core 410.

In addition, heated water supplied from the supply conduit 498 is supplied, via the one tank portion 503a, to one of the tubes 496a, which is disposed on the upper side. Then, after the heated water has flowed through the tube 496a to the other end side of the heater core 410, the heated water reverses direction inside the tank portion 503b disposed at the other end of the heater core 410, passes through the other tube 496b disposed on the lower side, and flows along the lower surface side of the baffle plate 502 back to the one end side of the heater core 410 whereupon, the heated water is discharged from the discharge conduit 500.

At this time, since the discharge conduit 500 is connected at an upper corner portion 411 (in the rearward direction) of the heater core 410, which is inclined at a predetermined angle, even in the case that entrapped or retained air is generated inside the heater core 410, the air can be reliably discharged to the exterior through the discharge conduit 500, which is connected at the upper corner portion 411 where such retained air is generated. Stated otherwise, the discharge conduit 500 is connected at an uppermost position in the heater core 410, the heater core 410 being disposed at a predetermined angle of inclination inside the casing 402.

Further, the baffle plate 502, which is disposed inside the heater core 410, is not limited to having an L-shape in cross section, as described above. For example, as shown in FIG. 42, a baffle plate 508 having a cross-like shape in cross section in a heater core 410a may also be used.

Figure 42:
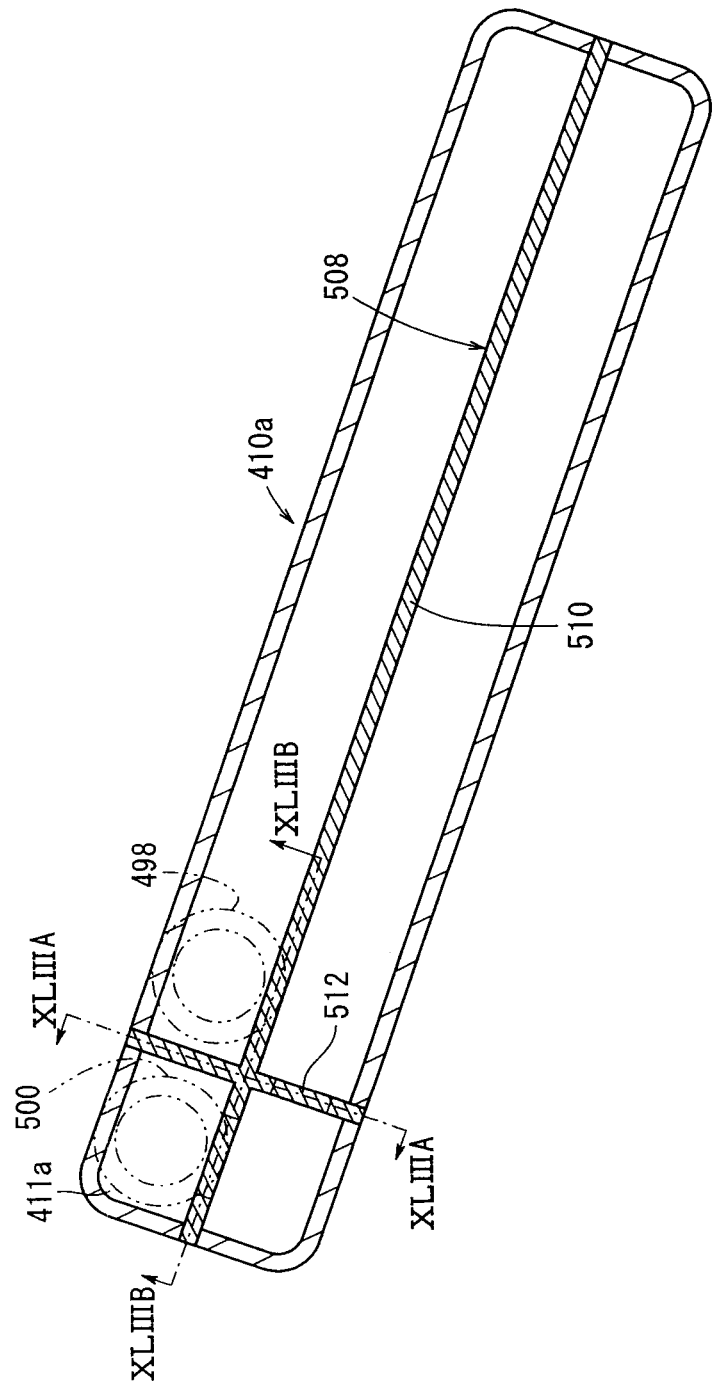
FIG. 42 is a schematic cross sectional view of a heater core according to a modified example in which a cross sectional cross-shaped baffle plate is utilized.

As shown in FIG. 42, the baffle plate 508 includes a planar portion 510 and a vertical portion 512 that intersects at a right angle with respect to the planar portion 510. The planar portion 510 is arranged centrally in the thickness direction of the heater core 410a, and the vertical portion 512 is arranged between the discharge conduit 500 and the supply conduit 498.

Figure 43A:
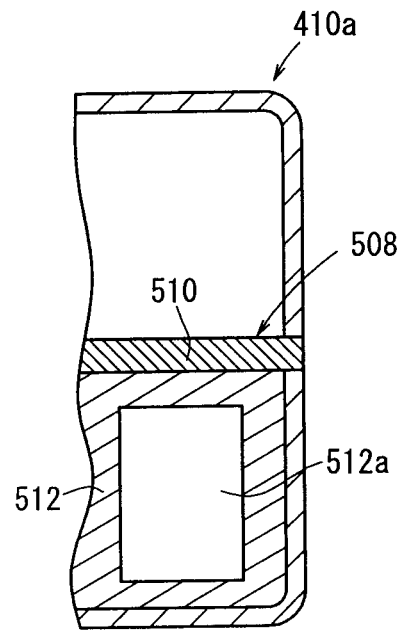
FIG. 43A is a cross sectional view with partial omission taken along line XLIIIA-XLIIIA of FIG. 42.
Figure 43B:
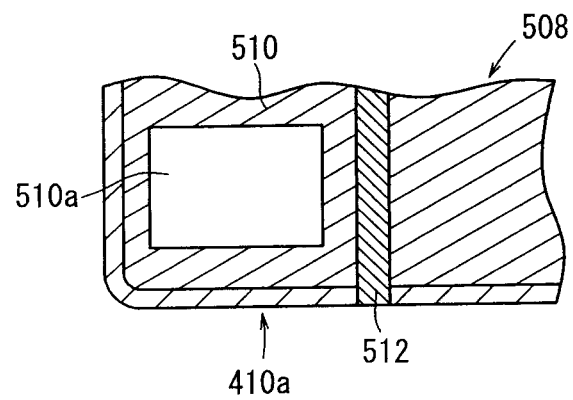
FIG. 43B is a cross sectional view with partial omission taken along line XLIIIB-XLIIIB of FIG. 42.

Further, as shown in FIG. 43A, on the vertical portion 512, on the lower surface side of the heater core 410a, a through hole 512a opens through which the circulated heated water can flow. Furthermore, as shown in FIG. 43B, on the planar portion 510 facing the discharge conduit 500, another through hole 510a opens through which the heated water can flow. Additionally, in the heater core 410a employing the baffle plate 508, heated water supplied from the supply conduit 498 is supplied to the interior of one of the tank portions 503a, and flows along an upper surface side of the baffle plate 508 and is supplied to one of the tubes (not shown). Additionally, after reversing in direction at the tank portion 503b disposed on the other end side of the heater core 410a, the heated water flows along the lower surface side of the baffle plate 508, and after flowing to the through hole 510a of the planar portion 510 from the through hole 512a of the vertical portion 512, the heated water is discharged from the discharge conduit 500 via the tank portion 503a.

At this time as well, since the discharge conduit 500 is connected at an upper corner portion 411a (in the rearward direction) of the heater core 410a, which is inclined at a predetermined angle, even in the case that entrapped or retained air is generated inside the heater core 410a, the air can be reliably discharged to the exterior through the discharge conduit 500, which is connected at the upper corner portion 411a where such retained air is generated.

As shown in FIG. 12, on the downstream side of the heater core 410, a fifth front passage 514 is formed. The fifth front passage 514 extends in the forward direction (in the direction of arrow A), and at a location that merges with the third front passage 484, a temperature control damper 516 is provided, and together therewith, sub-defroster dampers 518a, 518b are disposed in an upward direction facing the heater core 410. Under a rotating action of the temperature control damper 516, a communication state between the fifth front passage 514 and the third front passage 484 is switched, for deflecting the blowing direction of warm air supplied from the fifth front passage 514 into the third front passage 484.

On the other hand, the sub-defroster dampers 518a, 518b are disposed so as to be capable of switching a communication state between the fifth front passage 514 and the sixth front passage 520 formed thereabove. By rotating the sub-defroster dampers 518a, 518b and thereby establishing communication between the fifth front passage 514 and the sixth front passage 520, i.e., by shortening the fluid passage from the fifth front passage 514 to the sixth front passage 520, warm air heated by the heater core 410 can be supplied directly to the sixth front passage 520 without flowing through the third front passage 484, in a state in which ventilation resistance of the fluid passage is reduced.

Owing thereto, in the case that a heat mode for blowing air in the vicinity of the feet of passengers, or a defroster mode for blowing air in the vicinity of the front window of the vehicle, is selected, the blowing rate can be increased to quickly heat such areas.

Stated otherwise, even without increasing the rotation of the first blower unit 406, the blowing rate of air during the heat mode and the defroster mode can be increased.

The sixth front passage 520 communicates with the downstream side of the third front passage 484 through the forwardly disposed opening, and communicates with a later-described seventh front passage 522 through the rearwardly disposed opening. A defroster blow-out port 524 opens upwardly of the sixth front passage 520, with a pair of defroster dampers 526a, 526b being disposed rotatably therein facing the defroster blow-out port 524.

The defroster dampers 526a, 526b are provided to switch the blowing state when the air supplied to the sixth front passage 520 is blown out from the defroster blow-out port 524, and further are capable of adjusting the blowing rate thereof.

Further, at a downstream side of the sixth front passage 520, a pair of heat dampers 528 made up from a butterfly valve are rotatably disposed (see FIG. 11). By rotating the heat dampers 528, the blowing state of air is switched, when air supplied from the sixth front passage 520 is blown out through later-described seventh and eighth front passages 522, 540 or through the defroster blow-out port 524, and further, the blowing rate of such air can be adjusted.

Figure 44:
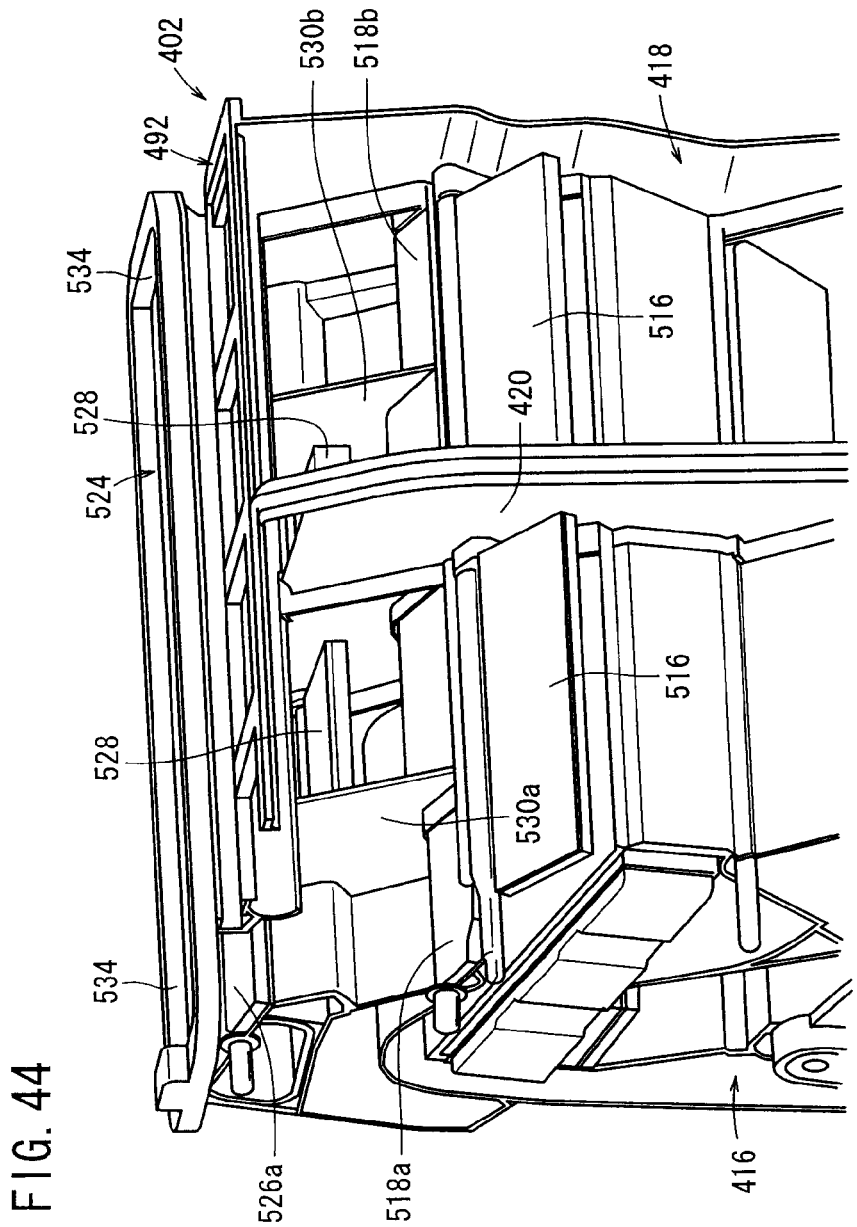
FIG. 44 is a partial cutaway perspective view showing a center plate and a dividing panel disposed inside the casing.

Further, as shown in FIG. 44, the sixth front passage 520 is divided into two sections by the center plate 420, which is disposed centrally in the casing 402 in the widthwise direction thereof. Also, the sixth front passage 520 is further divided respectively by a pair of dividing panels 530a, 530b, which are disposed roughly centrally in the widthwise direction of the first and second divided casings 416, 418. In addition, in the sixth front passage 520, between the center plate 420 and the dividing panels 530a, 530b, the pair of heat dampers 528 are disposed, such that air that flows between the center plate 420 and the dividing panels 530a, 530b is directed outwardly to a first heat passage 538 (discussed later) under rotating actions of the heat dampers 528.

On the other hand, the defroster dampers 526a, 526b are disposed respectively between the dividing panels 530a, 530b and inner wall surfaces of the first and second divided casings 416, 418, so that air that flows between the dividing panels 530a, 530b and inner wall surfaces of the first and second divided casings 416, 418 is directed outwardly, respectively, from side portions 534 of the defroster blow-out port 524 under rotating actions of the defroster dampers 526a, 526b.

More specifically, the sixth front passage 520 is divided into four sections inside the casing 402 by the pair of dividing panels 530a, 530b and the center plate 420, such that the blowing state and blowing rate of air that is blown from the defroster blow-out port 524 is switched by the defroster dampers 526a, 526b.

Figure 45:
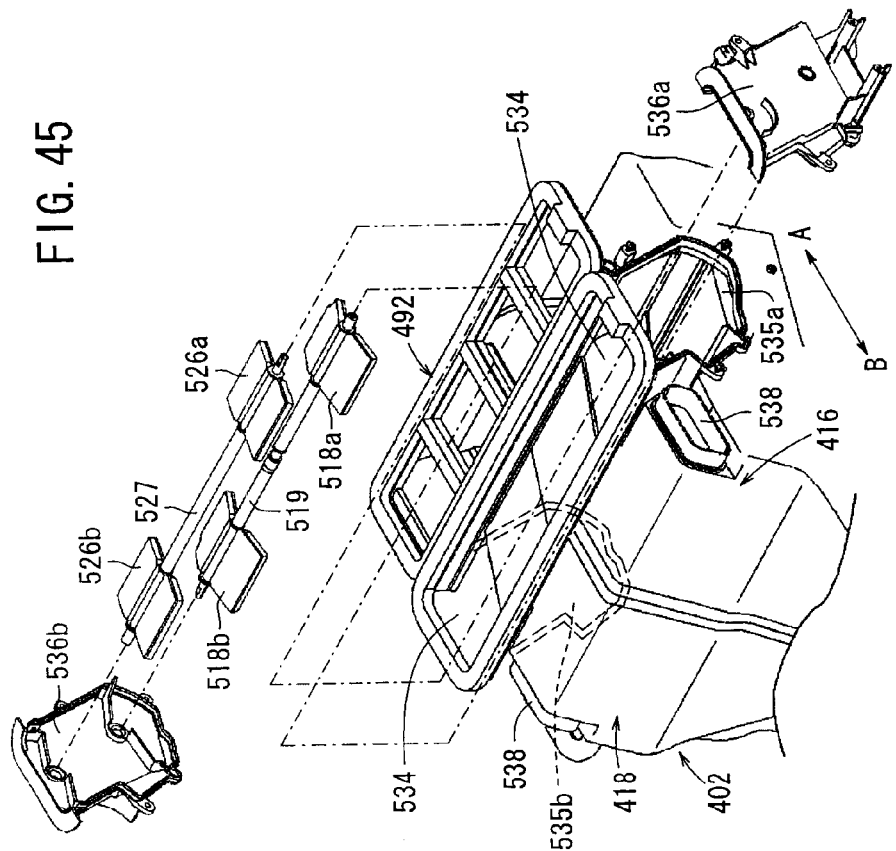
FIG. 45 is an exploded perspective view showing a condition in which a cover is removed from the first and second divided casings, and a defroster damper and a sub-defroster damper are taken out therefrom.

As shown in FIG. 45, by respectively removing covers 536a, 536b, which are disposed alongside the defroster dampers 526a, 526b and the sub-defroster dampers 518a, 518b in the first and second divided casings 416, 418, maintenance thereon, such as exchanging and adjustment of rotation angles, etc., can easily be carried out on the defroster dampers 526a, 526b and the sub-defroster dampers 518a, 518b.

The seventh front passage 522 communicates with a first heat blow-out port (not shown) through the first heat passage 538 for the purpose of blowing air in the vicinity of the feet of passengers in the front seats in the vehicle compartment. The eighth front passage 540 extends downwardly in a curving manner and communicates with a second heat blow-out port (not shown) upwardly of the second blower unit 412 through a second heat passage (not shown) for the purpose of blowing air in the vicinity of the feet of passengers in the middle seats in the vehicle compartment.

In the casing 402, the first vent blow-out port 492 and the defroster blow-out port 524 open upwardly of the casing 402, and further, the first vent blow-out port 492 is arranged on a forward side (in the direction of arrow A), whereas the defroster blow-out port 524 is arranged rearwardly, substantially centrally in the casing 402 with respect to the first vent blow-out port 492 (see FIG. 12).

Figure 46:
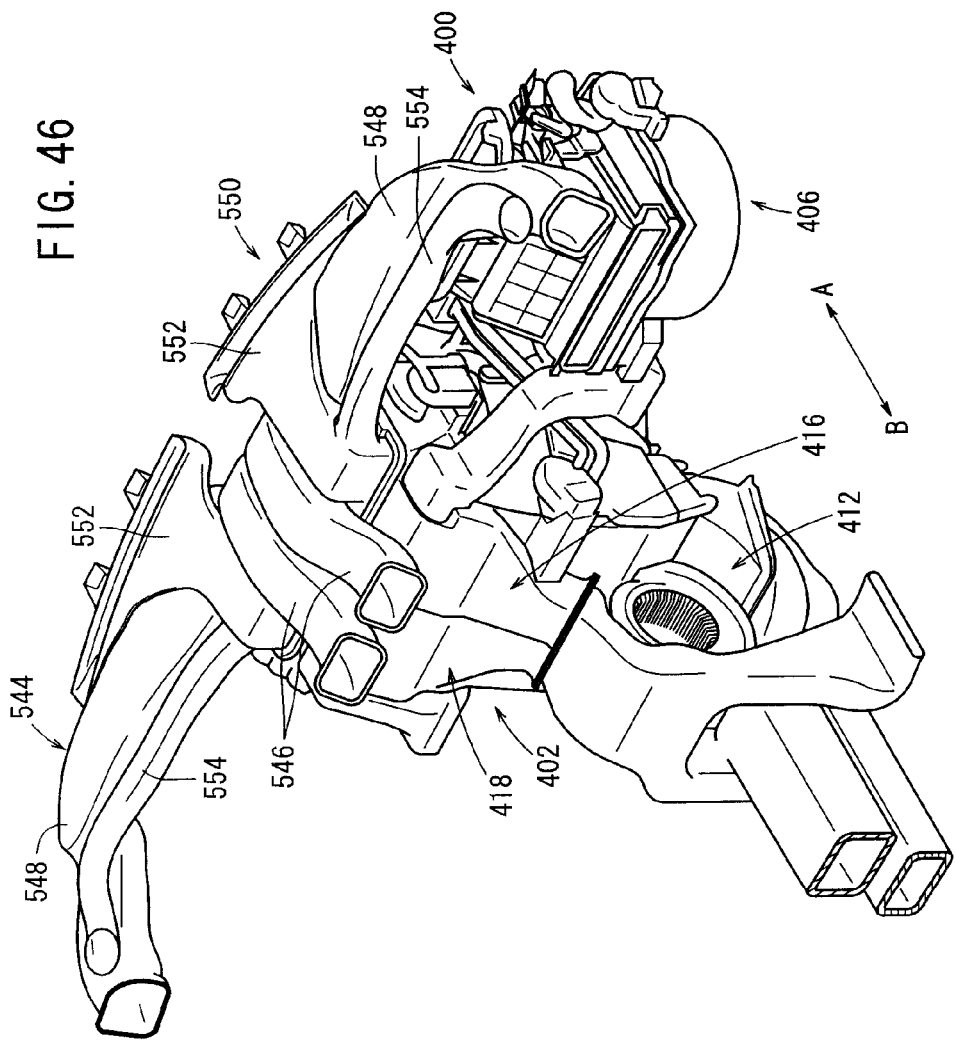
FIG. 46 is a schematic perspective view of the vehicular air conditioning apparatus showing a condition thereof in which a vent duct and a defroster duct are connected respectively to a first vent blow-out port and a defroster blow-out port.
Figure 47:
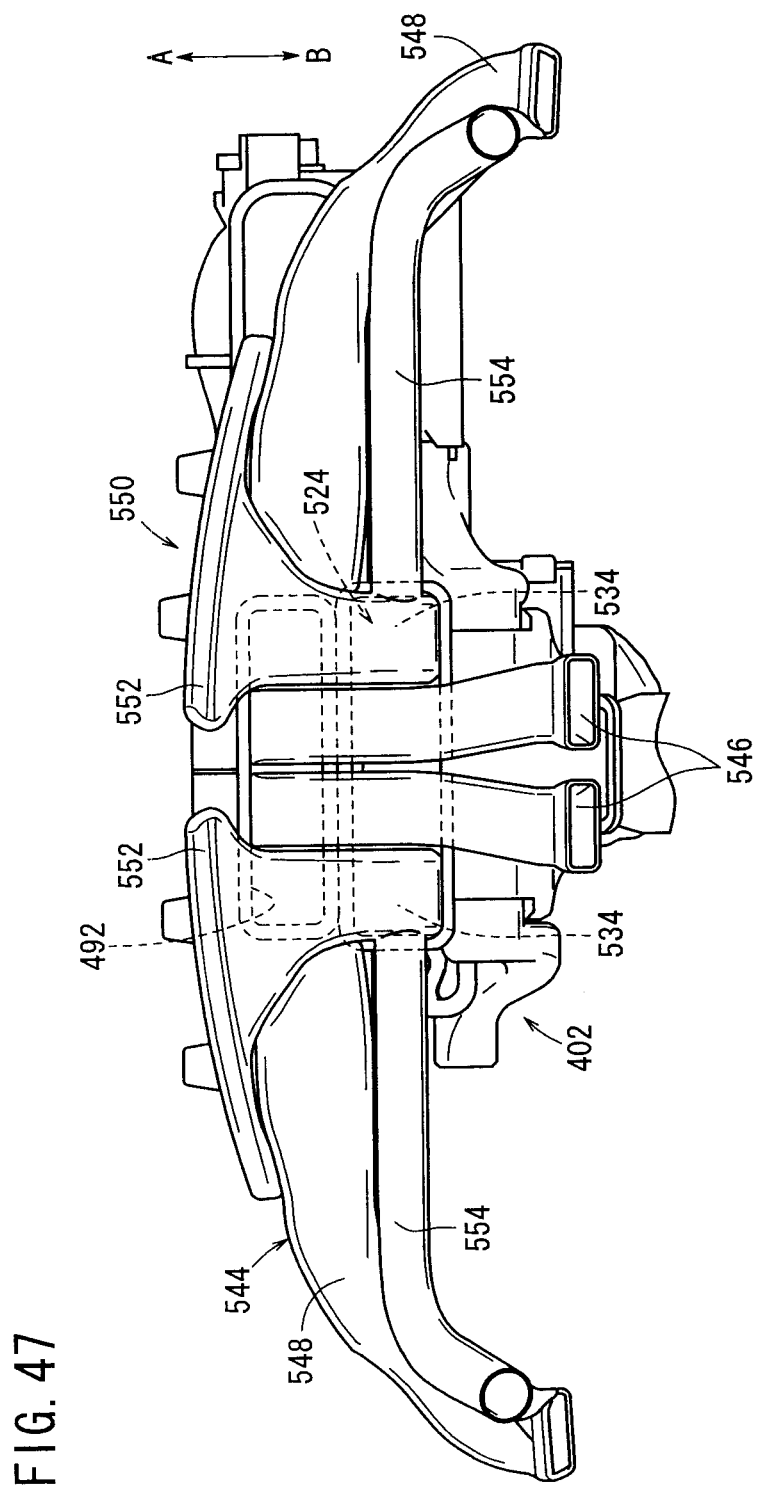
FIG. 47 is a plan view showing the vehicular air conditioning apparatus of FIG. 46.

As shown in FIGS. 46 and 47, a vent duct 544, which extends while curving toward the rearward side of the vehicle (in the direction of arrow B), is connected to the first vent blow-out port 492 for supplying mixed air to the vicinity of faces of passengers in the front seats of the vehicle compartment from the first vent blow-out port 492. A pair of center vent ducts 546 that make up the vent duct 544 are connected to a center portion of the first vent blow-out port 492 and blow air toward the center of the front seats, whereas another pair of side vent ducts 548, which are connected to both ends of the first vent blow-out port 492, extend in lateral directions of the front seats, and blow air toward the driver's seat and passenger seat sides thereof.

On the other hand, a defroster duct 550, which extends while curving toward the forward side of the vehicle (in the direction of arrow A), is connected to the defroster blow-out port 524 for supplying mixed air to the vicinity of the front window in the vehicle compartment from the defroster blow-out port 524. The defroster duct 550 is constituted by center defroster ducts 552, which are branched in a forked manner so as to avoid the center vent ducts 546 that extend upwardly of the defroster blow-out port 524, and extend toward an unillustrated front window, and side defroster ducts 554 which extend perpendicularly to the center defroster ducts 552 in lateral directions together with the side vent ducts 548. The center defroster ducts 552 extend toward the forward side (in the direction of arrow A) straddling upwardly over the side vent ducts 548.

More specifically, the vent duct 544 connects to the first vent blow-out port 492 disposed on the forward side and extends rearwardly (in the direction of arrow B) toward the vehicle compartment, whereas the defroster duct 550 connects to the defroster blow-out port 524 disposed on the rearward side and extends in a forward direction (in the direction of arrow A) on the front window side while crossing over the vent duct 544.

In this manner, by arranging the first vent blow-out port 492 on the forward side of the casing 402, the third front passage 484 that communicates between the downstream side of the evaporator 408 and the first vent blow-out port 492 can be laid out in a straight line fashion, while the defroster blow-out port 524 can be disposed upwardly of the heater core 410.

In this case, the center defroster ducts 552 and the side defroster ducts 554 that constitute the defroster duct 550 extend respectively from the side portions 534 of the defroster blow-out port 524, such that the center vent ducts 546 are oriented and can extend rearwardly (in the direction of arrow B) from the first vent blow-out port 492, which is disposed forwardly (in the direction of arrow A) of the defroster blow-out port 524.

The first blower unit 406 includes an intake damper (not shown) in which an external air intake port 556 connected to a duct (not shown) for the purpose of introducing external air and an internal air intake port 558 for introducing internal air are arranged in an opening thereof, and which carries out switching between the external and internal air, and a first blower fan 560 that supplies air that is taken in to the interior of the casing 402. A blower case 562 in which the first blower fan 560 is accommodated communicates with the interior of the casing 402 through the connection duct 404 connected to the first intake port 422. Rotation of the first blower fan 560 is controlled by a fan motor (not shown), which is driven under the control of a later-described rotation control device 564a.

Figure 48:
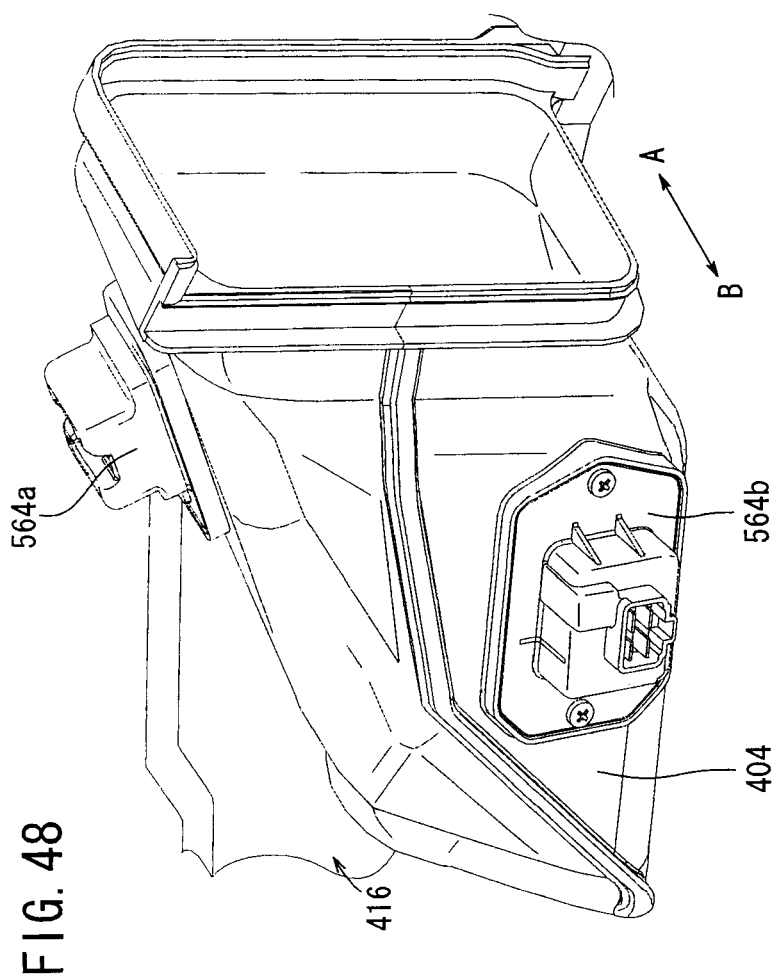
FIG. 48 is an enlarged perspective view showing the vicinity of a connection duct on which a rotation control device is installed.
Figure 49:
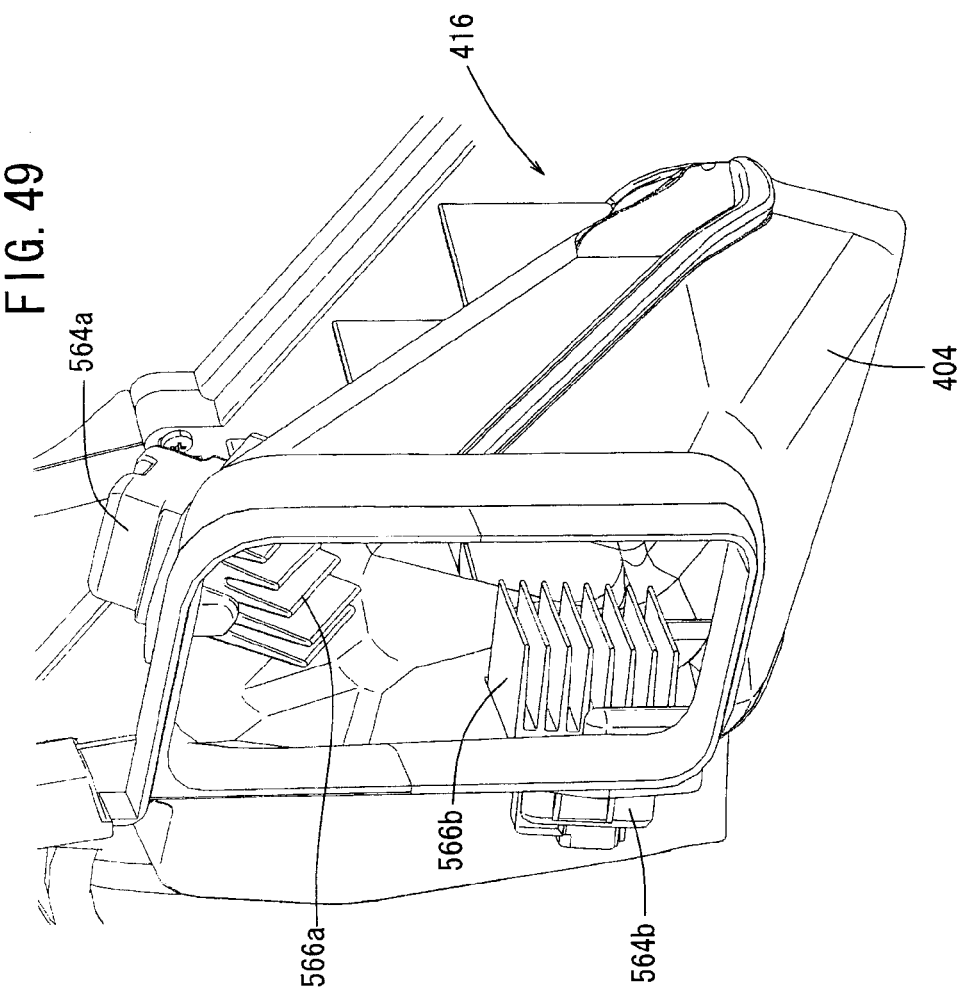
FIG. 49 is an enlarged perspective view of the communication duct of FIG. 44, as seen from the side of an opening portion thereof.

Further, the connection duct 404 has a shape in which the cross sectional area of a passage thereof is greater than a later-mentioned first rear passage 570, which forms the connection passage of the second blower unit 412. Further, as shown in FIGS. 48 and 49, the connection duct 404 is formed in a tubular shape having a substantially rectangular shape in cross section, wherein two rotation control devices 564a, 564b are installed on wall portions thereof. The rotation control devices 564a, 564b are capable of controlling the air-blowing rate to the inside of the casing 402, by controlling respectively the rotation number (RPM) of the first blower fan 560 and a second blower fan 574. The rotation control devices 564a, 564b are arranged inside the connection duct 404 at positions where the fluid passage cross sectional area thereof is maximal. In addition, the rotation control devices 564a, 564b are arranged perpendicularly to each other, and a plurality of heat dissipating fins 566a, 566b are mounted so as to project into the passage of the connection duct 404. Specifically, by placing the heat dissipating fins 566a, 566b in contact with air that flows inside the connection duct 404, since heat generated by the rotation control devices 564a, 564b can suitably be dissipated via the heat dissipating fins 566a, 566b, the rotation control devices 564a, 564b can be cooled effectively.

More specifically, air supplied from the first blower unit 406 is introduced to the interior of the casing 402 through the connection duct 404 and the first intake port 422. By rotation of the first air mixing damper 488, the vent damper 494, the defroster dampers 526a, 526b, the heat dampers 528, and the sub-defroster dampers 518a, 518b that make up the damper mechanism 414, air is selectively supplied to the defroster blow-out port 524, the first vent blow-out port 492, the first heat passage 538, and the second heat passage (not shown), which are capable of blowing air to the front seats and middle seats in the vehicle, through the first through seventh front passages 424, 482, 484, 486, 514, 520 and 522.

On the other hand, in a lower portion of the casing 402, as shown in FIGS. 11 and 12, a second intake port 568 through which air is supplied from the second blower unit 412 is formed at a rearward side perpendicular to the first intake port 422. The second intake port 568 opens at a position on an upstream side of the evaporator 408, and communicates with the first rear passage 570, and further, is formed alongside the first intake port 422 via the first rear passage 570 and the first dividing wall 572.

The second blower unit 412 includes the second blower fan 574, which supplies air that has been taken in to the interior of the casing 402. A blower case 576 in which the second blower fan 574 is accommodated is connected to the second intake port 568 of the casing 402 and communicates with the first rear passage 570. In the same manner as the first blower fan 560, rotation of the second blower fan 574 is controlled by a fan motor (not shown) driven under the control of the rotation control device 564b.

On a downstream side of the first rear passage 570, the evaporator 408 is disposed such that the second cooling section 438 thereof faces the first rear passage 570. The first dividing wall 572, which is formed between the first rear passage 570 and the first front passage 424, extends to the first and second partitioning members 464, 466 that are installed on the evaporator 408. The first partitioning member 464 is retained in the base holder 578, which is disposed at the end of the first dividing wall 572.

More specifically, since the first dividing wall 572 extends to the first and second partitioning members 464, 466 that are installed on the evaporator 408, air that flows to the evaporator 408 through the first rear passage 570 is prevented from mixing with air that flows to the evaporator 408 through the first front passage 424.

Further, a second guide panel 580 for guiding moisture ejected from the evaporator 408 to the bottom of the casing 402 is formed in the first rear passage 570 while being separated a predetermined distance from the first dividing wall 572. An upper end of the second guide panel 580 extends to the vicinity of the base holder 578 disposed on the first dividing wall 572, and is bent rearwardly so as to be separated a predetermined distance from the base holder 578 (see FIG. 16).

In addition, in the event that moisture generated by the second cooling section 438 of the evaporator 408 flows to the forward side (in the direction of arrow A) along the lower surface of the evaporator 408 and is retained in the first partitioning member 464 and the base holder 578, or when such moisture comes into contact with the upper end of the second guide panel 580, the moisture is guided and flows downwardly along the second guide panel 580. The moisture is then discharged from the casing 402 through a second drain port 582 disposed between the first dividing wall 572 and the second guide panel 580.

Owing thereto, condensed water that is generated in the evaporator 408 is prevented from accumulating and freezing in the evaporator 408.

On a downstream side of the evaporator 408, a second rear passage 584 is formed, to which air having passed through the second cooling section 438 of the evaporator 408 is supplied. The second rear passage 584 is separated from the second front passage 482 by a second dividing wall 586, wherein the second partitioning member 466 is retained in the base holder 588 disposed at the end of the second dividing wall 586. Specifically, because the second dividing wall 586 extends to the second partitioning member 466 installed on the evaporator 408, on the downstream side of the evaporator 408 as well, air that flows to the second cooling section 438 of the evaporator 408 through the first rear passage 570 does not intermix with air that passes through the first front passage 424 and flows to the first cooling section 436 of the evaporator 408.

In the second rear passage 584, a second air mixing damper 590 is disposed rotatably therein facing the heater core 410 for mixing cooled air and heated air at a predetermined mixing ratio to thereby produce mixed air. The second air mixing damper 590 switches the communication state between the second rear passage 584 and an upstream or downstream side of a third rear passage 592, which is connected to a downstream side of the heater core 410. Consequently, by rotating the second air mixing damper 590, cool air that is cooled by the evaporator 408 and supplied to the second rear passage 584 and warm air that is heated by the heater core 410 and which flows through the third rear passage 592 are mixed at a predetermined mixing ratio within the third rear passage 592 and blown out therefrom.

Stated otherwise, the third rear passage 592 functions as a mixing section for mixing warm air and cool air, which is then blown out to the middle seats and rear seats in the vehicle.

Figure 50:
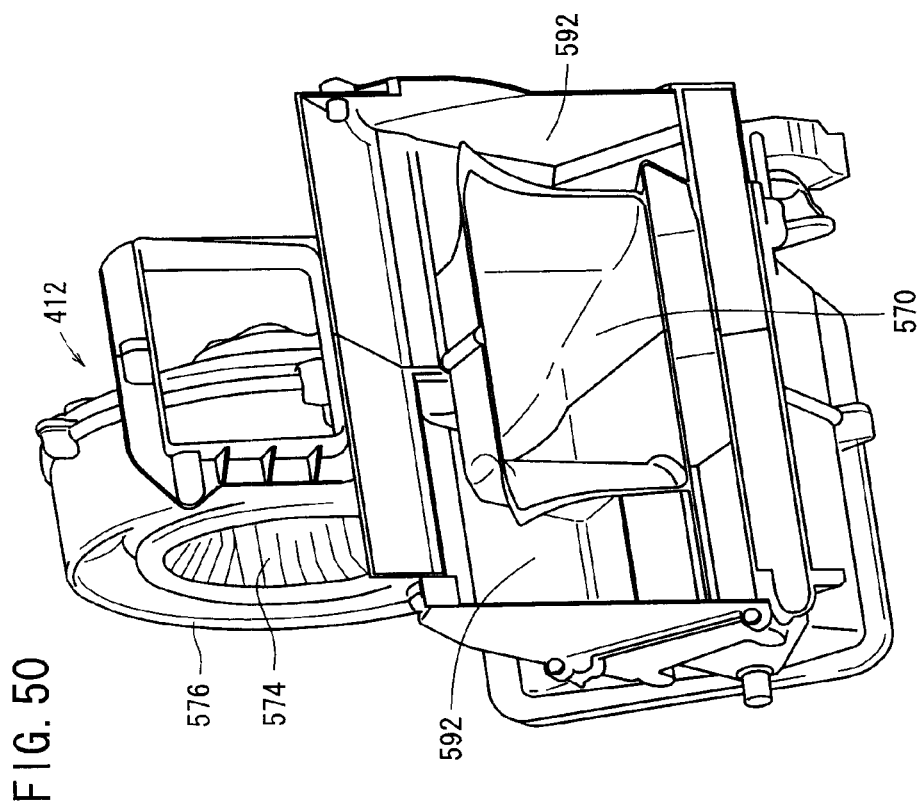
FIG. 50 is an enlarged perspective view showing the vicinity of a first rear passage and a third rear passage formed in a lower portion of the casing.

Further, as shown in FIG. 11, the third rear passage 592, after bending to circumvent the other end of the heater core 410, extends downwardly, and midway therein, an opening is formed that communicates with the second rear passage 584. On a downstream side extending further downward from the opening, as shown in FIG. 50, the third rear passage 592 branches in a forked manner, branching in widthwise directions of the casing 402 about the first rear passage 570, and after extending so as to avoid the first rear passage 570 on both sides thereof, the third rear passage 592 merges again downward of the first rear passage 570. Stated otherwise, the third rear passage 592 is formed so as to cross over the first rear passage 570.

As shown in FIGS. 11 and 12, on a downstream side of the third rear passage 592, fourth and fifth rear passages 594, 596 communicate therewith. A rotatable mode switching damper 598 is disposed at a branching location thereof, which serves to switch the blowing state of air to the fourth and fifth rear passages 594, 596, which branch respectively from the third rear passage 592, and also to adjust the blowing rate of air thereto.

The fourth and fifth rear passages 594, 596 extend toward a rearward direction of the vehicle. The fourth rear passage 594 communicates with a second vent blow-out port (not shown) for blowing air in the vicinity of faces of passengers in the middle seats in the vehicle compartment. The fifth rear passage 596 communicates with second and third heat blowout ports (not shown) for blowing air in the vicinity of the feet of passengers in the middle and rear seats.

Specifically, air supplied from the second blower unit 412 is directed into the casing 402 through the second intake port 568, and is selectively supplied to the second vent blow-out port, and the second and third heat blow out ports, which are arranged to face the middle seats and rear seats in the vehicle, through the first through fifth rear passages 570, 584, 592, 594, 596.

Moreover, because the aforementioned second to seventh front passages 482, 484, 486, 514, 520, 522 are divided in half at a substantially central portion of the casing 402 by the center plate 420, the second to seventh front passages 482, 484, 486, 514, 520, 522 are disposed respectively inside of the first and second divided casings 416, 418.

Figure 51:
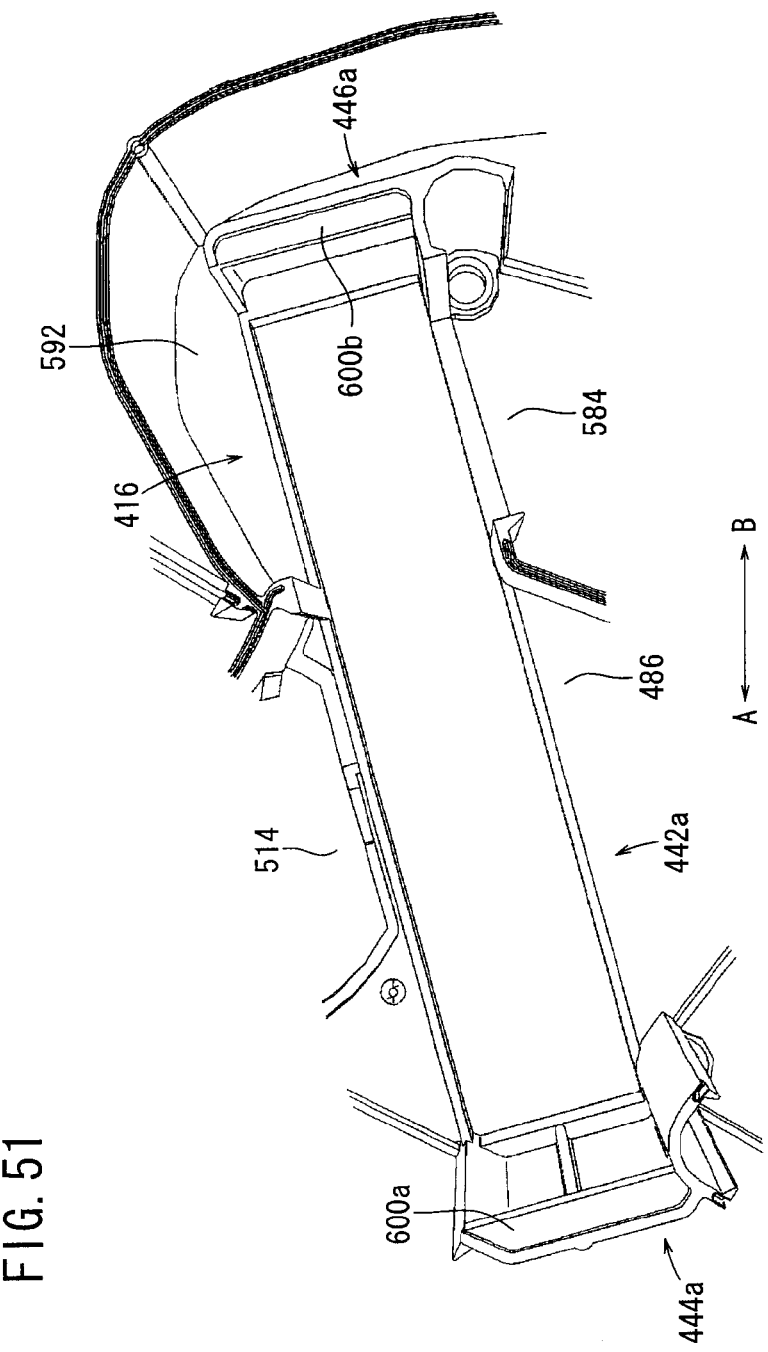
FIG. 51 is an enlarged perspective view of the interior of the casing, showing a modified example of the heater holder shown in FIG. 19.
Figure 52:
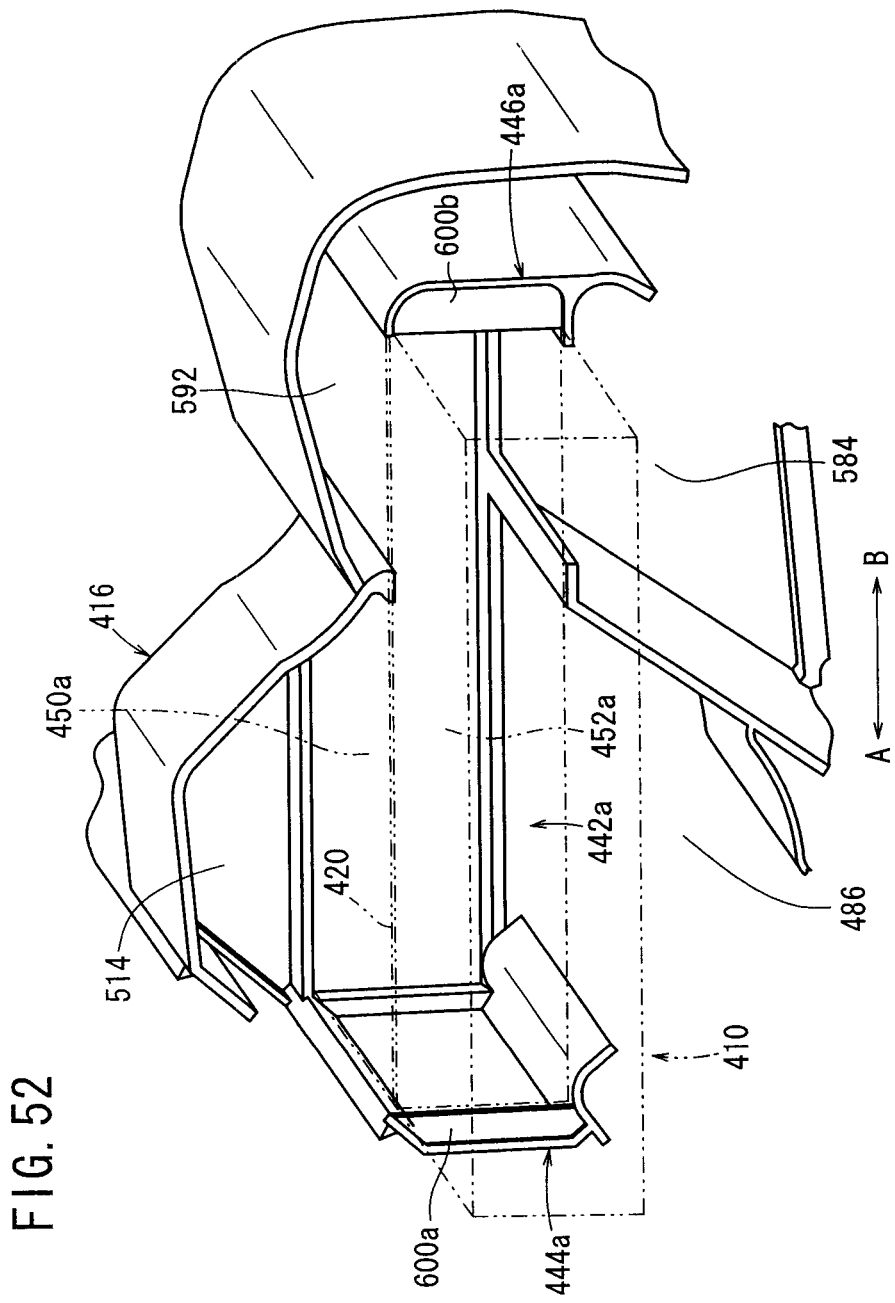
FIG. 52 is an enlarged perspective view showing a condition in which the heater core is installed in the heater holder of FIG. 51.
Figure 53:
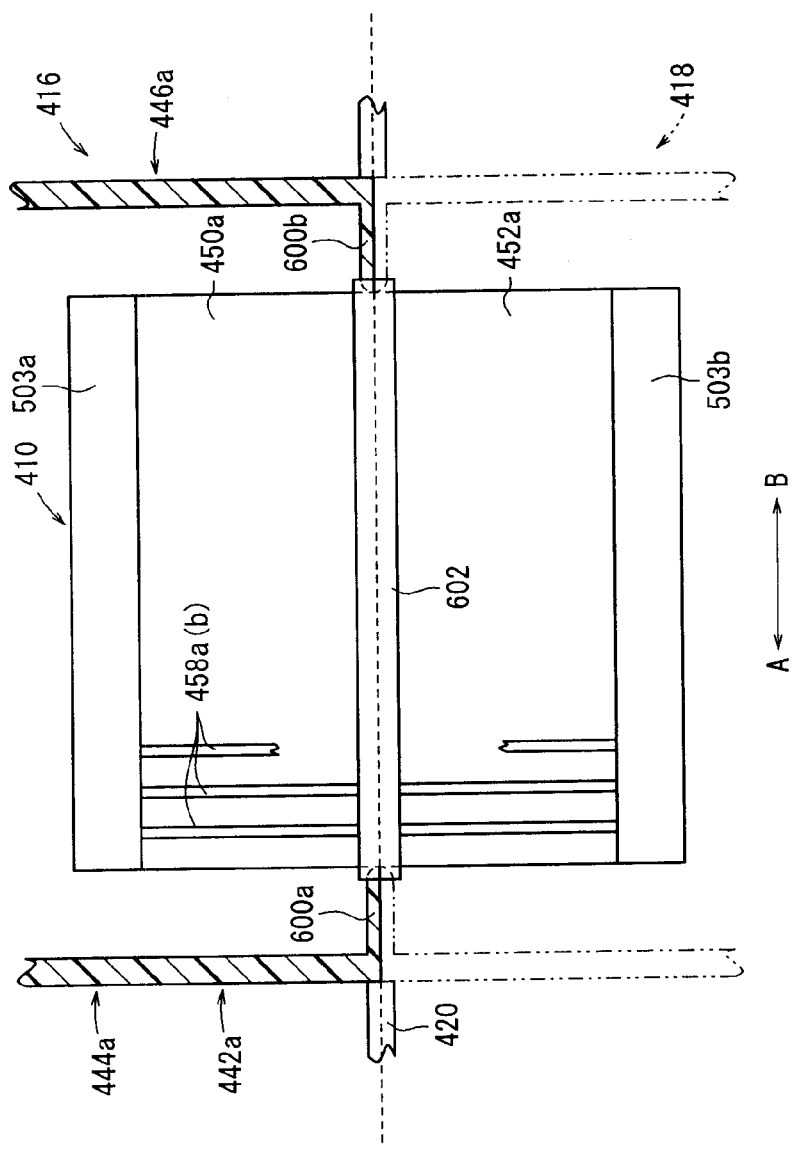
FIG. 53 is a plan view of the heater core of FIG. 52, as viewed from above.

An explanation shall now be made with reference to FIGS. 51 to 53 concerning a modified example of a heater holder 442a for retaining the heater core 410 inside the casing 402.

In the heater holder 442a, a pair of ribs 600a, 600b (sealing members) are formed, which project toward and abut against the side surfaces of the heater core 410 at center portions of first and second retaining members 444a, 446a. The paired ribs 600a, 600b are disposed at a substantially central portion of the casing 402 coplanar with the center plate 420 provided in the casing 402, and extend roughly in a vertical direction. Stated otherwise, the pair of ribs 600a, 600b is disposed substantially parallel with the blowing direction of air that flows through the interior of the casing 402.

On the other hand, at a substantially center portion of the heater core 410, a partitioning means 602 is disposed along a straight line so as to unite one of the ribs 600a and the other of the ribs 600b, and further, is disposed at a position substantially coplanar with the center plate 420 provided inside the casing 402 when the heater core 410 is mounted in the heater holder 442a. The heater core 410 is separated into a first heating section 450a, which is arranged on the side of the first divided casing 416 centrally about the center plate 420 by the partitioning means 602, and a second heating section 452a, which is arranged on the side of the second divided casing 418, and prevents flow of air through the interior of the heater core 410 between the first heating section 450a and the second heating section 452a thereof (see FIG. 53).

Stated otherwise, the partitioning means 602 disposed on the heater core 410 and the pair of ribs 600a, 600b provided on the heater holder 442a are arranged perpendicularly to the first and second partitioning members 464, 466 provided on the evaporator 408, and the vertical ribs 432b, 434b in the evaporator holder 426.

In addition, air that is supplied from the first blower fan 560 and flows through the fourth front passage 486 to the heater core 410, and air that is supplied from the second blower fan 574 and flows through the second rear passage 584 to the heater core 410, are divided respectively by the partitioning means 602 into the first and second heating sections 450a, 452a, whereby such air, which is separated in the first divided casing 416 and the second divided casing 418, is heated and flows downstream. Furthermore, because the ribs 600a, 600b of the heater holder 442a are arranged along a straight line with the partitioning means 602, air that flows through the first divided casing 416 side and air that flows through the second divided casing 418 side centrally about the center plate 420 in the casing 402 are prevented from intermixing.

More specifically, after air, which has been cooled by the evaporator 408, flows through the fourth front passage 486 and the second rear passage 584, passes through the first and second heating sections 450a, 452a of the heater core 410 and is heated thereby, by supplying the air to the fifth front passage 514 and the third rear passage 592, which are separated bilaterally within the casing 402, for example, mixed air which is adjusted in temperature separately and independently is blown out respectively from the vent blow-out port on the driver's seat side and the vent blow-out port on the passenger seat side inside the vehicle compartment.

The vehicular air conditioning apparatus 400 according to the second embodiment of the present invention is basically constructed as described above. Next, operations and effects of the invention shall be explained.

First, when operation of the vehicular air conditioning apparatus 400 is started, the first blower fan 560 of the first blower unit 406 is rotated under the control of the rotation control device 564a, and air (interior or exterior air) that is taken in through a duct or the like is supplied to the first front passage 424 of the casing 402 through the connection duct 404. Simultaneously, air (interior air) that is taken in by rotation of the second blower fan 574 of the second blower unit 412 under the control of the rotation control device 564b is supplied to the first rear passage 570 from the blower case 576 while passing through the second intake port 568. In the following descriptions, air supplied to the interior of the casing 402 by the first blower fan 560 shall be referred to as "first air," and air supplied to the interior of the casing 402 by the second blower fan 574 shall be referred to as "second air."

The first air and the second air supplied to the interior of the casing 402 are each cooled by passing respectively through the first and second cooling sections 436, 438 of the evaporator 408, and flow respectively as chilled air to the second front passage 482 and the second rear passage 584, in which the first and second air mixing dampers 488, 590 are disposed. In this case, because the interior of the evaporator 408 is divided into the first cooling section 436 and the second cooling section 438 by a non-illustrated partitioning means, the first air and the second air do not mix with one another.

Herein, for example, in the case that a vent mode is selected by a vehicle occupant through a controller (not shown) in the vehicle compartment for blowing air in the vicinity of the faces of passengers, by blocking communication between the second front passage 482 and the fourth front passage 486 by means of the first air mixing damper 488, the first air (cooled air) flows from the second front passage 482 to the third front passage 484. In this case, the temperature control damper 516 blocks communication between the fifth front passage 514 and the third front passage 484. Additionally, concerning the first air (cooled air) that flows to the third front passage 484, since the vent damper 494 is rotated into a position that blocks communication between the third front passage 484 and the sixth front passage 520, the first air is blown from the open first vent blow-out port 492, through the vent duct 544, and in the vicinity of the faces of passengers riding in the front seats in the vehicle compartment.

On the other hand, concerning the second air (cooled air), since flow to the second heating section 452 of the heater core 410 is interrupted by the second air mixing damper 590, the second air flows downstream from the second rear passage 584 through the third rear passage 592. Additionally, the second air (cooled air) is blown in the vicinity of the faces of passengers riding in the middle seats in the vehicle compartment from the second vent blow-out port (not shown) through the fourth rear passage 594 under a switching operation of the mode switching damper 598.

Further, for example, in the vent mode, in the case that the interior of the vehicle compartment is quickly cooled, the cooling vent damper 490 enables communication between the second front passage 482 and the third front passage 484. As a result, since the blowing rate of the first air (cooled air) that flows to the third front passage 484 from the second front passage 482 increases, the vehicle compartment can be cooled quickly by the first air, which is blown from the first vent blow-out port 492 through the vent duct 544.

In this case, since it is unnecessary to mix warm air supplied to the fifth front passage 514 with the cool air of the third front passage 484, the temperature control damper 516 is rotated to become substantially parallel with the third front passage 484 and to block communication between the fifth front passage 514 and the third front passage 484. As a result, cooled air in the third front passage 484 can be supplied to the first vent blow-out port 492 without being raised in temperature. In addition, because the temperature control damper 516 suppresses flow passage resistance when cool air flows through the third front passage 484, low electrical power consumption of the first blower fan 560 is realized, along with reducing noise.

Next, for example, in the case that the bi-level mode is selected by the controller (not shown) inside the vehicle compartment for blowing air in the vicinity of faces and feet of the passengers, the first air mixing damper 488 is rotated to an intermediate position between the third front passage 484 and the fourth front passage 486, so that the first air is caused to flow respectively to both the third front passage 484 and the fourth front passage 486. Furthermore, the temperature control damper 516 is rotated, whereupon air heated by the first heating section 450 of the heater core 410 is supplied into the third front passage 484 from the fifth front passage 514. At this time, the vent damper 494 is positioned at an intermediate position between the first vent blow-out port 492 and the opening of the sixth front passage 520, and together therewith, the defroster blow-out port 524 is blocked by the defroster dampers 526a, 526b, whereupon the communication opening from the fifth front passage 514 to the sixth front passage 520 is blocked by the sub-defroster dampers 518a, 518b and communication therebetween is interrupted.

Herein, the first air (cooled air) flows from the second front passage 482 to the third front passage 484. In this case, the temperature control damper 516 is oriented in a direction so as to be separated from the communication opening between the fifth front passage 514 and the third front passage 484, while the end portion thereof is rotated to face the upstream side of the third front passage 484. Specifically, the first air (cooled air) is heated by the first heating section 450 of the heater core 410, and by mixing only at a small amount with the first air (heated air) that flows to the third front passage 484 through the fifth front passage 514, air is blown directly from the first vent blow-out port 492, through the vent duct 544, and in the vicinity of the faces of passengers riding in the front seats in the vehicle compartment.

In this case, since the temperature control damper 516 is rotated so that the end portion thereof confronts the upstream side of the third front passage 484 and projects into the third front passage 484, warm air is guided to the upstream side of the third front passage 484 along the temperature control damper 516, and further mixing thereof with cooled air can be promoted. Further, concerning the heat dampers 528 in the form of a butterfly valve, one end side thereof is rotated about the support axis to project toward the side of the sixth front passage 520 (in the direction of arrow A), while the other end side thereof is rotated to project toward the side of the seventh front passage (in the direction of arrow B).

Consequently, warm air that is mixed with cool air in the third front passage 484 flows from the sixth front passage 520, through the seventh front passage 522, and to the first heat passage 538, and is blown in the vicinity of the feet of passengers who ride in the front seat in the vehicle compartment, and together therewith, is blown in the vicinity of the feet of passengers who ride in the middle seats in the vehicle compartment, from the eighth front passage 540 and through the second heat passage (not shown).

Further, the sub-defroster dampers 518a, 518b may be rotated so as to establish communication between the fifth front passage 514 and the sixth front passage 520. As a result, air that passes through the first heating section 450 of the heater core 410 is added to the first air, which has been supplied to the sixth front passage 520 via the third front passage 484, whereupon warm first air can be supplied directly with respect to the sixth front passage 520. Owing thereto, it is possible to increase the blowing rate of warm air that is blown in the vicinity of the feet of passengers in the front seat in the vehicle compartment from the first heat blow-out port (not shown). Stated otherwise, warm air blown in the vicinity of the feet of passengers can be supplied at a more stable temperature.

On the other hand, concerning the second air (cooled air), the second air mixing damper 590 is rotated to an intermediate position whereby the second air flows to the second heating section 452 of the heater core 410, and together therewith, flows to the third rear passage 592 connected to the second rear passage 584. Specifically, the second air, after having been cooled by the second cooling section 438 of the evaporator 408, is divided in flow by the second air mixing damper 590, such that one portion is guided to the third rear passage 592 as cooled air, whereas the other portion thereof, after being heated by the second heating section 452 of the heater core 410, is blown into the third rear passage 592. As a result, the second air is adjusted to a suitable temperature in the third rear passage 592.

The angle of rotation of the second air mixing damper 590 can be freely changed in accordance with the temperature desired by passengers in the vehicle compartment, or stated otherwise, the second air mixing damper 590 can be rotated in coordination with an input from the controller in the vehicle compartment. Concerning the second air, which flows downstream through the third rear passage 592, the flow rate ratio thereof to the fourth rear passage 594 and the fifth rear passage 596 is adjusted by rotating the mode switching damper 598 to a predetermined position so that the second air flows therethrough. As a result, the second air is blown from the second vent blow-out port and a second heat blow-out port (not shown) in the vicinity of the faces of passengers in the middle seats inside the vehicle compartment, or alternatively, is blown from the second heat blow-out port and the third heat blow-out port (not shown) toward the feet of passengers in the middle seats and rear seats inside the vehicle compartment. Herein, the predetermined position of the mode switching damper 598 is defined in accordance with the set temperature and mode, which are input by a passenger from the controller inside the vehicle compartment. The set temperature and/or mode, apart from being input from the front seats, may also be input from the middle seats or the rear seats.

Next, in the case that the heat mode for performing blowing of air in the vicinity of the feet of passengers in the vehicle compartment is selected by the controller (not shown) in the vehicle compartment, compared to the case of the bi-level mode, the first air mixing damper 488 is rotated more to the side of the third front passage 484. Further, the temperature control damper 516 is rotated somewhat to establish communication between the third front passage 484 and the fifth front passage 514. Furthermore, the cooling vent damper 490 blocks communication between the second front passage 482 and the third front passage 484, and the vent damper 494 and the defroster dampers 526a, 526b are rotated respectively so that the first vent blow-out port 492 and the defroster blow-out port 524 are closed.

At this time, similar to the aforementioned bi-level mode, concerning the heat dampers 528 which are formed from a butterfly valve, one end side is rotated about the support axis to project into the sixth front passage 520 (in the direction of arrow A), whereas the other end side is rotated to project into the seventh front passage 522 (in the direction of arrow B).

As a result thereof, the heated first air that has passed through the first heating section 450 of the heater core 410 is supplied to the third front passage 484 from the fifth front passage 514. In the third front passage 484, the first air (cooled air), which has flowed in from the second front passage 482, is mixed with the first air (heated air), whereupon the mixed air passes through the sixth front passage 520 and the seventh front passage 522 and flows rearwardly. In addition, after being supplied to the first heat passage 538, air is blown from a non-illustrated first heat blow-out port in the vicinity of the feet of passengers riding in the front seat in the vehicle compartment, and from the eighth front passage 540 air is blown out via a non-illustrated second heat passage in the vicinity of the feet of passengers in the middle seats in the vehicle compartment.

In this case, since the end of the temperature control damper 516 is rotated toward the upstream side of the third front passage 484 projecting into the third front passage 484, the warm air is guided downstream of the third front passage 484 along the temperature control damper 516, and mixing thereof with the cooled air can be promoted.

Further, the sub-defroster dampers 518a, 518b may be rotated to establish communication between the fifth front passage 514 and the sixth front passage 520. In accordance therewith, air passes through the first heating section 450 of the heater core 410 and is added to the first air supplied to the sixth front passage 520 via the third front passage 484, and such heated first air can be supplied directly with respect to the sixth front passage 520. Owing thereto, the air blowing rate of warm air, which is blown in the vicinity of the feet of passengers in the front seat in the vehicle compartment from the first heat blow-out port, can be increased. Stated otherwise, warm air blown in the vicinity of the feet of passengers can be supplied at a more stable temperature.

On the other hand, compared to the case of the bi-level mode, the second air mixing damper 590 is rotated somewhat to separate away from the heater core 410, whereupon second air, which has passed through the second heating section 452 of the heater core 410, flows downstream through the third rear passage 592. By rotating the mode switching damper 598 to a position blocking the fourth rear passage 594, the second air passes through the fifth rear passage 596 and is blown in the vicinity of the feet of passengers in the middle and rear seats in the vehicle compartment from the second heat blow-out port and the third heat blow-out port (not shown).

Next, an explanation shall be made concerning a heat-defroster mode, in which by means of the controller (not shown) in the vehicle compartment, air is blown both in the vicinity of the feet of passengers in the vehicle compartment, and in the vicinity of the front window for eliminating fog (condensation) on the front window.

In the case that the heat-defroster mode is selected, the defroster dampers 526a, 526b in the form of a butterfly valve are rotated about the support axis so as to separate from the defroster blow-out port 524, together with blocking the first vent blow-out port 492 by the vent damper 494 (refer to the broken line in FIG. 12). As a result thereof, a portion of the first air (mixed air) that is mixed in the third front passage 484 passes through the defroster blow-out port 524 and is blown in the vicinity of the front window in the vehicle. Further, another portion of the first air (mixed air) passes through the sixth and seventh front passages 520, 522, and is blown in the vicinity of the feet of passengers in the front seats in the vehicle compartment through the first heat passage 538, as well as being blown in the vicinity of the feet of passengers in the middle seats in the vehicle compartment from the eighth front passage 540 through a non-illustrated second heat passage.

Further, in the heat-defroster mode, in the case that second air is blown toward the middle seats and rear seats of the vehicle compartment, since this mode is the same as the heat mode discussed above, detailed explanations thereof shall be omitted.

Lastly, the defroster mode for blowing air only in the vicinity of the front widow for eliminating fog (condensation) from the front window in the vehicle shall be described. In this case, the first air-mixing damper 488 and the cooling vent damper 490 block communication respectively between the second front passage 482 and the third front passage 484. At the same time, the vent damper 494 blocks the first vent blow-out port 492 and blocks communication between the vent duct 544 and the third front passage 484, while the temperature control damper 516 establishes communication between the fifth front passage 514 and the third front passage 484. Further, the heat dampers 528 in the form of a butterfly valve are rotated about the support axis, so that one end thereof blocks the eighth front passage 540 and the other end thereof blocks the seventh front passage 522, respectively.

On the other hand, the sub-defroster dampers 518a, 518b and the defroster dampers 526a, 526b in the form of butterfly valves are rotated to establish communication between the fifth front passage 514, the sixth front passage 520, and the defroster blow-out port 524. As a result, warm first air that has passed through the heater core 410 is supplied from the fifth front passage 514, through the sixth front passage 520, and to the opened defroster blow-out port 524, whereby warm air is blown in the vicinity of the front window in the vehicle. In this case, the second blower unit 412 is not driven, and only the first air supplied from the first blower unit 406 is blown out.

In the foregoing manner, according to the second embodiment, because the forward bottom surfaces 416a, 418a of the first and second divided casings 416, 418 are configured to be inclined toward opposite side portions of the casing 402, the size in the vertical direction of the casing 402 can be reduced as much as possible, while moisture, which passes through the hole 456a disposed at the lower portion of the first guide panel 456 and is guided to the forward bottom surfaces 416a, 418a, is guided to the first drain ports 454a, 454b that are disposed at positions where the inclined surfaces of the forward bottom surface 416a, 418a terminate, whereupon such moisture can be discharged efficiently to the exterior of the casing 402. Furthermore, during assembly thereof, even in the case that the casing 402 is positioned on the floor or the like, since the pair of first drain ports 454a, 454b which project from the bottom of the casing 402 are disposed in a pair, the first drain ports 454a, 454b can be affixed stably as leg portions.

The vehicular air conditioning apparatus according to the present invention is not limited to the above-described embodiments, and it is a matter of course that various modified or additional structures could be adopted without deviating from the essence and gist of the invention as set forth in the appended claims.

What is claimed is:

1. A vehicular air conditioning apparatus including a casing having a plurality of passages through which air flows, a blower connected to the casing for supplying the air to the inside of the casing, and cooling means disposed inside the casing for cooling the air and supplying cooled air,
    wherein on a bottom surface of the casing, a plurality of drain ports are provided, which communicate between an interior portion and an exterior portion of the casing,
    the drain ports comprise a pair of drain ports disposed at opposite end portions in the bottom surface of the casing in a widthwise direction of the vehicle, and
    the bottom surface of the casing is formed such that a center portion in the widthwise direction expands upwardly and the bottom surface has inclined surfaces that decline downwardly respectively toward the opposite end portions in the widthwise direction of the vehicle.

2. The vehicular air conditioning apparatus according to claim 1, wherein the drain ports have cylindrical shapes, which extend downwardly from opposite end portions of the casing in a widthwise direction of the vehicle.

3. The vehicular air conditioning apparatus according to claim 1, wherein the cooling means is inclined forwardly and fixed in the interior of the casing, and a lower end portion of the cooling means is directed toward the drain ports.

4. The vehicular air conditioning apparatus according to claim 2, wherein the cooling means is inclined forwardly and fixed in the interior of the casing, and a lower end portion of the cooling means is directed toward the drain ports.

5. The vehicular air conditioning apparatus according to claim 1, wherein a front side of the bottom surface of the casing is lowest and the drain ports are disposed at the lowest front side portion of the bottom surface.

6. The vehicular air conditioning apparatus according to claim 3, wherein the casing further comprises a guide panel disposed in the vicinity of the lower end portion of the cooling means so as to face toward a lower surface of the cooling means, and the guide panel comprises at least one hole disposed at a bottom part of the guide panel.

7. The vehicular air conditioning apparatus according to claim 3, wherein the casing further comprises a guide panel disposed on the bottom surface of the casing in the vicinity of the lower end portion of the cooling means so as to face toward a lower surface of the cooling means, and the guide panel comprises a hole disposed at a center and a bottom part of the guide panel.

* * * * *